United States Patent
Fujiwara

(10) Patent No.: US 10,982,802 B2
(45) Date of Patent: Apr. 20, 2021

(54) LIQUID PIPE COUPLING UNIVERSAL JOINT AND LIQUID PRODUCT TREATMENT DEVICE USING THE SAME

(71) Applicant: FKS Co., Ltd., Kawasaki (JP)

(72) Inventor: Yasutatsu Fujiwara, Kawasaki (JP)

(73) Assignee: FKS CO., LTD., Kawasaki (JP)

( * ) Notice: Subject to any disclaimer, the term of this patent is extended or adjusted under 35 U.S.C. 154(b) by 1048 days.

(21) Appl. No.: 15/507,045

(22) PCT Filed: Aug. 25, 2015

(86) PCT No.: PCT/JP2015/074557
§ 371 (c)(1),
(2) Date: Aug. 3, 2017

(87) PCT Pub. No.: WO2016/031997
PCT Pub. Date: Mar. 3, 2016

(65) Prior Publication Data
US 2017/0343139 A1    Nov. 30, 2017

(30) Foreign Application Priority Data

Aug. 29, 2014  (JP) .............................. JP2014-176641
Jul. 28, 2015  (JP) .............................. JP2015-148313

(51) Int. Cl.
*F16L 27/06* (2006.01)
*F16L 27/04* (2006.01)

(52) U.S. Cl.
CPC ............... *F16L 27/06* (2013.01); *F16L 27/04* (2013.01); *F16L 27/042* (2013.01)

(58) Field of Classification Search
CPC .......... F16L 27/06; F16L 27/04; F16L 27/042
USPC ........................................ 285/261, 264, 270
See application file for complete search history.

(56) References Cited

U.S. PATENT DOCUMENTS

| | | | |
|---|---|---|---|
| 522,391 A | 7/1894 | Walker | |
| D39,859 S * | 3/1909 | Vogel | ........................... D23/263 |
| 1,868,696 A | 7/1932 | Crary | |
| 2,292,328 A | 8/1942 | Sisk | |
| 2,581,047 A | 1/1952 | Salmond et al. | |
| 4,088,348 A * | 5/1978 | Shemtov | ................. F16L 27/04 |
| | | | 285/184 |
| D283,833 S | 5/1986 | Macintyre | |
| D291,481 S | 8/1987 | Vassallo et al. | |

(Continued)

FOREIGN PATENT DOCUMENTS

| | | | | |
|---|---|---|---|---|
| CH | 113605 A * | 5/1926 | ............. | F16L 27/04 |
| EP | 1092908 A2 * | 4/2001 | ............. | F16L 27/06 |

(Continued)

OTHER PUBLICATIONS

Int'l. Search Report issued in Int'l. App. No. PCT/JP2015/074557, dated Dec. 1, 2015.

*Primary Examiner* — Matthew Troutman
*Assistant Examiner* — Fannie C Kee
(74) *Attorney, Agent, or Firm* — Greer Burns & Crain Ltd.

(57) ABSTRACT

A pipe coupling universal joint has a first fitting portion and a second fitting portion. An edge circumference of the first or second fitting portion is separated from a reference plane by a length set to 21 to 23% of the maximum diameter length of the first or second fitting portion on the reference plane in a direction opposite to a side where a straight pipe portion is connected from the reference plane.

20 Claims, 40 Drawing Sheets

(56) References Cited

U.S. PATENT DOCUMENTS

| | | |
|---|---|---|
| 7,300,074 B1 | 11/2007 | Paulson |
| D556,899 S | 12/2007 | Veliss et al. |
| 7,793,991 B2 | 9/2010 | Wormall |
| D726,288 S | 4/2015 | Sisk |
| D739,508 S | 9/2015 | Menno |
| D771,780 S | 11/2016 | Scifres et al. |
| 2017/0343139 A1 | 11/2017 | Fujiwara |

FOREIGN PATENT DOCUMENTS

| | | | |
|---|---|---|---|
| JP | 39-15799 B1 | 8/1964 | |
| JP | 61-162692 | 10/1986 | |
| JP | 07-265973 A | 10/1995 | |
| JP | 3023017 U | 4/1996 | |
| JP | 8-177475 A | 7/1996 | |
| JP | 10-213280 A | 8/1998 | |
| JP | 11-159673 A | 6/1999 | |
| JP | 2000-13964 A | 1/2000 | |
| JP | 2000-193163 A | 7/2000 | |
| JP | 3915799 B2 | 5/2007 | |
| JP | 2010-242880 A | 10/2010 | |
| JP | 2017026117 A | 2/2017 | |
| WO | WO-0190496 A1 * | 11/2001 | ............ F16L 27/06 |

* cited by examiner (A)

(B)

(C)

(D)

LIQUID PIPE COUPLING UNIVERSAL JOINT AND LIQUID PRODUCT TREATMENT DEVICE USING THE SAME

This is a National Phase Application filed under 35 U.S.C. § 371, of International Application No. PCT/JP2015/074557, filed Aug. 25, 2015.

TECHNICAL FIELD

The present invention relates a liquid pipe universal pipe joint used to connect various pipes used as a liquid channel, and more particularly, to a liquid pipe coupling universal joint and a liquid product treatment device using the same, capable of easily adjusting a precise setting angle required in various coupling portions of pipes serving as passages for various liquid flows and providing a high coupling strength, excellent earthquake resistance, and excellent vibration resistance.

BACKGROUND ART

In the background art, as an indoor ventilation system, there are known a wall surface direct-mount type directly mounted to a wall of a building by preparing an opening on the wall and a built-in type mounted to an inner side of a ceiling or a wall. Recently, the built-in type is prevailed. In this built-in type ventilation system, an indoor unit is connected to an external outlet duct installed in a wall of a building using an elbow pipe or a bellows pipe formed in an integral manner.

That is, depending on an opening direction of the connection outlet duct in the built-in type ventilation system, coupling directions of the connection outlet duct and the external outlet duct may be decentered from each other due to a relationship of the mount position of the external outlet duct with respect to the wall. In this case, the connection outlet duct and the external outlet duct are coupled using any one of the elbow pipe and the bellows pipe or a combination of the elbow pipe and the bellows pipe.

The elbow pipe has no unevenness that hinders a flow of the air on its inner surface and can be effectively employed as an indoor ventilation pipe joint. However, since the elbow pipe is a pipe joint having a fixed bent angle of 90° or the like, this is a difficult work due to decentering (decentering angle) of the coupling direction, and the work may not be appropriately performed only using a single elbow pipe. In this case, the elbow pipe may be combined with a tiltable and flexible bellows pipe, or a single bellows pipe may be employed.

In this manner, using the bellows pipe, it is possible to adjustably and smoothly cope with decentering in the coupling direction between the connection outlet duct and the external outlet duct. Therefore, the bellows pipe is considered as an effective pipe joint in this coupling. However, since the bellows pipe has minute unevenness on its inner surface, flow resistance increases, and it is difficult to achieve a smooth flow of the indoor air.

In particular, if the bellows pipe is employed as an external pipe for a range hood that discharges the contaminated air generated during cooking to the outdoor, oil and fat contents contained in the contaminated air continually collide with a convex portion of the minute unevenness, so that oil and fat contents may be piled in the pipe. This is undesirable in terms of fire prevention.

Meanwhile, similarly to the ventilation system, liquid pipes for daily life drainage in general residence housings or high-rise housings are mounted in narrow places between a building wall and an outer wall or between a top layer and a ceiling layer. However, the pipe mount space is typically limited to a very narrow passage in order to reduce a construction cost. Therefore, it is required to prepare a predetermined slope for such a very narrow space according to the building construction standards. In addition, in regard to the pipe mounting, it is necessary to couple the pipes by arbitrarily changing the coupling angle of the pipes.

In this regard, in the background art, there is known a bendable tubular member called an elbow pipe integrally formed of synthetic resin. However, although elbow pipes are produced from many manufacturers, a bending angle of such an elbow pipe is limited to a particular angle predetermined by manufacturers, such as 45°, 75°, 90°, and 180°. Any type of the elbow pipe has a certain angle depending on a manufacturer. Therefore, it is difficult to set the curved angle of the coupled pipes to a certain angle even by combining various types of elbow pipes. Furthermore, even when a user tries to obtain a predetermined curved angle by combining a plurality of elbow pipes, a significant space is necessary around a pipe group including the elbow pipe in such a coupling portion. Therefore, it is difficult to substantially set a predetermined slope or angle by combining a plurality of elbow pipes inside the narrow pipe layer set in advance.

There is known a bendable elbow pipe joint formed of, for example, vinyl chloride resin capable of changing a connection angle between a pair of neighboring straight pipes by inserting an articulation assembly partially using a spherical surface. However, in such a bendable elbow pipe joint, a connectable bending angle between a pair of straight pipes is limited to a small range of about 10° to 20°. Therefore, such a bendable elbow pipe is not substantially usable in practice.

Therefore, in the background art, it is nearly impossible to implement a predefined slope according to the building construction standards in all pipe layers. Therefore, it is difficult to set a predetermined slope of the liquid pipe in many portions. In some cases, a lot of pipes are mounted in a parallel state. Therefore, in general residence housings or high-rise housings, it is necessary to clean an inner side of the liquid pipe at least one time per year using a high-pressure cleaning machine. Accordingly, a maintenance cost increases disadvantageously.

In other cases, a straight pipe having a predetermined length is forcibly bent in the pipe coupling space. In appearance, this may be seen as the piping complies with the relating regulations regarding the slope, and such cheating occurs frequently. For such an unlawful piping work, naturally, sludge may remain in the pipe, or an excessive load may be continually applied to the pipe for a long time. Therefore, durability of a pipe system is remarkably degraded, and this becomes a social issue.

Such a problem is not limited to piping inside a detached housing or a high-rise housing, but is also applied to a case where daily life drainage discharged from the detached housing or a high-rise housing is connected to a sewerage main manhole buried under a road. Such a problem also occurs in a plurality of connection portions provided in a plurality of pipes extending from a subterranean part of the detached housing or a high-rise housing to the sewerage main manhole.

Furthermore, in the connection portion of the pipe using an elbow pipe of the background art, the elbow pipe portion and the straight pipe portion fastened to the elbow pipe are just simply fitted, and do not have flexibility, so that a coupling strength is low. If a large vibration such as an earthquake is applied, the fitting portion between the elbow pipe and the straight pipe may be broken or removed from each other. In some cases, necessary gases or liquids may leak, so that a secondary disaster may occur dangerously.

The aforementioned elbow pipe universal joint also has a small angle variation margin and a small overlapping area between fitting portions in an articulation assembly including the spherical surface. Therefore, it is difficult to sufficiently absorb a vibration such as an earthquake, and vibration resistance performance is unsatisfactory, so that the articulation assembly may be broken disadvantageously.

As an exemplary method for addressing such problems of the background art, a technique of modifying the structure of the elbow pipe universal joint described above to address the technical disadvantages has been proposed.

For example, JP 07-265973A (Patent Literature 1) discusses a universal joint including a first coupling structure having a first straight pipe portion and a first fitting portion provided with an inner spherical body connected to one end of the first straight pipe portion, and a second coupling structure having a second straight pipe portion and a second coupling structure provided with an outer spherical body connected to one end of the second straight pipe portion and fitted to an outer circumferential surface of the inner spherical body. Since the inner spherical body and the outer spherical body are coupled in a slidable manner, a slight angular swing motion between the first and second straight pipe portions is allowed depending on a design.

However, in the universal joint discussed in Patent Literature 1, the first straight pipe portion coupled to the inner spherical body turns slightly within a slope range at an angle of 30° around a suitable axis passing through a center point of the inner spherical body. In this configuration, it is impossible to provide sufficient freedom in a bending angle between least two straight pipe portions to be connected, and the universal joint is used only as a connection joint in a very small part. Therefore, practicality is short in reality.

The universal joint discussed in Patent Literature 1 is merely configured to handle ventilation of gases in an air conditioner or the like. Therefore, the universal joint of Patent Literature 1 is completely different from the universal joint for liquid according to the present invention that requires a structure having rigidity, high strength, earthquake or vibration resistance, bendability, flexibility, and flowability such that flowing water does not easily stay. Since the universal joint of Patent Literature 1 was developed to allow a flexible and simple bending work with a light weight by appropriately bending and coupling the neighboring connected straight pipe portions, the object of Patent Literature 1 is sufficiently achieved as long as the angle between the straight pipe portions can be changed at an angle range of 30° at maximum. Therefore, the universal joint of Patent Literature 1 is completely different from the universal joint for liquid according to the present invention in terms of configuration, object, and effect. In addition, it would be difficult to infer the present invention on the basis of Patent Literature 1.

Meanwhile, JP 2010-242880 A (Patent Literature 2) discusses a universal joint that is used in pipe coupling for flowing gases as in the universal joint of Patent Literature 1 and has a configuration similar to that of Patent Literature 1. However, compared to the technique of Patent Literature 1, the technique of Patent Literature 2 aims to increase the connection angle range between a pair of straight pipe portions to be connected in the universal joint. For this purpose, opening edges of the inner spherical body and the outer spherical body slidably fitted to each other are designed to have particular shapes.

However, since the universal joint of Patent Literature 2 was designed to handle only gas as described above, it is remarkably different from the universal joint according to the present invention in terms of configuration, object, and functional effect. More specifically, the universal joint of Patent Literature 2 has a basic configuration in which a pair of spherical joint portions is fitted to each other in two places corresponding to axes of maximum diameter portions of each spherical joint portion. Therefore, each spherical joint portion just turns unidirectionally with respect to the axis line of the maximum diameter portion, and there is no suggestion in other parts. Consequently, it would be difficult to infer the present invention on the basis of Patent Literature 2. In addition, Patent Literature 2 only insists that the proposed technique is sufficiently satisfactory as a gas pipe universal joint.

That is, the opening edge of the inner spherical body is shaped such that, on a reference plane formed by a straight line X obtained by linking a center point P of the inner spherical body and a center axis line Z of the straight pipe portion decentered from the center point P and an intersecting straight line Y perpendicular to a plane formed by the sphere center point P and the center axis line Z of the straight pipe portion through the center point P of the inner spherical body as illustrated in FIG. 3 of Patent Literature 2, a sense of distance to the reference plane is gradually enlarged from a portion where one end side of the straight line X placed on the reference plane intersects with the opening edge of the inner spherical body toward a portion where the other end side of the straight line X intersects with another portion of the opening edge of the inner spherical body. Meanwhile, the opening edge of the outer spherical body is formed in an opening shape along the reference plane as illustrated in FIG. 5 of Patent Literature 2. By employing such a configuration, a shape of the opening edge of the inner spherical body can be formed by increasing a slope angle compared to the shape of the opening edge of the inner spherical body of the background art. Therefore, the bent angle between the connected straight pipe portions can be set more freely.

However, in the description of Patent Literature 2, a setting condition for the reference plane is not clear, and a position of the reference plane or a slope angle against the horizontal plane is not specified. Therefore, Patent Literature 2 fails to satisfy an enablement requirement.

That is, although the "straight line X obtained by linking the center point P of the inner spherical body and the center axis line Z of the straight pipe portion" is defined in the aforementioned configuration, numerous straight lines X may exist on the plane formed by the center point P of the sphere and the center axis line Z of the straight pipe portion. Therefore, in this state of the description, it is difficult to specify an arrangement position and an arrangement shape of the reference plane.

However, in another embodiment of Patent Literature 2, it is discussed that an angle between the straight line X and a straight line W obtained by perpendicularly drawing a line from the center point to the center axis line Z of the straight pipe portion on the plane formed by the center point P of the sphere and the center axis line Z of the straight pipe portion can be set to 26° or 34°. If this configuration is regarded as an essential requirement of the technique, this technique may be reasonably embodied in the industrial sense. Unless such an assumption is applied, Patent Literature 2 fails to satisfy an enablement requirement. Accordingly, Patent Literature 2 fails to serve as an effective disclosure for any later technique.

Even if only the aforementioned embodiment of Patent Literature 2 is accepted, Patent Literature 2 still fails to disclose what is a height of the sloped wall, that is, a subsidiary sliding portion formed by the shape of the opening edge of the outer spherical body on the reference plane formed with a slight angle with respect to the horizontal plane and also fails to disclose an embodiment thereof. Therefore, even a person ordinarily skilled in the art would be impossible to manufacture the universal joint in an industrial sense from the technique of Patent Literature 2. In other words, Patent Literature 2 fails to discuss or suggest a novel and inventive technique concept capable of addressing the aforementioned problems of the background art.

More specifically, in Patent Literature 2, the shape of the opening edge of the outer spherical body is formed by extending the sloped subsidiary member having an unclear range from the reference surface. In addition, the shape of the opening edge of the inner spherical body is similar to that of the background art on the same plane as the reference plane. Therefore, it is difficult to say that an overlappingly fitting portion between the opening edge of the outer spherical body and the opening edge of the inner spherical body has an area or a length remarkably larger than those of the background art. Accordingly, there is no description regarding a fact that the bending angle formed by a pair of connected straight portions increases compared to the background art, and it is difficult to guarantee such a fact.

Furthermore, in Patent Literature 2, since the overlappingly fitting portion between the opening edge of the outer spherical body and the opening edge of the inner spherical body is not set to be larger than that of the background art, a strength of the universal joint coupling portion is still small. In addition, it is inevitable to think that the coupling portion may be highly possibly disassembled or damaged by a vibration such as an earthquake.

That is, both Patent Literatures 1 and 2 fail to perfectly disclose or suggest necessary technical information for addressing problems of the background art.

In addition, JP 3023017 U (Patent Literature 3) discusses a spherical universal joint that can be used in coupling of liquid pipes similarly to the present invention. This technique is partly similar to the present invention in that inner and outer spheres are slidably fitted to each other, and a packing is inserted between both spheres. However, a ratio of the outer sphere covering the inner sphere is extremely large, and a variable angle range between the straight pipe portions is significantly small. Therefore, practicality is short. In addition, the outer sphere has a vertical halved structure, in which the inner sphere is inserted, and the halves of the outer sphere are then overlapped and fixed using screws. Therefore, it is difficult to perform such manual operation in a construction site, and work efficiency is significantly degraded. Furthermore, since fluid stays inside, practicality is short.

CITATION LIST

Patent Literature

Patent Literature 1: JP 07-265973 A
Patent Literature 2: JP 2010-242880 A
Patent Literature 3: JP 3023017 U

SUMMARY OF INVENTION

Technical Problem

Therefore, in view of disadvantages of the background art, an object of the present invention is to provide a liquid pipe coupling universal joint and a liquid product treatment device using the same, capable of allowing an operator to easily and precisely adjust and set the bending angle between pipes at the time of piping coupling operation in a narrow and dark work space in a construction site where work difficulty is extremely high, when there is necessity of implementing a precise setting angle required in various coupling portions of pipes serving as passages of various liquid flows, easily and accurately perform a pipe mounting work even in a narrow space as required in design as a result, remarkably reducing time and cost for the pipe mounting work, and having a high coupling strength in the structure of the universal joint itself, and excellent vibration and earthquake resistance.

Solution to Problem

In order to achieve the aforementioned objects, the present invention employs a basic technical configuration as described below.

According to a first specific aspect of a basic technical concept of the present invention, there is provided a liquid pipe coupling universal joint used in a pipe coupling portion, including: a first coupling structure having a first straight pipe portion and a first fitting portion as a curved body that forms a part of a spherical body connected to one end of the first straight pipe portion; and a second coupling structure having a second straight pipe portion and a second fitting portion as a curved body that forms a part of a spherical body connected to one end of the second straight pipe portion, wherein any one of the first and second fitting portions has a diameter larger than those of the first and second straight pipe portions and is fitted to the other fitting portion such that sphere centers of the first and second fitting portions match each other to allow semi-omnidirectional sliding or pivoting, the first and second straight pipe portions have center axis lines decentered from each other not to pass through sphere centers of the first and second fitting portions, a part of an inner surface of the first or second straight pipe portion and at least a part of an inner surface of the first or second fitting portion form a continuous plane portion as seen in a cross-sectional side view on a plane formed by the sphere center and the center axis line of the first or second straight pipe portion, and an edge circumference of at least the first or second fitting portion is formed in a position separated from a reference plane by 10 to 30% of a maximum diameter length of the spherical portion formed on the reference plane in a direction opposite to a part where the straight pipe portion is connected, as seen in a cross-sectional side view on a first plane formed by the sphere center and the center axis line of the first or second straight pipe portion, the reference plane inside the sphere being formed on a second plane perpendicular to the first plane including a straight line having an angle of 30° to 68° with the center line portion as a straight line formed by linking the sphere center and the center line portion of the straight pipe portion.

Advantageous Effects of Invention

The liquid pipe coupling universal joint used as a liquid channel according to the present invention employs the basic technical configuration described above. As a result, the liquid pipe coupling universal joint has a simple and easy configuration, and a connection adjustment work between a plurality of connected pipes, that is, the straight pipe portions becomes significantly easy. Meanwhile, since an uneven obstacle is not provided on the inner surface of the connected portion between the straight pipe portions, in particular, on the inner surface of the lower end, a flow of gas or liquid is not hindered. Furthermore, using the liquid channel universal pipe joint according to the present invention, it is possible to change the angle in an extremely wide range in operation for adjusting the setting angle required between both straight pipe portions in a connection portion of at least two continuous straight pipe portions. Meanwhile, it is possible to easily execute a precise angle setting or angle adjustment operation in each portion and freely and individually change and adjust diameters of the connected straight pipe portions. Therefore, it is possible to easily and rapidly execute necessary pipe slope setting operation in a limited narrow pipe passage space and thus remarkably reduce cost for the pipe mounting work. In particular, it is not necessary to perform a pipe cleaning work using a high-pressure cleaning system that has been required to perform at least once a year. Therefore, it is possible to remarkably reduce a maintenance cost for a long time.

In the liquid pipe coupling universal joint according to the present invention, the straight pipe portions are designed by combining the essential requirements described above, such that pivoting and direction change can be performed in a semi-omnidirectional manner, and the overlapping area between the spherical portions of the first and second fitting portions increases. Therefore, liquid pipe coupling universal joint according to the present invention also has a high strength for a vibration or an external impact and absorbs a vibration or an impact. Accordingly, since the liquid pipe coupling universal joint according to the present invention has excellent durability for an earthquake or an impact such as explosion, it is possible to obtain a liquid pipe coupling universal joint having excellent earthquake resistance or vibration resistance. This significantly can contribute to a long-term conservation effect.

If at least two liquid pipe coupling universal joints according to the present invention are combined in a single line, a free swing capability between the straight pipe portions of the universal joint is applied. Therefore, it is possible to obtain an earthquake resistance effect or a vibration resistance effect.

DESCRIPTION OF EMBODIMENTS

A configuration of a liquid pipe coupling universal joint according to the present invention will now be described in details with reference to the accompanying drawings.

Figure 1:
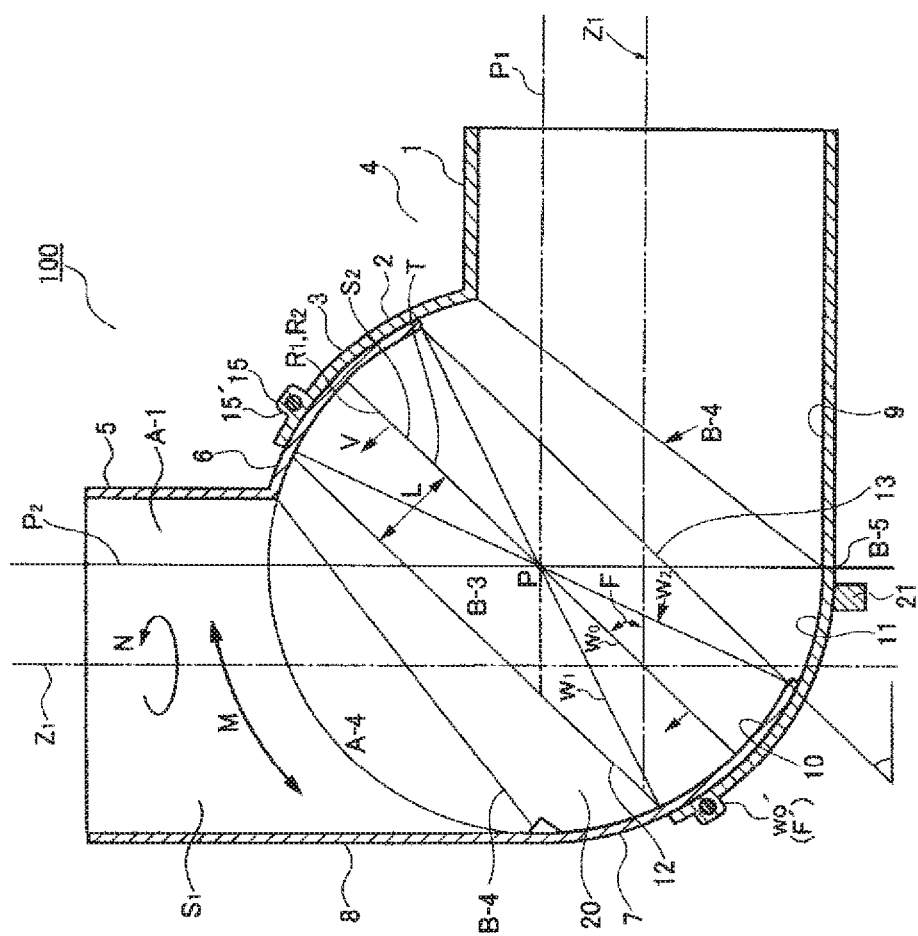
FIG. 1 is a vertical cross-sectional view illustrating an exemplary configuration of a liquid pipe coupling universal joint 100 according to an embodiment of the invention.

Specifically, FIG. 1 is a diagram illustrating a basic structure of the liquid pipe coupling universal joint 100 according to an embodiment of the present invention for showing an embodiment of a basic technical concept. Referring to FIG. 1, a universal joint 100 used in a pipe coupling portion includes: a first coupling structure 4 having a first straight pipe portion 1 and a first fitting portion 3 as a curved body 2 that forms a part of a spherical body connected to one end of the first straight pipe portion 1; and a second coupling structure 8 having a second straight pipe portion 5 and a second fitting portion 7 as a curved body 6 that forms a part of a spherical body connected to one end of the second straight pipe portion 5, wherein any one of the first and second fitting portions 3 and 7 has a diameter R1, R2 larger than those of the first and second straight pipe portions 1 and 5 and is fitted to the other fitting portion such that sphere centers P of the first and second fitting portions 3 and 7 match each other to allow semi-omnidirectional sliding or pivoting, the first and second straight pipe portions 1 and 5 have center axis lines Z1 and Z2 decentered from each other not to pass through sphere centers P of the first and second fitting portions 3 and 7, a part of an inner surface 9 or 10 of the first or second straight pipe portion 1 or 5 and at least a part of an inner surface 11 of the first or second fitting portion 3 or 7 form a continuous plane portion as seen in a cross-sectional side view on a plane S1 formed by the sphere center P and the center axis line Z1 or Z2 of the first or second straight pipe portion 1 or 5, and an edge circumference 12 or 13 of at least the first or second fitting portion 3 or 7 is formed in a position separated from a reference plane T by a length L of 10 to 30% of a maximum diameter length R1 or R2 of the spherical portion formed on the reference plane R in a direction V opposite to a part where the straight pipe portion 1 or 2 is connected, as seen in a cross-sectional side view on a first plane S1 formed by the sphere center P and the center axis line Z1, Z2 of the first or second straight pipe portion 1, 5, the reference plane T inside the sphere being formed on a second plane S2 perpendicular to the first plane S1 including a straight line W0 having an angle F of 30° to 68° with the center line portion Z1 or Z2 as a straight line W formed by linking the sphere center P and the center line portion Z1 or Z2 of the straight pipe portion 1 or 5.

In the liquid pipe coupling universal joint 100 according to more preferable embodiment of the present invention, that is, according to a second aspect, for example, in addition to the aforementioned configuration, a maximum diameter of the spherical body of the first or second fitting portion is 1.2 to 2.0 times, and preferably, 1.6 times the diameter of the first or second straight pipe portion.

The liquid pipe coupling universal joint 100 according to the present invention has the same basic technical configuration as that of the aforementioned configuration. Therefore, an overlapping area between the first and second curved fitting portions 3 and 7 is maximized, so that sliding and rotating motions are performed robustly and stably on the reference surface. In addition, an inclination angle F of the straight pipe 1 of the reference surface T with respect to the center axis line Z1 in the curved fitting portion is limited to the aforementioned specific range. Therefore, a swingable angle range M of the straight pipe portion 5 provided in the other second fitting portion 7 against one of the fitting portion 3 with respect to the center point P of the fitting portion as seen on the first plane S1 can be set to be larger than that of the universal joint of the background art. In addition, the straight pipe portion 5 provided in the second fitting portion 7 can be turned by 360° as indicated by the arrow N with respect to the axis P2 in parallel to the axial line Z2 of the straight pipe portion 5 through the center point P of the fitting portion. As a result, it is possible to set a semi-omnidirectional pipe coupling angle.

Note that, according to the present invention, the "semi-omnidirectional" instead of "perfect omnidirectional" means that a very flexible and relatively arbitrary deflection angle can be easily selected and set within a turning/bending angle range necessary in the pipe coupling work.

According to the present invention, the liquid pipe coupling universal joint 100 may be employed for various types of liquids.

According to the present invention, materials of the liquid pipe coupling universal joint 100 are not particular limited. For example, the liquid pipe coupling universal joint 100 may be formed of metal, various synthetic resins used in general, fiber-reinforced plastic (FRP) resin integrated with a reinforcement such as glass fiber or carbon fiber, ceramics, and the like.

Furthermore, according to the present invention, a diameter (inner diameter) X1 of the straight pipe portion 1 provided in the first coupling structure 4 and a diameter (inner diameter) X2 of the straight pipe portion 5 provided in the second coupling structure 8 may be equal to each other or different from each other. According to the present invention, straight pipe portions having different diameters may be combined arbitrarily.

If the first fitting portion 3 is used in the downstream side of the liquid flow direction, and the second fitting portion 8 is used in the upstream side of the liquid flow direction, the diameter (inner diameter) X1 of the straight pipe portion 1 of the first fitting portion 3 is preferably larger than the diameter (inner diameter) X2 of the straight pipe portion (upstream-side straight pipe portion) 5 of the second fitting portion 8.

Incidentally, the inventors have developed a high-performance, rigid, and flexible universal joint having high strength or ductility, excellent turnability, vibration or earthquake resistance unlike simple gas pipes handled for flowing gases in an air control system such as an air conditioner. In the course of the study, many tests or experiments were performed and studied. As a result, the inventors found that a novel liquid pipe coupling universal joint that has not been existed in the world and is capable of perfectly satisfying the characteristics described above can be manufactured by specifying any particular design condition, that is, a particular requirement.

Specifically, as the certain requirements, for example, three requirements are important. The three requirements include, as described above, (1) on the first plane formed by the sphere center and the center axis line of the first or second straight pipe portion, an angle F between a second plane (reference plane) perpendicular to the first plane including a straight line obtained by linking the sphere center and a center line of any straight pipe portion and the center line portion; (2) a length L to a portion where the edge circumference of the spherical portion represented by a ratio against the maximum diameter length of the spherical portion formed on the reference plane; and (3) a ratio of the maximum diameter of the spherical body portion of the first or second fitting portion against the diameter of the first or second straight pipe portion. In addition, the inventors found that, due to comprehensive improvement effects obtained by appropriately combining each requirement and appropriately changing a condition range of each requirement, preferable characteristics as the liquid pipe coupling universal joint 100 are determined.

That is, preferable ranges of each requirement may be combined with conditional ranges of other requirements to separately and independently change and determine preferable conditional ranges.

Next, configurations of the first coupling structure 4 and the second coupling structure 8 used in the liquid pipe coupling universal joint 100 according to the present invention will be described in more details.

Incidentally, according the present invention, in order to address various problems in the pipe joint of the background art, the inventors made diligent study and repeated many experiments to find a requirement necessary in the configuration of the universal joint to achieve objects of the present invention.

According to the present invention, in order to pursue a preferable configuration of this universal joint, several models were prepared and reviewed considering a plurality of variable factors in the universal joint, such as various ratios of the diameter between the first and second straight pipe portions, diversity of offset lengths between each center axis line of the first and second straight pipe portions and the sphere center point, a ratio of blocking an inner opening space of the downstream-side straight pipe portion and the edge circumference of the upstream-side spherical portion, diversity of the necessary turning angle, and operability of the universal joint itself, or durability such as vibration resistance or earthquake resistance. As a result, it was determined that an ideal universal joint can be obtained by limiting one or some of an angle F between the reference plane T inside the sphere and the center line Z1 or Z2 of the straight pipe portion 1 or 5, a length L from the edge circumference 12 or 13 to the reference plane T, or a ratio of a maximum diameter length R1 or R2 of the inside of the sphere against the diameter X1 or X2 of the pipe portion 1 or 5 to a desired value range.

As a result, a plurality of preferable aspects of the liquid pipe coupling universal joint 100 according to the present invention were obtained.

As a third aspect of the present invention, in the first and second aspects described above, the edge circumference of the first or second fitting portion is formed apart from the reference plane by 15 to 25%, and more preferably, 20% of the maximum diameter length of the reference plane. As a fourth aspect of the present invention, in the first to third aspects, the angle F between the straight line obtained by linking the sphere center and the center line portion of the straight pipe portion and the center line portion of the straight pipe portion is reduced to a range of 30° to 62°.

As a fifth aspect of the present invention, in the first to fourth aspects described above, the angle F between the straight line obtained by linking the sphere center and the center line portion of the straight pipe portion and the center line portion of the straight pipe portion is reduced to a range of 38° to 52° and more preferably to 45°.

As a sixth aspect of the present invention, for the liquid pipe coupling universal joint 100, an edge circumference of the first or second fitting portion is formed in a position separated from the reference plane by 20% of the maximum diameter length of the spherical portion formed on the reference plane in a direction opposite to a part where the straight pipe portion is connected, as seen in a cross-sectional side view on a first plane formed by the sphere center and the center axis line of the first or second straight pipe portion, the reference plane inside the sphere being formed on a second plane perpendicular to the first plane including a straight line having an angle range of 38° to 52° with the center line portion as a straight line formed by linking the sphere center and the center line portion of the straight pipe portion, and the spherical body portion of the first or second fitting portion has a maximum diameter set to be 1.2 to 2.0 times larger than the diameter of the first or second straight pipe portion. As a seventh aspect of the present invention, in the sixth aspect described above, the spherical body portion of the first or second fitting portion has a maximum diameter set to be 1.6 times larger than the diameter of the first or second straight pipe portion. As an eighth aspect of the present invention, in the sixth or seventh aspect described above, the angle between the center line portion of the straight pipe portion and the straight line obtained by linking the sphere center and the center line portion of straight pipe portion is set to 45°.

As a ninth aspect of the present invention, for the liquid pipe coupling universal joint 100, the edge circumference of the first or second fitting portion is formed in a position separated from the reference plane by 21 to 23% of the maximum diameter length of the reference plane, and the spherical body portion of the first or second fitting portion has a maximum diameter set to be 1.5 to 1.7 times larger than the diameter of the first or second straight pipe portion. As a tenth aspect of the present invention, in the ninth aspect described above, for the liquid pipe coupling universal joint 100, the angle between the center line portion of the straight pipe portion and the straight line obtained by linking the sphere center and the center line portion of straight pipe portion is set to 38° to 68°, and more preferably 40° to 65°.

Each aspect of the present invention will now be described in more details with reference to the accompanying tables and drawings.

Specifically, FIG. 2(A) is a side view for describing a configuration of the first coupling structure 4 according to the present invention, and FIG. 2(B) is a perspective view of FIG. 2(A).

In the first coupling structure 4 according to the present invention, an inclination state of the reference surface T is displayed as a straight line W0 obtained by linking the sphere center P and the center line portion Z1 of the straight pipe portion 1 or 5 as seen in a cross-sectional side view on the first plane S1 formed by the sphere center P and the center axis line Z1 of the first straight pipe portion 1, and the angle F between the straight line W0 and the center line portion Z1 is set to a predetermined value. In addition, in FIG. 2(B), a line B-4 is a connection line indicating a coupling portion between the first straight pipe portion 1 and the spherical portion 2.

Incidentally, a basic structure of the first coupling structure 4 is similar to that described above. In particular, the maximum diameter R1 of the spherical curved portion of the first fitting portion 3 is preferably set to 1.5 to 1.7 times larger than the diameter X1 of the first straight pipe portion. More preferably, the maximum diameter R1 of the spherical curved portion is set to 1.6 times larger than the diameter X1 of the first straight pipe portion.

If the aforementioned ratio R1/X1 is equal to or smaller than "1.5," and the ratio R1/X1 is between "1.2" and "1.5," the effect may be slightly reduced. However, if the ratio R1/X1 is equal to or smaller than "1.2," it is difficult to obtain a practical functional effect. Furthermore, there is no substantial difference between the maximum diameter R1 of the spherical curved portion and the diameter X1 of the first straight pipe portion. As a result, the turning angle of the second straight pipe portion 5 is significantly restricted, and turning over a universal angle of 90° becomes impossible. That is, the angle range is reduced, and an area of the overlapping region between the first fitting portion 3 and the second fitting portion 7 is reduced, so that it is difficult to arrange the packing 15 as described below. In addition, a strength on the contact surface between a pair of spherical bodies is degraded, and turning operation stability is reduced. Therefore, a strength of the universal joint itself or stability in use is remarkably degraded disadvantageously.

Meanwhile, if the ratio R1/X1 is equal to or larger than "1.7," a substantial difference between the maximum diameter R1 of the spherical curved portion and the diameter X1 of the first straight pipe portion increases, and the spherical portion becomes larger. As a result, the turning angle of the second straight pipe portion 5 increases. However, a coupling area of an installation portion between the spherical portion of the first fitting portion 3 and the first straight pipe portion is reduced, and the strength is weakened. Therefore, the strength or durability of the entire universal joint is degraded disadvantageously.

Naturally, until the ratio R1/X1 reaches "2.0," it exhibits a moderate function degradation state.

For this reason, it is necessary to provide a stopper disadvantageously.

Furthermore, under such conditions, if it is desired to increase the diameter X1 of the first straight pipe portion, the diameter of the spherical portion of the first fitting portion 3 extremely increases, and the size of the universal joint itself also increases. Therefore, the manufacturing cost increases, and a use region, that is, the space where the pipe can be mounted is useless unless it is large. Accordingly, freedom of the construction condition is significantly restricted disadvantageously.

As described above, according to the present invention, the inventors made diligent efforts to study the samples by individually changing various combination conditions. As a result, a sample having a ratio R1/X1 of "1.6" exhibits most desirable characteristics. Therefore, it was determined that an optimal value of the ratio R1/X1 is "1.6."

Therefore, according to the present invention, this ratio R1/X1 is set to "1.2 to 2.0," preferably "1.5 to 1.7," and more preferably "1.6."

Figure 2:
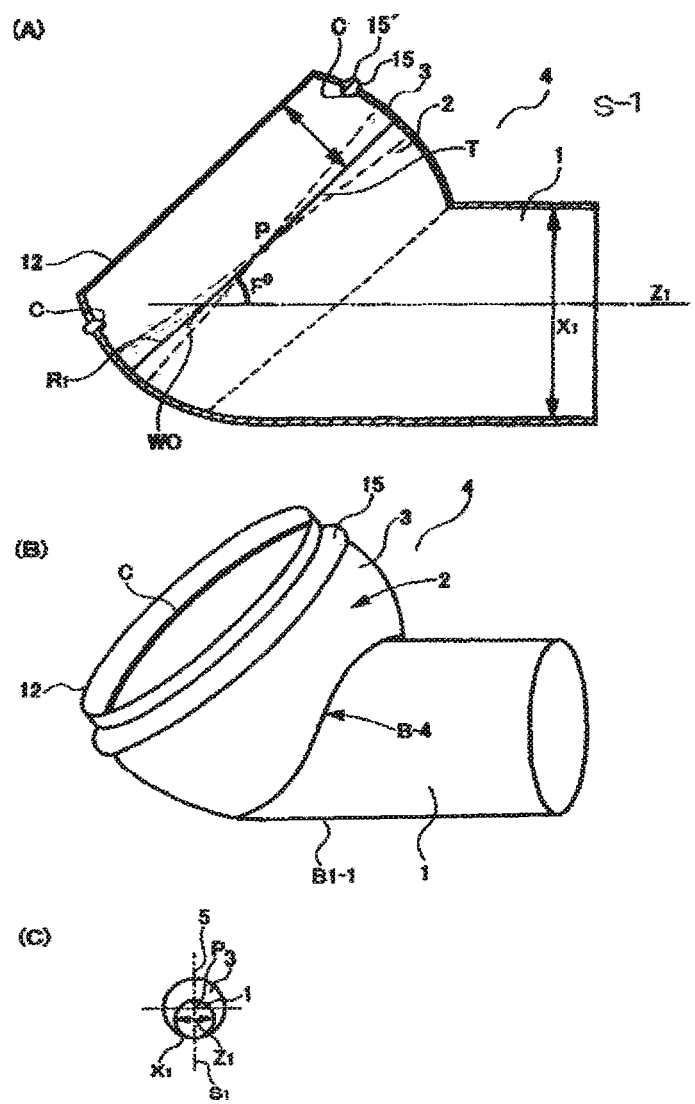
FIGS. 2(A) to 2(C) are a vertical cross-sectional view and a perspective view illustrating an exemplary configuration of a first coupling structure including a first fitting portion of the liquid pipe coupling universal joint 100 according to an embodiment of the invention.
Figure 3:
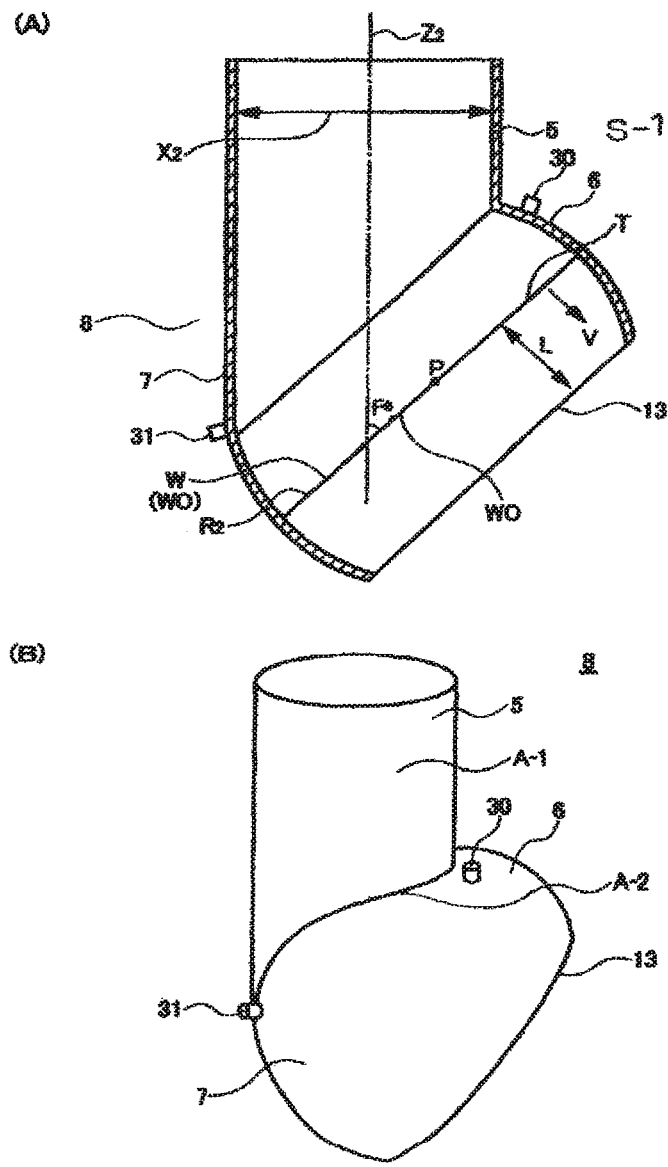
FIGS. 3(A) and 3(B) are a vertical cross-sectional view and a perspective view illustrating an exemplary configuration of a second coupling structure including a second fitting portion of the liquid pipe coupling universal joint 100 according to an embodiment of the present invention.

Meanwhile, in the configuration of the second coupling structure 8 according to an embodiment of the present invention, as illustrated in the side view and the perspective view of FIGS. 3(A) and 3(B), a basic configuration is substantially similar to that of the first coupling structure 4 of FIGS. 2(A) to 2(C), and the ratio R2/X2 is set to "1.2 to 2.0," preferably "1.5 to 1.7," and more preferably "1.6."

According to the present invention, if the characteristic value is set to "1.5 to 1.7 times," it is possible to freely employ a sufficient large value for the maximum angle or the rotation angle and form the overlapping portion in a sufficiently large area. Therefore, it is possible to obtain a robust universal joint.

Specifically, in the second coupling structure 8 according to the present invention, as seen in a cross-sectional side view on the first plane S1 formed by the sphere center P and the center axis line Z2 of the second straight pipe portion 5 on the reference surface T, the straight line W0 obtained by linking the sphere center P and the center line portion Z2 of the straight pipe portion 5 is set to make a predetermined angle F with the center line portion Z2 as described above. In addition, in FIG. 3(B), the line A-2 is a connection line indicating a coupling portion between the second straight pipe portion 5 and the spherical portion 6.

However, in FIGS. 3(A) and 3(B), an outer diameter of the spherical portion 6 of the second coupling structure 8 is preferably set to be slightly smaller than the inner diameter of the spherical portion 6 of the first coupling structure 4 of FIGS. 2(A) to 2(C).

In a coupling portion between each of the straight pipe portions 1 and 5 and each of the coupling structures 4 and 8 in each of the first and second coupling structures 4 and 8, at least the centers P of the spherical portions 2 and 6 of the first and second coupling structures 4 and 8 are offset from the center axis lines Z1 and Z2 of the straight pipe portions 1 and 5, respectively. Meanwhile, at least a part of the straight pipe portion 1 and 5 is preferably connected to a part of the curved portion of the outer surface of the spherical portions 2 and 6, respectively, to form a smooth continuous surface.

Figure 4:
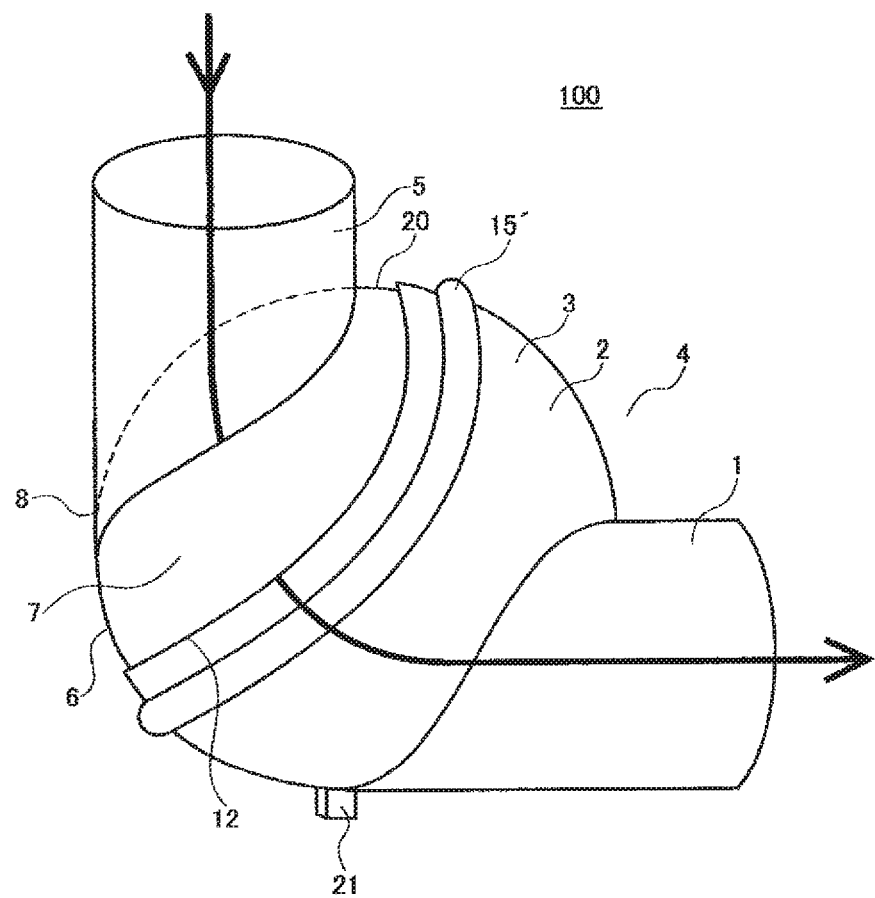
FIG. 4 is a perspective view illustrating an exemplary configuration of the liquid pipe coupling universal joint of FIG. 1 according to the present invention.

FIG. 4 is a perspective view illustrating a universal joint formed by fitting the spherical portions 2 and 6 of the first and second fitting portions 3 and 8, respectively, to each other according to the present invention.

Here, Table 1 shows possible values of the diameter X1 of the first straight pipe portion and the diameter X2 of the second straight pipe portion at the maximum diameter R1 of the spherical curved portion and the second coupling structure 8 when the ratio R1/X1 between the maximum diameter R1 of the spherical curved portion 2 of the first coupling structure 4 and the diameter X1 of the first straight pipe portion according to the present invention is set to "1.6," and the first straight pipe portion is provided in the downstream side.

TABLE 1

| X2 mm | R1 mm | X1 mm |
|-------|-------|-------|
| 50 | 80 | 50 |
| 50 | 120 | 75 |
| 75 | 160 | 100 |
| 100 | 200 | 125 |
| 125 | 240 | 150 |
| 150 | 280 | 175 |
| 175 | 320 | 200 |
| 200 | 400 | 250 |
| 250 | 480 | 300 |
| 300 | 550 | 350 |
| 350 | 640 | 400 |

As a setting condition of the present invention, for example, assuming that the length L of the straight line from the reference surface T to the edge circumference 12 or 13 is set to 20% of the maximum diameter R1 or R2 of the spherical portion, and the inclination angle F of the reference surface T against the center axis line of the straight pipe portion is set to 45°, if the angle Q1 described below is set to 89° to 111°, and the angle Q2 described below is set to 159° to 187°, the allowable angle range becomes 28°. In addition, the angle Q3 becomes 106°, so that a semi-omnidirectional turning capability can be obtained.

Similarly, if the straight line length L from the reference surface T to the edge circumference 12 or 13 is set to 21 to 23% of the maximum diameter R1 or R2 of the spherical portion, and the inclination angle F of the reference surface T against the center axis line of the straight pipe portion is set to 45°, the angle Q1 described below becomes 160° to 187°, the angle Q2 becomes 86° to 110°, and the allowable ranges of each angle become 24 to 25°, so that a total angle variation range becomes 101°. In addition, the angle Q3 becomes 106°, so that a semi-omnidirectional turning capability can be obtained.

Next, as one of important factors of other technical characteristics of the present invention, an overlapping area number between the spherical bodies 2 and 6 of the first and second coupling structures 4 and 8 will be described. The overlapping area number between the spherical bodies 2 and 6 is necessary to secure stable turnability of the universal joint and significantly influences on durability and strength. Although the larger mutual contact surface area is desirable, there are some restrictions in terms of the manufacturing cost or the manufacturing process. Therefore, an immoderately large overlapping area is not desirable.

According to the present invention, as a determination reference for the overlapping area number between a curved outer surface of one of the spherical bodies 2 and 6 and a curved inner surface of the other spherical body 2 or 6, a "length L of the straight line W obtained by linking the sphere center P and the center line portions Z1 or Z2 of the straight pipe portion 1 or 5 toward a direction V opposite to the side where the straight pipe portion 1 or 2 is connected from the reference plane T inside the sphere formed on the second plane S2 perpendicular to the first plane S1 including the straight line W0 set at a predetermined angle F with the center line portion Z1 or Z2" is employed.

This length L is to be measured along the curved surface of the spherical portion in practice. However, according the present invention, in order to simplify a measurement operation, the length L is defined as a length from the reference surface T to the edge circumference 12 or 13 as seen in a side view on the first plane S1 as illustrated in FIG. 1.

Next, the inventors pursued a preferable allowable range of the length L on the basis of a number of experimental results as described above.

That is, as this length L increases, the overlapping area increases. This is advantageous in terms of strength or stability of operation. However, there is a restriction in terms of technical or maintenance factors or manufacturing cost. In addition, if this length L is set to an excessively small value, the structure may be weakened. Therefore, it is necessary to set a suitable range of this length L.

That is, if the length L parallel to the reference plane T inside the sphere and separated from the reference plane T inside the sphere as a setting position of the edge circumference 12 is set to, for example, 10% of the maximum diameter length R1 of the spherical portion, an interval between the reference plane T inside the sphere and the edge circumference 12 is excessively shortened. In addition, the overlapping area between the spherical portions of the first and second fitting portions 3 and 7 is excessively reduced. As a result, it becomes difficult to arrange the packing 15. Since the overlapping area is reduced, a sliding motion between the fitting portions becomes unstable, and the coupling strength is weakened. Therefore, the sphere of the fitting portion itself may be easily fractured or removed disadvantageously.

Meanwhile, if the length L parallel to the reference plane T inside the sphere and separated from the reference plane T inside the sphere is set to 30% or longer than the maximum diameter length R1 of the spherical portion, the turning angle between the first and second straight pipe portions 1 and 5 described above is significantly restricted. Therefore, freedom in construction works is remarkably reduced, and the overlapping area between the spherical portions of the first and second fitting portions 3 and 7 increases. Therefore, it is possible to address problems regarding strength or unstable sliding described above. However, the manufacturing cost increases, and the universal angle is excessively reduced. As a result, universal turning from 90° becomes difficult, so that operability is extremely degraded disadvantageously.

Figure 6:
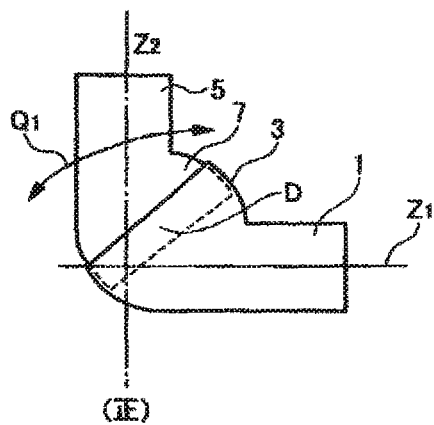
FIGS. 6(A) to 6(D) are diagrams for describing a turning range of the straight pipe portion 5 against the straight pipe portion 1 according to the present invention.
Figure 6:
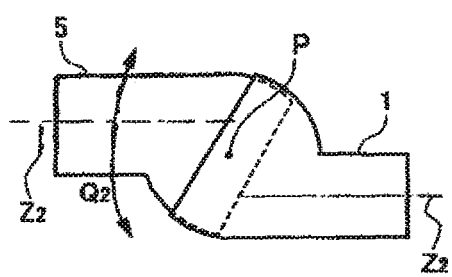
Figure 6:
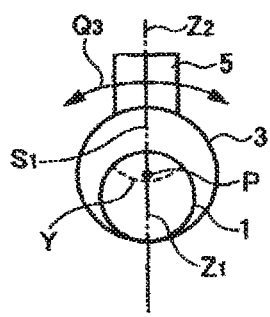
Figure 6:
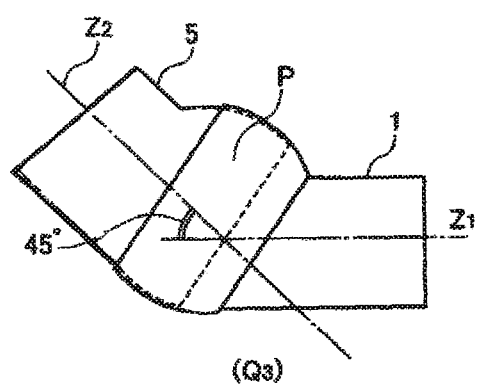

Further, if this length L is set to 30% or longer, for example, as illustrated in FIG. 6(C), a part of the edge circumference 13 of the second straight pipe portion 5 intrudes to the inside of the opening of the first straight pipe portion 1 as indicated by the dotted line Y. As a result, a flowing liquid flow is significantly hindered, so that a flow function inside the pipe may be failed. Therefore, it is necessary to set the condition such that relating problems do not occur.

On the basis of this finding, the inventors performed various experiments in more details. As a result, the inventors concluded that, in order to clear all such problems, it is necessary to set the length L according to the present invention to at least 10 to 30%, preferably 15 to 25%, and more preferably 20% of the maximum diameter length R1 of the spherical portion formed on the reference plane T.

That is, according to the present invention, an enlarged spherical portion for providing the edge circumference 12 is positively provided beyond the reference plane T (at the maximum inner diameter portion inside the spherical portion) as described above. Therefore, it was confirmed that the objects of the present invention can be more reliably achieved.

That is, according to the present invention, for this technical requirement, the characteristic value determined as being most effective is set to 20%. Therefore, it is possible to prevent a gap or a crack from being generated in an overlapping portion between both spherical bodies in a part of the universal joint during use. In addition, there is no risk of water leakage or damage of the product.

Meanwhile, if this characteristic value is set to 20% or smaller, the universal joint having the characteristic value of, for example, 15 to 19% has excellent functional effects according to the present invention, compared to the background art, as apparent from the original specification of this application. If evaluation is made by assuming a more ideal universal joint, a gap or a crack is not easily generated in the overlapping area between both spherical bodies in a part of the universal joint, compared to a case where the characteristic value is set to 20%. However, there may be a risk of water leakage or damage of the product, but it is negligible in terms of practicality.

However, if this characteristic value becomes 15% or smaller, the overlapping portion is reduced. Therefore, it is difficult to sufficiently secure an overlapping state to 20% omnidirectionally and a portion for arranging a packing material.

Meanwhile, if this characteristic value becomes 21% or larger, naturally, as apparent from the specification of this application described above, the universal joint having the characteristic value of, for example, 21 to 25% may have slightly degraded function, compared to the universal joint having the characteristic value of 20%. However, it is true that, compared to the background art, the universal joint having the characteristic value of, for example, 21 to 25% still has excellent functional effects. Although a fracture strength or a tensile strength increases, the turning angle or the rotation angle is relatively reduced. In addition, if evaluation is performed in terms of more ideal universal joint, in particular, for the characteristic value set to 26% or larger, the fracture strength or the tensile strength increases, but the turning angle or the rotation angle is reduced considerably. Therefore, a product value of the universal joint is significantly reduces, and it may be difficult to manufacture the universal joint in terms of structure disadvantageously.

However, if this characteristic value is set to a range of 21 to 23%, it is still possible to obtain a sufficiently ideal universal joint compared to the case where the characteristic value is set to 20% through experiments or the like. In addition, compared to other characteristic value ranges, considerable high performance can be obtained needless to say.

That is, according to the present invention, as described above, the edge circumference 12 is provided in a part exceeding the reference plane T (a part corresponding to the maximum inner diameter inside the sphere). Therefore, it was recognized that the objects of the present can be more reliably achieved by actively providing an enlarged spherical portion.

According to the present invention, although the first coupling structure 4 has been described, such essential requirements are naturally similarly applied to the second coupling structure 8. In addition, the functional effects of the present invention can be reliably achieved when any one of the coupling structures 4 and 8 has the aforementioned spherical structure.

Therefore, according to the present invention, the overlapping portion between the first and second fitting portions is formed in an area approximately twice the area of the outer surface formed between the reference plane of the first or second fitting portion and the edge circumference.

Note that, according to the present invention, while the maximum diameter lengths R1 and R2 of the spherical portion are substantially the same, the maximum diameter length R2 of the spherical portion is typically set to be smaller than the maximum diameter R1 of the first coupling structure 4 by a thickness of the corresponding member, for example, 0.3 to 1.5 mm, and preferably 0.3 to 1.0 mm.

Next, a desirable allowable setting value of the inclination angle F of the reference plane T against the center axis line Z1 or Z2 of the straight pipe portion 1 was studied according to the present invention.

Specifically, as seen in a side view on the plane S1 including the center P of the spherical portions 2 and 6 and the center axis line Z1 or Z2 of the straight pipe portion 1, the reference plane T passes through the center P of the spherical portion and is perpendicular to the plans S as described above. In addition, the reference plane T is formed on a second plane S2 including the straight line W intersecting with the center axis line Z1 of the straight pipe portion 1 at a predetermined angle F. This predetermined angle F is not particularly limited. By appropriately changing the angle F, for example, a plurality of straight lines W0, W1, and W2 can be formed as illustrated in FIG. 1.

According to the present invention, the inventors believed that the allowable turning range between the straight pipe portions 1 and 5 can be set to an optimal value by changing the predetermined angle F. In order to check this allowable range, various experiments using various models were performed as described below.

Incidentally, as described above, according to the present invention, it is difficult to uniquely determine the intersecting angle F between the reference surface T and the center axis line Z1 or Z2 of any straight pipe portion 1 or 5. In addition, the essential requirements such as the ratio of the diameters of the first and second straight pipe portions 1 and 5, the overlapping area number between the spherical bodies 2 and 6 of the first and second coupling structures 4 and 8, or the ratio between the diameter of the first or second straight pipe portion 1 or 5 and the maximum diameter of the spherical body portion 2 or 6 of the first or second fitting portion can be changed within a desired range. Furthermore, various changes can be made for each combination of the requirements. In addition to such a combination of the requirements, it is necessary to consider a requirement that the edge circumference 13 is not allowed to intrude the upstream-side straight pipe portion inside the internal opening area of the downstream-side straight pipe portion. It is necessary to pursue an optimal requirement from such a complicated relationship.

For this reason, as described above, the inventors manufactured an amount of model samples of the universal joints by changing and combining each requirement within an executable range and checked characteristics such as turnability, a turnable range, an anti-fracture strength, and durability. As a result of the analysis of such abundant test data, the inventors found that an ideal universal joint is obtained by restricting the overlapping area number between the spherical bodies 2 and 6 in the first and second coupling structures 4 and 8, the ratio between the diameter of the straight pipe portion 1 or 5 and the maximum diameter of the spherical body 2 or 6, and the intersecting angle between the reference surface T and the center axis line of the straight pipe portion within a particular range.

Here, the inventors established a check criteria for checking deflection between the first and second straight pipe portions, the turning degree, and its allowable range, and the like in each universal joint 100 as follows through many experiments described above and used it as a basis for analysis of each experiment and their results.

That is, as illustrated in FIGS. 6(A) to 6(D), the inventors established criteria for fixing one of the straight pipe portions and measuring a turning degree and a turning direction of the other straight pipe portion as follows.

Specifically, as illustrated in FIG. 6(A), in the side view on the plane S1, assuming that the setting angle between the center axis line Z1 of the first straight pipe portion 1 and the center axis line Z2 of the second straight pipe portion 5 is set to 90°, the original turning angle Q1 was established as a turning angle of the second straight pipe portion 5 with respect to the center point P of the spherical portion 2 and the setting angle. In addition, as illustrated in FIG. 6(B), assuming that the setting angles between the center axis line Z1 of the first straight pipe portion 1 and the center axis line Z2 of the second straight pipe portion 5 are parallel to each other (that is, the angle between both axial lines is set to 180°), a reverse turning angle Q2 was established as a turning angle of the second straight pipe portion 5 with respect to the center point P of the spherical portion 2. Furthermore, as illustrated in the front view of FIG. 6(C) and the side view of FIG. 6(D), a left-right turning angle Q3 was established as a turning angle of the second straight pipe portion 5 as seen in a front view of the side view (FIG. 6(D)) on the plane S2 perpendicular to the plane S1 while the center axis Z2 of the second straight pipe portion 5 is sloped, for example, by 45° with respect to the center axis line Z1 of the first straight pipe portion 1 out of the setting condition of FIG. 6(A). Moreover, the allowable ranges of the turning angles Q1, Q2, and Q3 were individually measured.

Figure 5:
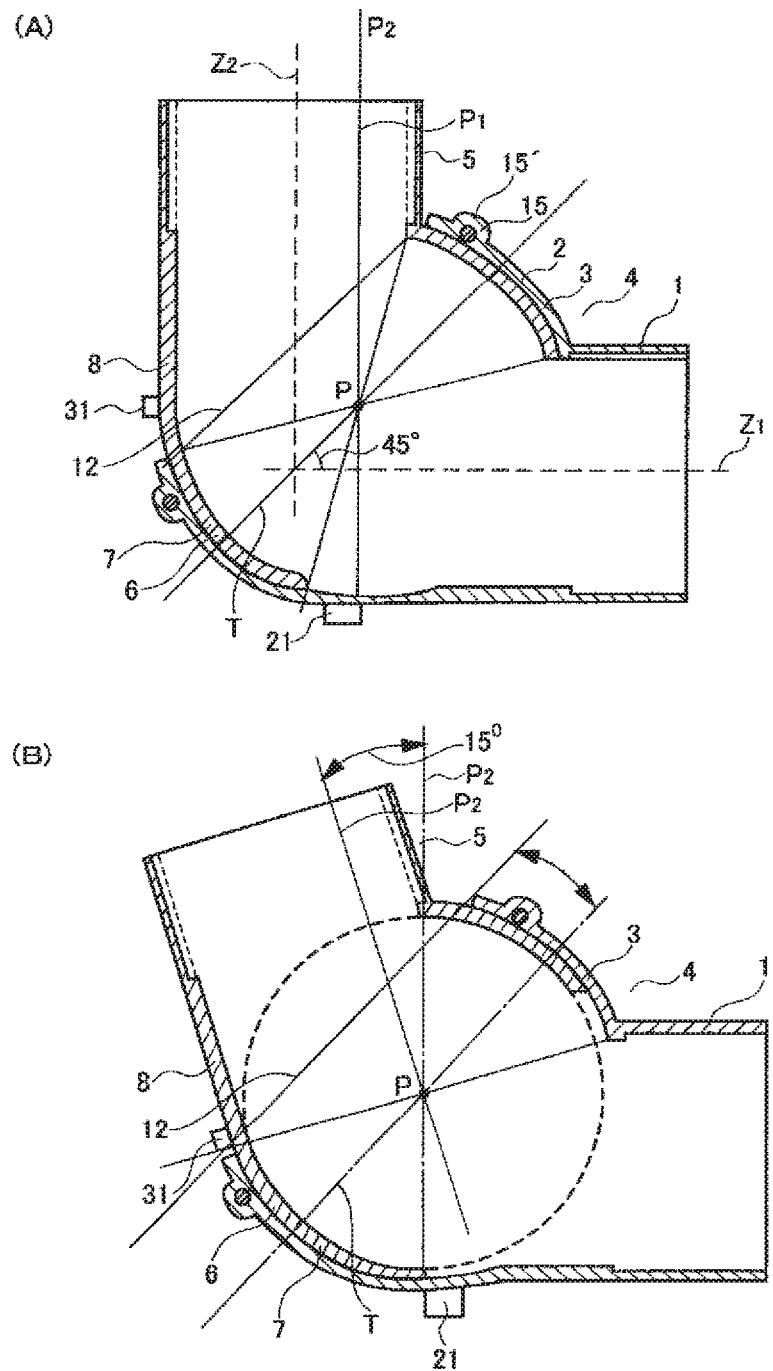
FIGS. 5(A) and 5(B) are cross-sectional views illustrating a method of adjusting and setting a deflection angle between a first straight pipe portion and a second straight pipe portion of the liquid pipe coupling universal joint according to an embodiment of the invention.
Figure 7:
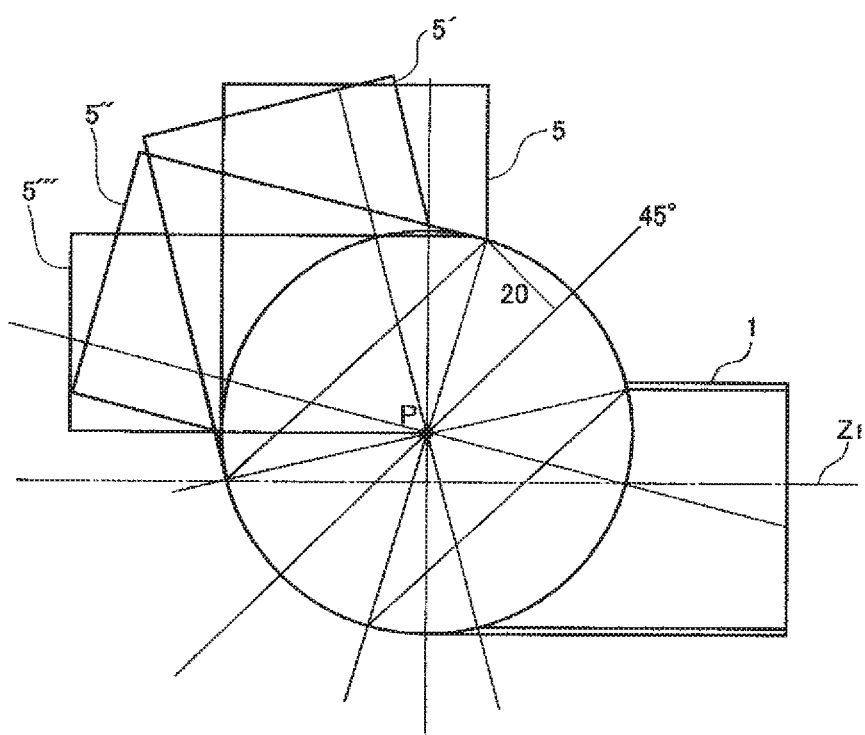
FIG. 7 is a cross-sectional view illustrating a method of adjusting and setting a deflection angle between the first straight pipe portion and the second straight pipe portion of the liquid pipe coupling universal joint according to another embodiment of the invention.

Now, using various data obtained through various experiments described above, an exemplary principle that can be used to investigate and study whether or not a straight pipe coupling mechanism obtained by fitting the first and second coupling structures 4 and 8 in the liquid pipe coupling universal joint 100 according to the present invention has a configuration capable of widely, semi-omnidirectionally, and easily adjusting and changing a deflection angle in a connecting portion between the straight pipe portions 1 and 5 individually connected to the fitting portions 3 and 7, respectively, by a precise angle will be described in details with reference to FIGS. 5(A), 5(B), and 7.

That is, FIG. 5(A) illustrates a state that, in a basic configuration of the liquid pipe coupling universal joint 100 according to the present invention, in which the angle F between the reference plane T and the center axis line Z1 of the first straight pipe portion 1 (inner diameter of 80φ) is set to 45°, both straight pipe portions 1 and 5 are deflected such that the center axis line Z1 of the first straight pipe portion 1 connected to the first fitting portion 3 and the center axis line Z2 of the second straight pipe portion 5 (inner diameter of 50φ) connected to the second fitting portion 7 are perpendicular to each other as seen in a side view on the first plane S1.

Meanwhile, FIG. 5(B) illustrates a liquid pipe coupling universal joint 100 according to the present invention of FIG. 5(A), in which under the same condition as that of FIG. 5(A), the center axis line Z1 of the first straight pipe portion 1 connected to the first fitting portion 3 and the center axis line Z2 of the second straight pipe portion 5 connected to the second fitting portion 7 are arranged such that the reference line P2 provided in parallel with the center axis line Z2 of the second straight pipe portion 5 through the center point P of the curved sphere is turned at an angle of approximately 15° to the left with respect to the center point P of the curved sphere in FIG. 5(B), that is, the original turning angle Q1 is 15° as seen in a side view on the first plane S1.

Meanwhile, in FIGS. 5(A) and 5(B), as seen in a side view on the first plane S1, a bending allowance angle of the second straight pipe portion 5 with respect to the first straight pipe portion 1 becomes "15°" at most. However, in a basic technical configuration of the present invention, the turning angle can be expanded by combining turning, pivoting, and sliding between the first and second fitting portions 2 and 7. Specifically, for example, as illustrated in FIG. 7, out of the bending angles between the first straight pipe portion 1 of the second straight pipe portion 5, an original turning angle Q1 is set to "90 to 105°," and the reverse turning angle Q2 is set to "165 to 180°." Therefore, the turning angle can be changed arbitrarily between 90° and 180°. It is possible to obtain remarkable freedom regarding the bending angle.

Incidentally, according to the present invention, it is difficult to solely determine the requirement regarding the angle between the straight line obtained by linking the sphere center and the center axis line of the straight pipe portion and the center axis line of the straight pipe portion. This requirement may be determined by considering a combination relationship with other two requirements.

That is, if the angle F is set to 30° or smaller, the turning angle range for turning the second straight pipe portion 5 against the first straight pipe portion 1 becomes large. However, reversely, an overlapping area (range) on the same sphere between the first and second fitting portions is reduced. As a result, for example, it is difficult to set a packing 15 and make a robust and stable sliding motion between both the fitting portions disadvantageously.

Meanwhile, if this angle F is set to 68° or larger, the turning angle range of the second straight pipe portion 5 against the first straight pipe portion 1 is significantly reduced, so that it becomes impossible to set an arbitrary turning angle between the first and second straight pipe portions 1 and 5 as a universal joint disadvantageously.

Therefore, according to the present invention, it is preferable to set the angle F to a range of 30° to 68°. Considering the experimental results from the inventors, it was concluded that the angle F is preferably set to 30° to 62°, more preferably 38° to 52°, and most preferably 45°.

However, as a result of further intensive and extensive studies by the inventors, it was found that, if a characteristic value of the length L parallel to the reference plane T inside the sphere and separated from the reference plane T inside the sphere as a setting position of the edge circumference 12 is set to, for example, 21 to 23% of the maximum diameter length R1 of the spherical portion, unexpectedly, it was possible to turn, rotate, or shift the straight pipe portion more widely by setting the angle F to 38° to 68°, and preferably 40° to 65°.

Therefore, as another aspect of the present invention, the angle F is preferably set to 38° to 68°, and more preferably 40° to 65°.

The liquid pipe coupling universal joint according to the present invention is obtained by combining the novel and inventive technical requirements. As a result, in a construction site, it is possible to freely, rapidly, and easily set the first and second straight pipe portions to the required turning and/or rotation angle. This obviously means a semi-omni-directional liquid pipe coupling universal joint that had never existed before.

In other words, since the liquid pipe coupling universal joint according to the present invention is obtained by combining the novel and inventive technical requirements described above, basically, in a construction site where the ends of the liquid pipes are to be coupled to each other, it is possible to freely and very easily set the setting angle and the setting direction by combining sliding, rotating, or turning motions of the first and second straight pipe portions depending on the required angle and direction, that is, the setting angle and the setting direction required between the first and second straight pipe portions in order to effectively connect ends of the liquid pipes to each other on the basis of positional relationships between the liquid pipes facing each other for a coupling construction work in the construction site.

That is, using the liquid pipe coupling universal joint according to the present invention, it is possible to change an arrangement state between the straight pipe portions so as to freely, easily, and rapidly match the shape depending on the setting direction and the setting angle required in a construction site.

On the basis of the results of the allowable range of each essential requirements described above according to the present invention, many experimental results as described above and will be described below in conjunction with Tables 2 to 11 and FIGS. 8 to 14 and 24 to 39 were reviewed to know what is an allowable range of the inclination angle F of the straight pipe portion 1 or 5 of the reference surface T with respect to the center axis line Z1 or Z2 according to the present invention.

Specifically, Table 2 shows a result of the experiment when the setting angle F is set to "38°," the diameter X1 of the first straight pipe portion 1 is changed from 50 mm to 600 mm, the maximum diameter R1 of the spherical portion of the first fitting portion 3 is changed from 80 mm to 960 mm, the length L between the reference plane T inside the sphere and the edge circumference 12 is set to 20% of the maximum diameter R1 of the spherical portion, and the ratio R1/X1 of the maximum diameter R1 of the spherical portion against the diameter X1 of the straight pipe portion 1 is set to "1.6." In this experimental result of FIG. 2, if the original turning angle Q1 of the second straight pipe portion 5 defied as described above is set to 75° to 103°, the allowable turning angle is set to 28°. In addition, if the reverse turning angle Q2 is set to 150° to 178°, the allowable turning angle is set to 28°. Furthermore, if the left-right turning angle Q3 is set to 37° to 143°, the allowable turning angle is set to 106°.

Figure 8:
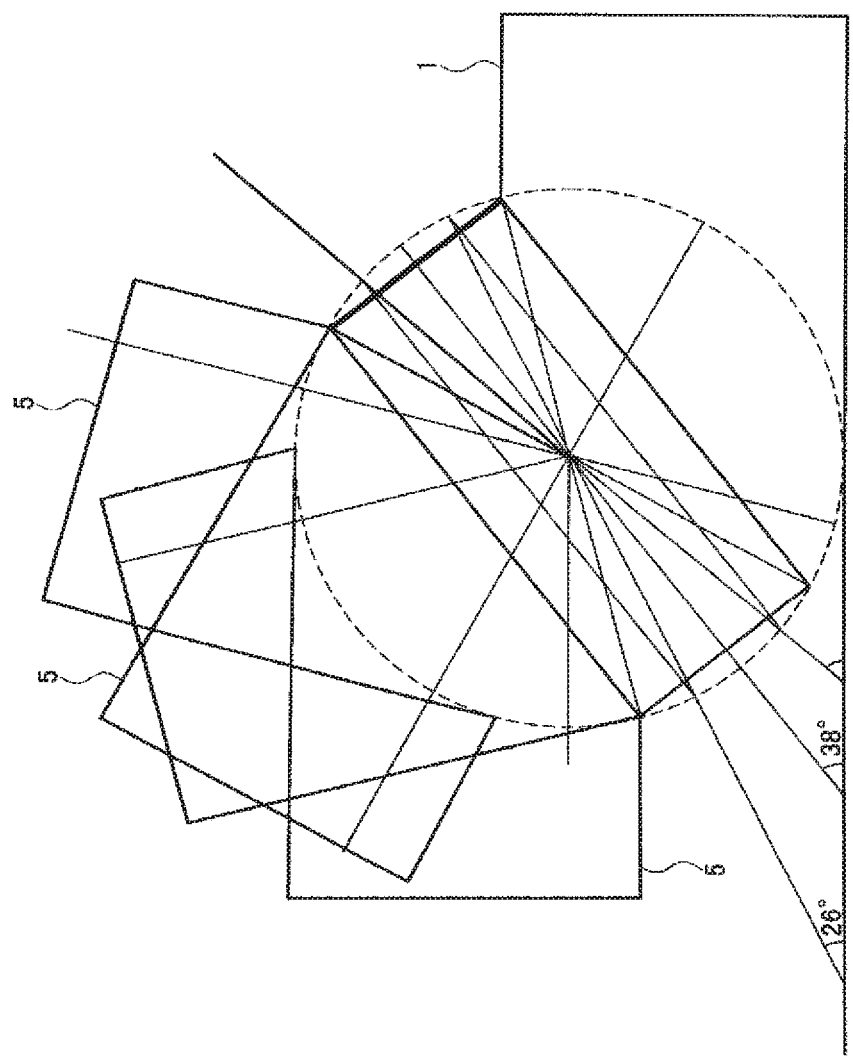
FIG. 8 is a cross-sectional view illustrating a method of adjusting and setting a deflection angle between the first straight pipe portion and the second straight pipe portion of the liquid channel universal pipe joint according to further another embodiment of the invention.

FIG. 8 is a diagram illustrates how the second straight pipe portion 5 can turn with respect to the first straight pipe portion 1 in the aforementioned experiment.

Focusing on the results, even when the aforementioned setting conditions are changed, there is no significant influence on the turnability, and it is conceived that the setting angle F exerts a large functional influence.

Next, Table 3 shows a result of the experiment when the setting angle F is set to 45°, the diameter X1 of the first straight pipe portion 1 is changed from 50 mm to 600 mm, the maximum diameter R1 of the spherical portion of the first fitting portion 3 is changed from 80 mm to 960 mm, the length L between the reference plane T inside the sphere and the edge circumference 12 is set to 20% of the maximum diameter R1 of the spherical portion, and the ratio R1/X1 of the maximum diameter R1 of the spherical portion against the diameter X1 of the straight pipe portion 1 is set to 1.6. Referring to the experimental result of Table 3, if the original turning angle Q1 of the second straight pipe portion 5 defined as described above is set to 83° to 110°, the allowable turning angle is set to 28°. In addition, if the reverse turning angle Q2 is set to 159° to 187°, the allowable turning angle is set to 28°. Furthermore, if the left-right turning angle Q3 is set to 37° to 143°, the allowable turning angle is set to 106°.

Figure 9:
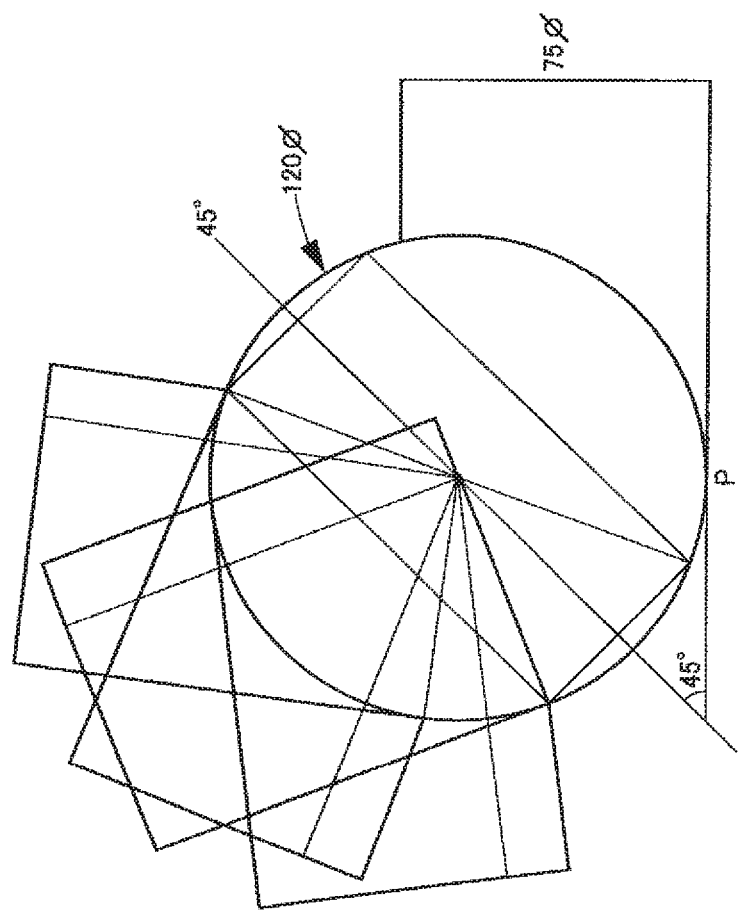
FIG. 9 is a cross-sectional view illustrating a method of adjusting and setting a deflection angle between the first straight pipe portion and the second straight pipe portion of the liquid pipe coupling universal joint according to another embodiment of the invention.

FIG. 9 is a diagram illustrating how the second straight pipe portion 5 can be turned with respect to the first straight pipe portion 1 in the aforementioned experiment.

Meanwhile, Table 4 shows a result of the experiment when the setting angle F is set to 54°, the diameter X1 of the first straight pipe portion 1 is changed from 50 mm to 600 mm, the maximum diameter R1 of the spherical portion of the first fitting portion 3 is changed from 80 mm to 960 mm, the length L between the reference plane T inside the sphere and the edge circumference 12 is set to 20% of the maximum diameter R1 of the spherical portion, and the ratio R1/X1 of the maximum diameter R1 of the spherical portion against the diameter X1 of the straight pipe portion 1 is set to 1.6. Referring to the experimental result of Table 4, if the original turning angle Q1 of the second straight pipe portion 5 defined as described above is set to 90° to 118°, the allowable turning angle is set to 28°. In addition, if the reverse turning angle Q2 is set to 165° to 193°, the allowable turning angle is set to 28°. Furthermore, if the left-right turning angle Q3 is set to 37° to 143°, the allowable turning angle is set to 106°.

Figure 10:
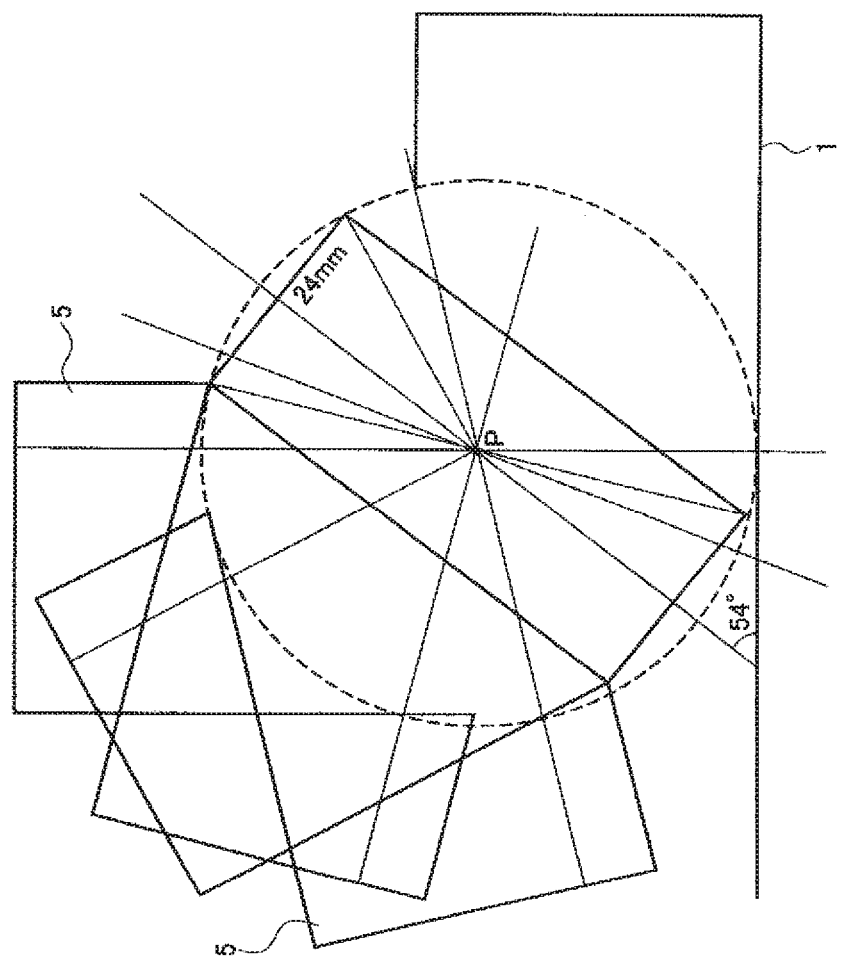
FIG. 10 is a cross-sectional view illustrating a method of adjusting and setting a deflection angle between the first straight pipe portion and the second straight pipe portion of the liquid pipe coupling universal joint according to another embodiment of the invention.

FIG. 10 is a diagram illustrating how the second straight pipe portion 5 can be turned with respect to the first straight pipe portion 1 in the aforementioned experiment.

Further, Table 5 shows a result of the experiment when the setting angle F is set to 38°, the diameter X1 of the first straight pipe portion 1 is changed from 50 mm to 600 mm, the maximum diameter R1 of the spherical portion of the first fitting portion 3 is changed from 80 mm to 960 mm, the length L between the reference plane T inside the sphere and the edge circumference 12 is set to 10% of the maximum diameter R1 of the spherical portion, and the ratio R1/X1 of the maximum diameter R1 of the spherical portion against the diameter X1 of the straight pipe portion 1 is set to 1.6. Referring to the experimental result of Table 5, if the original turning angle Q1 of the second straight pipe portion 5 defined as described above is set to 78° to 102°, the allowable turning angle is set to 24°. In addition, if the reverse turning angle Q2 is set to 168° to 192°, the allowable turning angle is set to 24°. Furthermore, if the left-right turning angle Q3 is set to 37° to 143°, the allowable turning angle is set to 106°.

Figure 11:
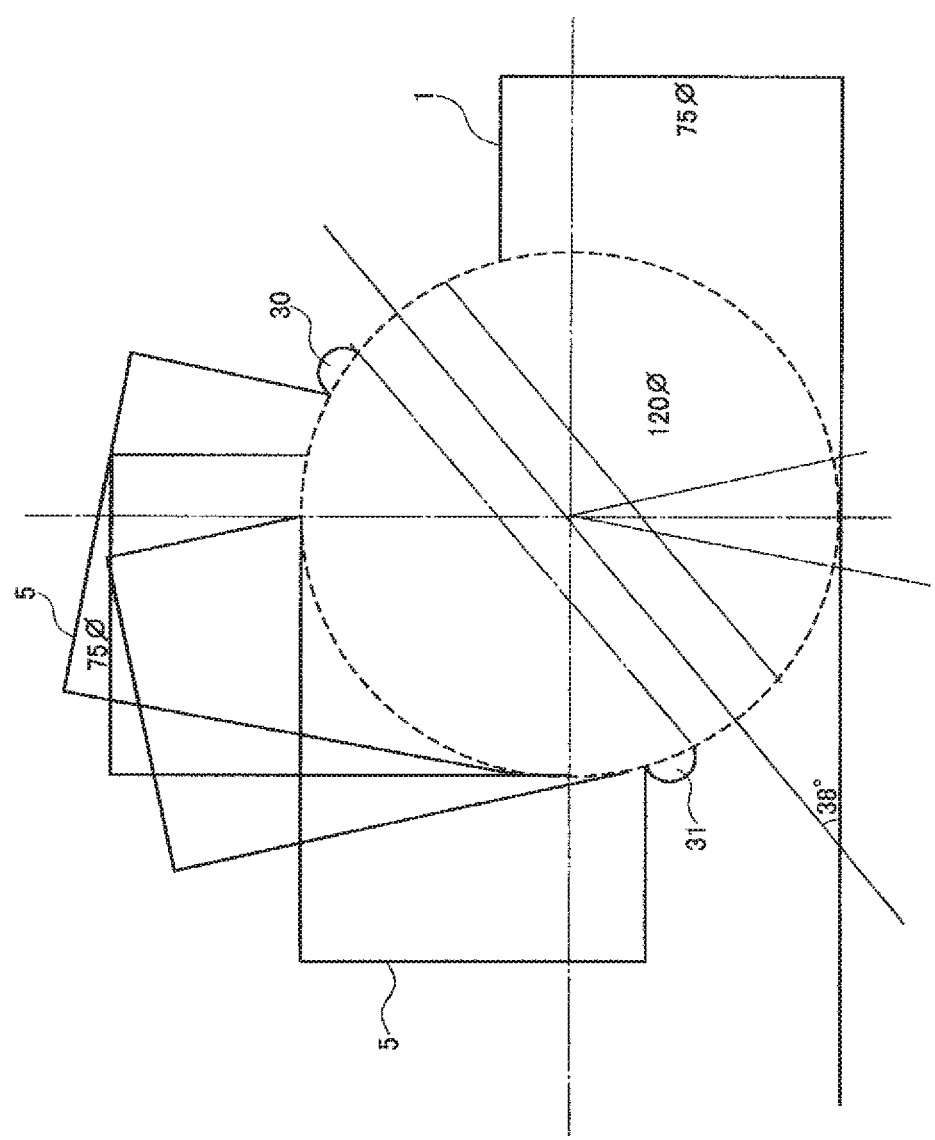
FIG. 11 is a cross-sectional view illustrating a method of adjusting and setting a deflection angle between the first straight pipe portion and the second straight pipe portion of the liquid channel universal pipe joint according to further another embodiment of the invention.

FIG. 11 is a diagram illustrating how the second straight pipe portion 5 can be turned with respect to the first straight pipe portion 1 in the aforementioned experiment.

In this experimental example, it was found that it is necessary to provide a stopper.

Meanwhile, Table 6 shows a result of the experiment when the setting angle F is set to 45°, the diameter X1 of the first straight pipe portion 1 is changed from 50 mm to 600 mm, the maximum diameter R1 of the spherical portion of the first fitting portion 3 is changed from 80 mm to 960 mm, the length L between the reference plane T inside the sphere and the edge circumference 12 is set to 10% of the maximum diameter R1 of the spherical portion, and the ratio R1/X1 of the maximum diameter R1 of the spherical portion against the diameter X1 of the straight pipe portion 1 is set to 1.6. Referring to the experimental result of Table 6, if the original turning angle Q1 of the second straight pipe portion 5 defined as described above is set to 72° to 108°, the allowable turning angle is set to 36°. In addition, if the reverse turning angle Q2 is set to 161° to 197°, the allowable turning angle is set to 36°. Furthermore, if the left-right turning angle Q3 is set to 37° to 143°, the allowable turning angle is set to 106°.

Figure 12:
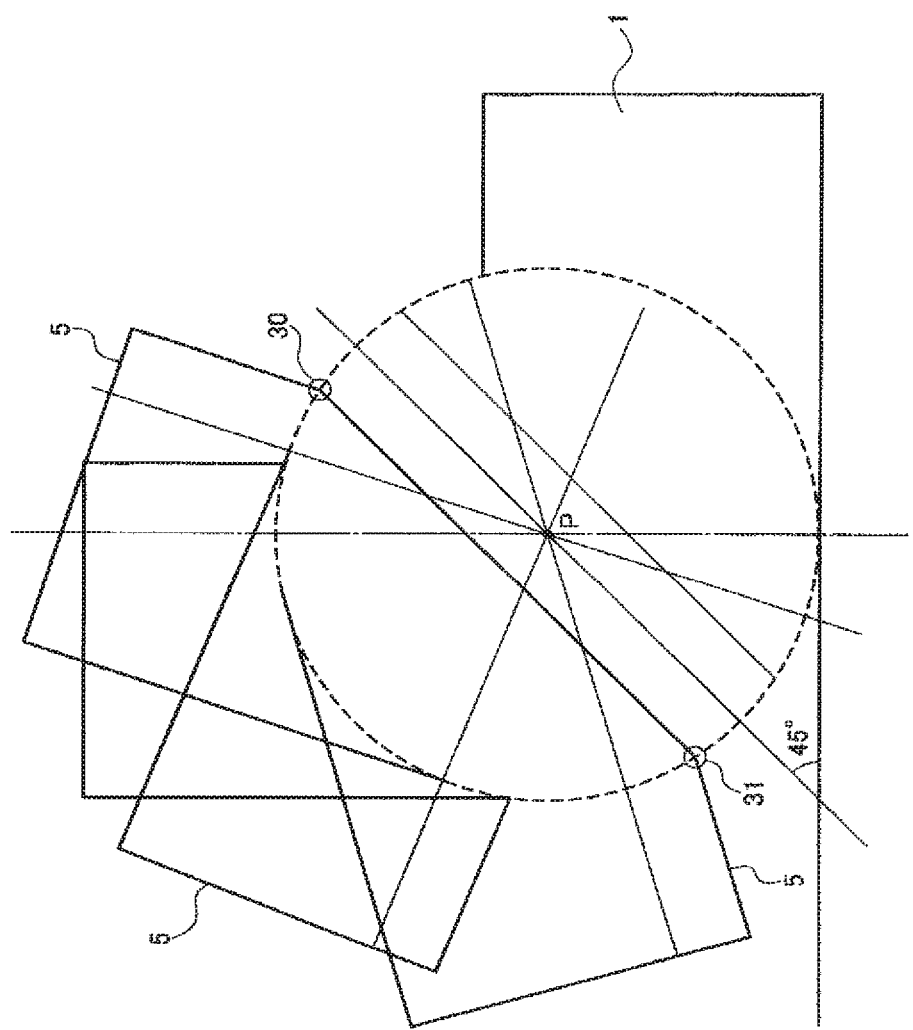
FIG. 12 is a cross-sectional view illustrating a method of adjusting and setting a deflection angle between the first straight pipe portion and the second straight pipe portion of the liquid pipe coupling universal joint according to another embodiment of the invention.

FIG. 12 is a diagram illustrating how the second straight pipe portion 5 can be turned with respect to the first straight pipe portion 1 in the aforementioned experiment.

Meanwhile, Table 7 shows a result of the experiment when the setting angle F is set to 54°, the diameter X1 of the first straight pipe portion 1 is changed from 50 mm to 600 mm, the maximum diameter R1 of the spherical portion of the first fitting portion 3 is changed from 80 mm to 960 mm, the length L between the reference plane T inside the sphere and the edge circumference 12 is set to 10% of the maximum diameter R1 of the spherical portion, and the ratio R1/X1 of the maximum diameter R1 of the spherical portion against the diameter X1 of the straight pipe portion 1 is set to 1.6. Referring to the experimental result of Table 7, if the original turning angle Q1 of the second straight pipe portion 5 defined as described above is set to 80° to 106°, the allowable turning angle is set to 26°. In addition, if the reverse turning angle Q2 is set to 180° to 206°, the allowable turning angle is set to 26°. Furthermore, if the left-right turning angle Q3 is set to 37° to 143°, the allowable turning angle is set to 106°.

Figure 13:
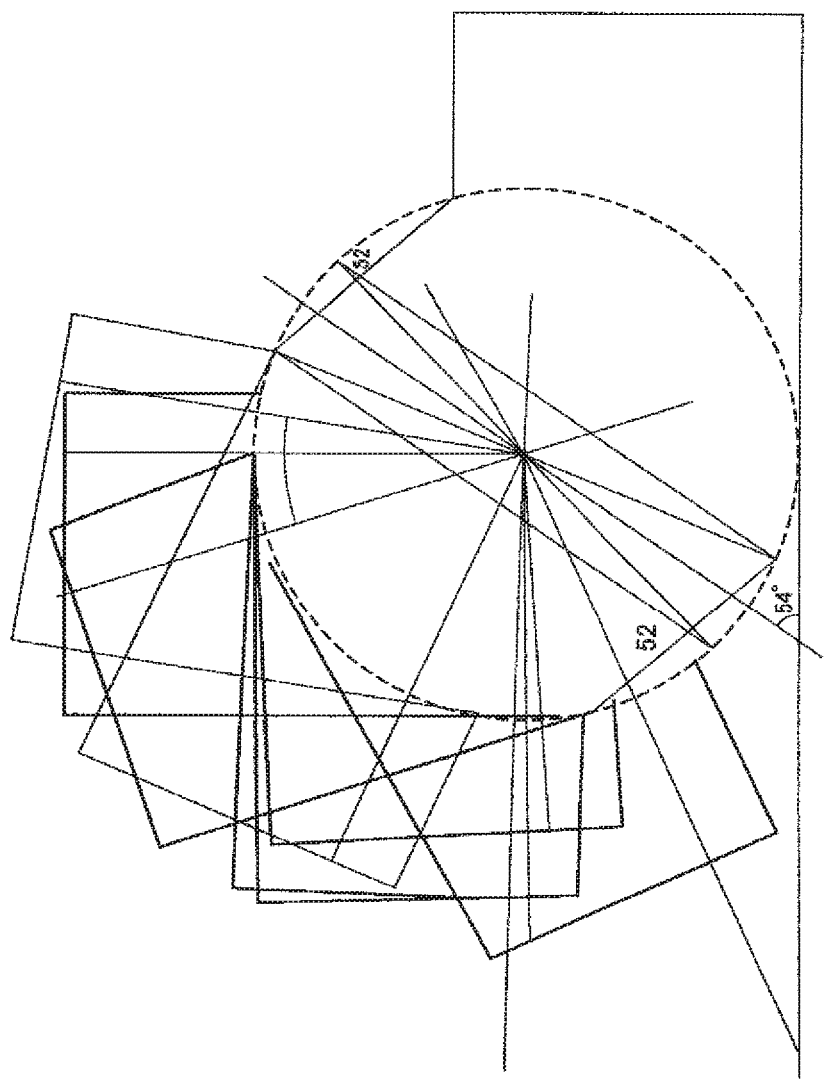
FIG. 13 is a cross-sectional view illustrating a method of adjusting and setting a deflection angle between the first straight pipe portion and the second straight pipe portion of the liquid channel universal pipe joint according to further another embodiment of the invention.

FIG. 13 is a diagram illustrating how the second straight pipe portion 5 can be turned with respect to the first straight pipe portion 1 in the aforementioned experiment.

Meanwhile, Table 8 shows a result of the experiment when the setting angle F is set to 45°, the diameter X1 of the first straight pipe portion 1 is changed from 50 mm to 600 mm, the maximum diameter R1 of the spherical portion of the first fitting portion 3 is changed from 80 mm to 960 mm, the length L between the reference plane T inside the sphere and the edge circumference 12 is set to 30% of the maximum diameter R1 of the spherical portion, and the ratio R1/X1 of the maximum diameter R1 of the spherical portion against the diameter X1 of the straight pipe portion 1 is set to 1.6. Referring to the experimental result of Table 8, if the original turning angle Q1 of the second straight pipe portion 5 defined as described above is set to 80° to 98°, the allowable turning angle is set to 18°. In addition, if the reverse turning angle Q2 is set to 171° to 189°, the allowable turning angle is set to 18°. Furthermore, if the left-right turning angle Q3 is set to 25° to 155°, the allowable turning angle is set to 130°.

However, in the aforementioned experiment, the length L from the edge circumference 12 is set to 30% of the maximum diameter R1 of the spherical portion. However, under the angles Q1 and Q2, the allowable turning range becomes 18° at most. Therefore, in terms of functionality and serviceability, it was found that this is a universal joint that is not expected much.

Figure 14:
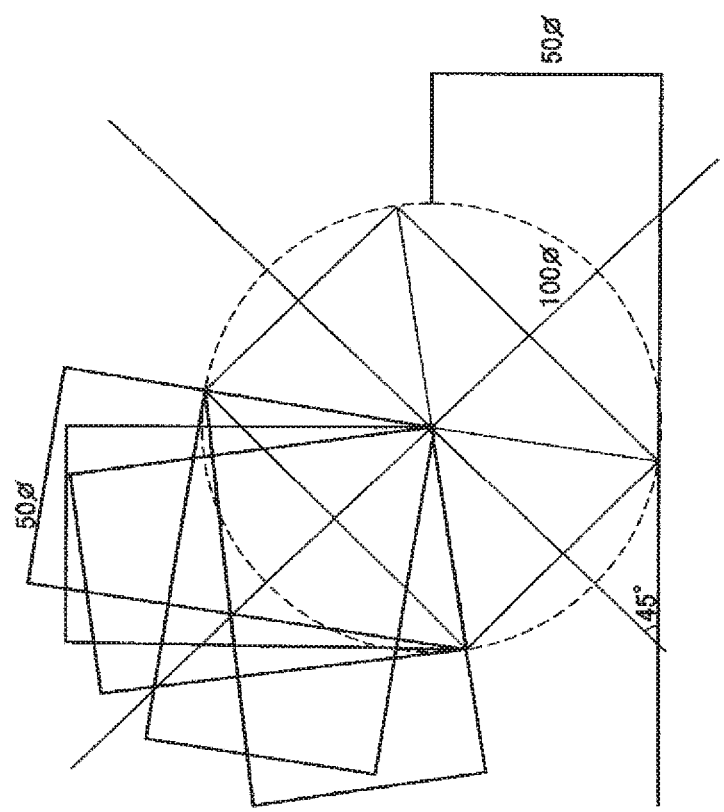
FIG. 14 is a cross-sectional view illustrating a method of adjusting and setting a deflection angle between the first straight pipe portion and the second straight pipe portion of the liquid pipe coupling universal joint according to another embodiment of the invention.

Meanwhile, through this experiment, as illustrated in FIG. 14, by setting the ratio R1/X1 of the maximum diameter R1 of the spherical portion against the diameter X1 of the straight pipe portion 1 to "2.0," it was possible to recognize that the allowable range can be expanded reasonably. However, since the size of the spherical portion significantly increases, this may generate a problem reversely in terms of the strength and stability. Therefore, this embodiment was not considered as being preferable.

Various experimental results described above and various considerations are comprehensively reviewed, so that the predetermined angle F according to the present invention is preferably set to a range of 30° to 62°, and more preferably 38° to 52°, and most preferably 45°. The straight line W0 based on such preferable angle range F is used as a basis of the reference plane T.

On the basis of the experimental results and various studies described above, allowable ranges for each aforementioned essential requirement according to the present invention were checked. Specifically, the ratio R1/X1 between the maximum diameter R1 of the spherical curved portion and the diameter X1 of the first straight pipe portion is set to 1.2 to 2.0. The angle F between the reference plane T and the center axis line Z1 or Z2 of the straight pipe portion 1 or 2 is set to 30° to 62°. Meanwhile, the length L between the edge circumference 12 or 13 and the reference plane T in the first or second fitting portion is set to 10 to 30% of the maximum diameter length R1 or R2 of the reference plane T.

As described above, according to the present invention, although it was concluded that the ratio R1/X1 between the maximum diameter R1 of the spherical curved portion and the diameter X1 of the first straight pipe portion is preferably set to 1.2 to 2.0, more experiments were repeated, and its condition was established by combining the requirements other than the ratio R1/X1 in order to clearly check a fact that the ratio R1/X1 is preferably set to 1.5 to 1.7 and check a more optimal liquid pipe coupling universal joint. How to obtain such a conclusion will be described in more details with reference to Tables 9 to 11 and FIGS. 24 to 39.

Specifically, Table 9 shows an experimental result obtained by setting the ratio R1/X1 to "1.5." In Table 9, further, the distance L1 (mm) between the reference plane T inside the sphere and the edge circumference 12 is changed to 18% to 25% of the maximum diameter R1 of the spherical portion, and the setting angle F is established considering an angle settable within the maximum range under each setting condition. As a result, three types of maximum allowable ranges of the rotation angle were measured, and the results are shown.

That is, in the experiments described above, if the distance L1 (mm) is set to 18%, the maximum allowable angle range of the setting angle F is 41° to 70°, and it was physically difficult to obtain the larger or smaller angle range.

In the experiments described above, if the distance L1 (mm) is set to 18%, the maximum allowable the setting angle F is 41° to 71°, and it was physically difficult to obtain the larger or smaller angle range.

That is, in the experimental result of Table 9, assuming that the angle range defined above is set to 41°, if the original turning angle Q1 of the second straight pipe portion 5 is set to 82° to 110°, the allowable turning angle is 28°. If the reverse turning angle Q2 is set to 152° to 180°, the allowable turning angle is 28°. In addition, if the left-right turning angle Q3 is set to 82° to 180°, the allowable turning angle is 98°.

In addition, assuming that the angle range defined above is set to 70°, if the original turning angle Q1 of the second straight pipe portion 5 is set to 110° to 138°, the allowable turning angle is 28°. If the reverse turning angle Q2 is set to 180° to 208°, the allowable turning angle is 28°. In addition, if the left-right turning angle Q3 is set to 110° to 208°, the allowable turning angle is 98°.

However, in the aforementioned experiment, it was found that the overlapping range of the edge circumference 12 is small, and thus, the strength is not satisfactory.

In addition, in the aforementioned experiment, if the distance L1 (mm) is set to 21%, the maximum allowable range of the setting angle F is 44° to 65°, and it was physically difficult to obtain the larger or smaller angle range.

Referring to the result of the experiment shown in Table 9, assuming that the angle range defined above is set to 44°, if the original turning angle Q1 of the second straight pipe portion 5 is set to 87° to 109°, the allowable turning angle is 22°. If the reverse turning angle Q2 is set to 157° to 180°, the allowable turning angle is 23°. In addition, if the left-right turning angle Q3 is set to 87° to 157°, the allowable turning angle is 93°.

Meanwhile, assuming that the angle range defined above is set to 65°, if the original turning angle Q1 of the second straight pipe portion 5 is set to 109° to 129°, the allowable turning angle is 20°. If the reverse turning angle Q2 is set to 180° to 201°, the allowable turning angle is 21°. In addition, if the left-right turning angle Q3 is set to 109° to 201°, the allowable turning angle is 92°.

From this experimental result, it was found that, in both the aforementioned experiments, the liquid pipe coupling universal joint described above has substantially ideal functions and characteristics.

Figure 25:
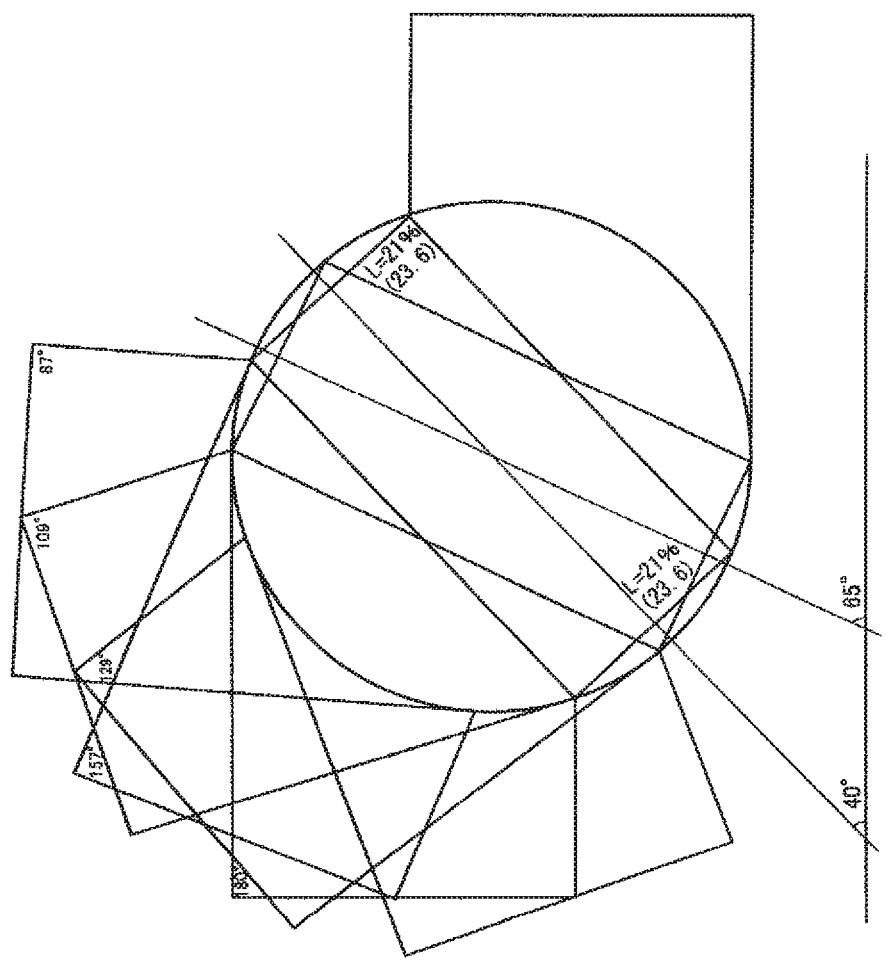
FIG. 25 is a cross-sectional view illustrating a method of adjusting and setting a deflection angle between the first straight pipe portion and the second straight pipe portion of the liquid channel universal pipe joint according to further another embodiment of the present invention.

FIG. 25 is a diagram illustrating how the second straight pipe portion 5 can turn with respect to the first straight pipe portion 1 in both the experiments described above.

In the experiments described above, if the distance L1 (mm) is set to 22%, the maximum allowable angle range of the setting angle F is 46° to 64°, and it was physically difficult to obtain the larger or smaller angle range.

Referring to another experimental result shown in Table 9, assuming that the angle range defined above is set to 46°, if the original turning angle Q1 of the second straight pipe portion 5 is set to 93° to 110°, the allowable turning angle is 17°. If the reverse turning angle Q2 is set to 162° to 180°, the allowable turning angle is 18°. In addition, if the left-right turning angle Q3 is set to 93° to 180°, the allowable turning angle is 87°.

Meanwhile, assuming that the angle range defined above is set to 64°, if the original turning angle Q1 of the second straight pipe portion 5 is set to 110° to 127°, the allowable turning angle is 17°. If the reverse turning angle Q2 is set to 180° to 197°, the allowable turning angle is 17°. In addition, if the left-right turning angle Q3 is set to 110° to 197°, the allowable turning angle is 87°.

In this experimental result, it was found that, in the embodiment in which the predetermined angle F is set to 46°, an angular change from 90° is not allowed disadvantageously. However, as in the embodiment in which the predetermined angle F is set to 64°, it was found that the liquid pipe coupling universal joint described above has substantially ideal functions and characteristics.

Figure 26:
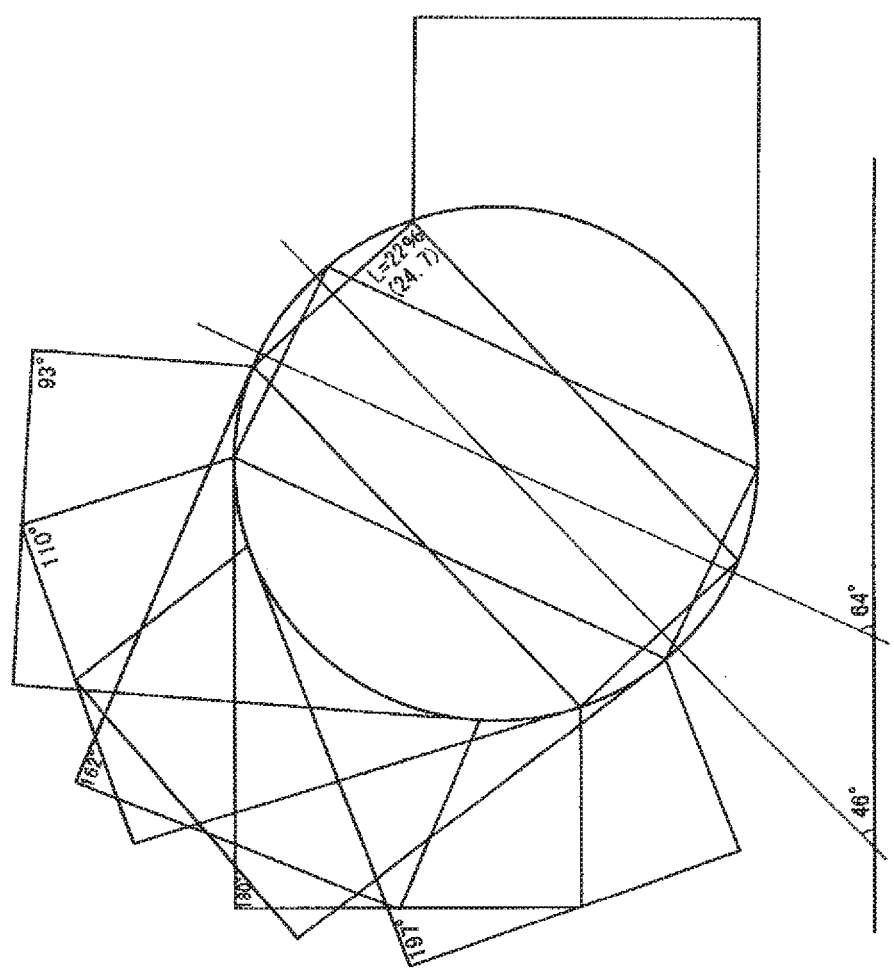
FIG. 26 is a cross-sectional view illustrating a method of adjusting and setting a deflection angle between the first straight pipe portion and the second straight pipe portion of the liquid pipe coupling universal joint according to another embodiment of the present invention.

FIG. 26 is a diagram illustrating how the second straight pipe portion 5 can turn with respect to the first straight pipe portion 1 in both the aforementioned experiments.

Next, in the experiments described above, if the distance L1 (mm) is set to 23%, the maximum allowable angle range of the setting angle F is 46° to 64°, and it was physically difficult to obtain the larger or smaller angle range.

That is, in the experimental result shown in Table 9, assuming that the angle range defined above is set to 46°, if the original turning angle Q1 of the second straight pipe portion 5 is set to 95° to 110°, the allowable turning angle is 15°. If the reverse turning angle Q2 is set to 164° to 180°, the allowable turning angle is 16°. In addition, if the left-right turning angle Q3 is set to 95° to 180°, the allowable turning angle is 85°.

In addition, assuming that the angle range defined above is set to 64°, if the original turning angle Q1 of the second straight pipe portion 5 is set to 110° to 127°, the allowable turning angle is 17°. If the reverse turning angle Q2 is set to 180° to 198°, the allowable turning angle is 18°. In addition, if the left-right turning angle Q3 is set to 110° to 198°, the allowable turning angle is 88°.

In this experimental result, it was found that, in the embodiment in which the predetermined angle F is set to 46°, an angular change from 90° is not allowed disadvantageously. However, as in the embodiment in which the predetermined angle F is set to 64°, it was found that the liquid pipe coupling universal joint described above has substantially ideal functions and characteristics.

Figure 27:
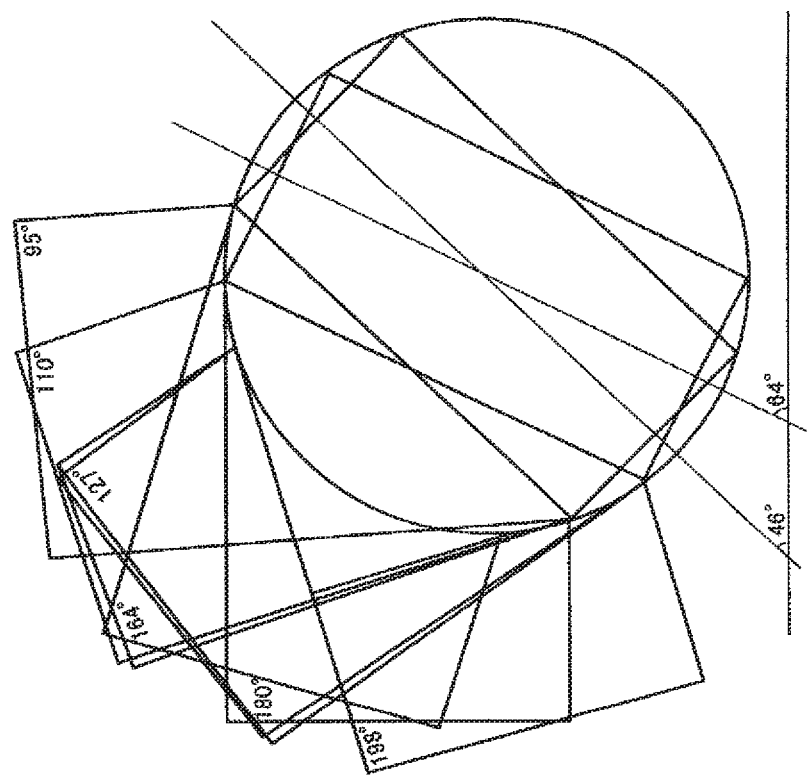
FIG. 27 is a cross-sectional view illustrating a method of adjusting and setting a deflection angle between the first straight pipe portion and the second straight pipe portion of the liquid pipe coupling universal joint according to another embodiment of the present invention.

FIG. 27 is a diagram illustrating how the second straight pipe portion 5 can turn with respect to the first straight pipe portion 1 in both the aforementioned experiments.

Next, in the experiments described above, if the distance L1 (mm) is set to 25%, the maximum allowable angle range of the setting angle F is 51° to 61°, and it was physically difficult to obtain the larger or smaller angle range.

That is, in the experimental result shown in Table 9, assuming that the angle range defined above is set to 51°, if the original turning angle Q1 of the second straight pipe portion 5 is set to 100° to 110°, the allowable turning angle is 10°. If the reverse turning angle Q2 is set to 169° to 179°, the allowable turning angle is 10°. In addition, if the left-right turning angle Q3 is set to 100° to 179°, the allowable turning angle is 79°.

In addition, assuming that the angle range defined above is set to 61°, if the original turning angle Q1 of the second straight pipe portion 5 is set to 110° to 120°, the allowable turning angle is 10°. If the reverse turning angle Q2 is set to 179° to 189°, the allowable turning angle is 10°. In addition, if the left-right turning angle Q3 is set to 110° to 189°, the allowable turning angle is 79°.

However, in both the embodiments described above, most of the products had significantly small rotatable ranges and unsatisfactory practicability.

Figure 28:
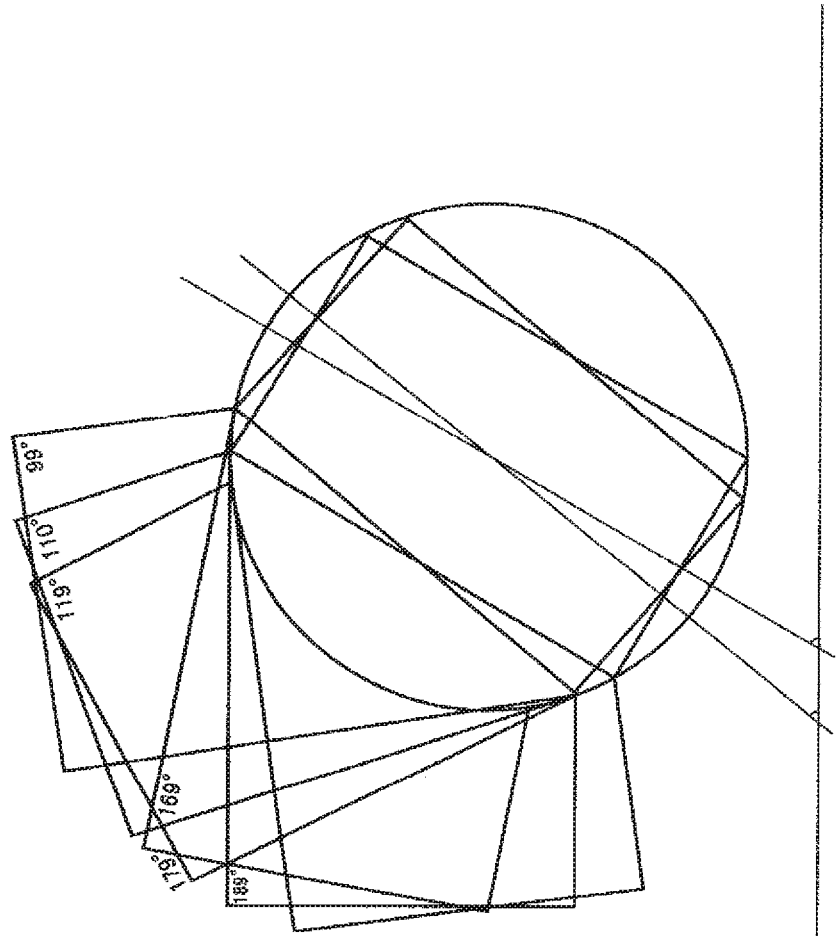
FIG. 28 is a cross-sectional view illustrating a method of adjusting and setting a deflection angle between the first straight pipe portion and the second straight pipe portion of the liquid channel universal pipe joint according to further another embodiment of the present invention.

FIG. 28 is a diagram illustrating how the second straight pipe portion 5 can turn with respect to the first straight pipe portion 1 in both the aforementioned experiments.

Next, Table 10 shows an experimental result obtained by setting the ratio R1/X1 to "1.6." In Table 10, further, the distance L1 (mm) between the reference plane T inside the sphere and the edge circumference 12 is changed to 18% to 25% of the maximum diameter R1 of the spherical portion, and the setting angle F is established considering an angle settable within the maximum range under each setting condition. As a result, three types of maximum allowable ranges of the rotation angle were measured, and the results are shown.

That is, in the experiments described above, if the distance L1 (mm) is set to 18%, the maximum allowable angle range of the setting angle F is 32° to 70°, and it was physically difficult to obtain the larger or smaller angle range.

That is, in the experimental result of Table 10, assuming that the angle range defined above is set to 32°, if the original turning angle Q1 of the second straight pipe portion 5 is set to 71° to 104°, the allowable turning angle is 33°. If the reverse turning angle Q2 is set to 147° to 180°, the allowable turning angle is 33°. In addition, if the left-right turning angle Q3 is set to 71° to 180°, the allowable turning angle is 109°.

In addition, assuming that the angle range defined above is set to 70°, if the original turning angle Q1 of the second straight pipe portion 5 is set to 104° to 138°, the allowable turning angle is 34°. If the reverse turning angle Q2 is set to 180° to 213°, the allowable turning angle is 33°. In addition, if the left-right turning angle Q3 is set to 110° to 208°, the allowable turning angle is 98°.

However, in any one of the aforementioned experiments, it was found that the overlapping range of the edge circumference 12 is small, and thus, the strength is not satisfactory.

Figure 29:
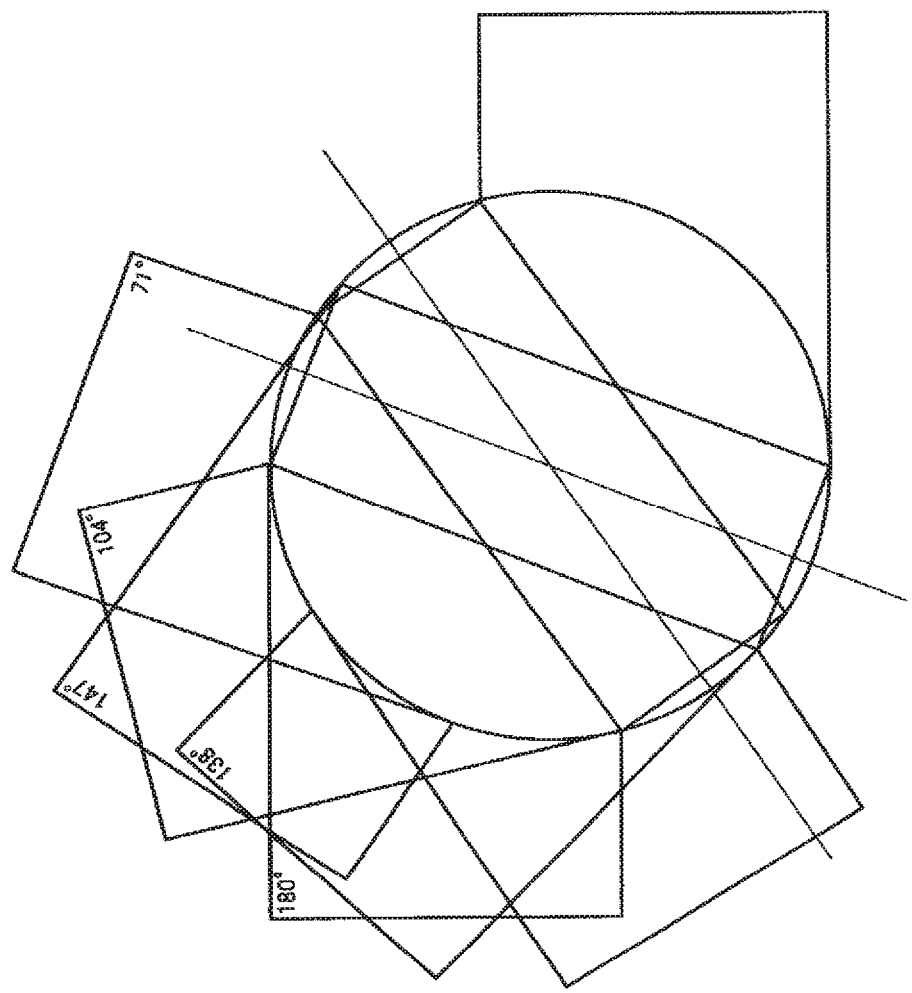
FIG. 29 is a cross-sectional view illustrating a method of adjusting and setting a deflection angle between the first straight pipe portion and the second straight pipe portion of the liquid pipe coupling universal joint according to another embodiment of the present invention.

FIG. 29 is a diagram illustrating how the second straight pipe portion 5 can turn with respect to the first straight pipe portion 1 in both the experiments described above.

In the experiments described above, if the distance L1 (mm) is set to 20%, that is, in a configuration of the previous application of the present invention, the maximum allowable angle range of the setting angle F is 39° to 67°, and it was physically difficult to obtain the larger or smaller angle range.

Referring to another experimental result shown in Table 10, assuming that the angle range defined above is set to 39°, if the original turning angle Q1 of the second straight pipe portion 5 is set to 87° to 105°, the allowable turning angle is 27°. If the reverse turning angle Q2 is set to 152° to 180°, the allowable turning angle is 28°. In addition, if the left-right turning angle Q3 is set to 78° to 180°, the allowable turning angle is 102°.

Meanwhile, assuming that the angle range defined above is set to 67°, if the original turning angle Q1 of the second straight pipe portion 5 is set to 105° to 132°, the allowable turning angle is 27°. If the reverse turning angle Q2 is set to 180° to 207°, the allowable turning angle is 27°. In addition, if the left-right turning angle Q3 is set to 105° to 207°, the allowable turning angle is 102°.

From this experimental result, it was found that, in both the aforementioned experiments, the liquid pipe coupling universal joint described above has substantially ideal functions and characteristics.

Figure 30:
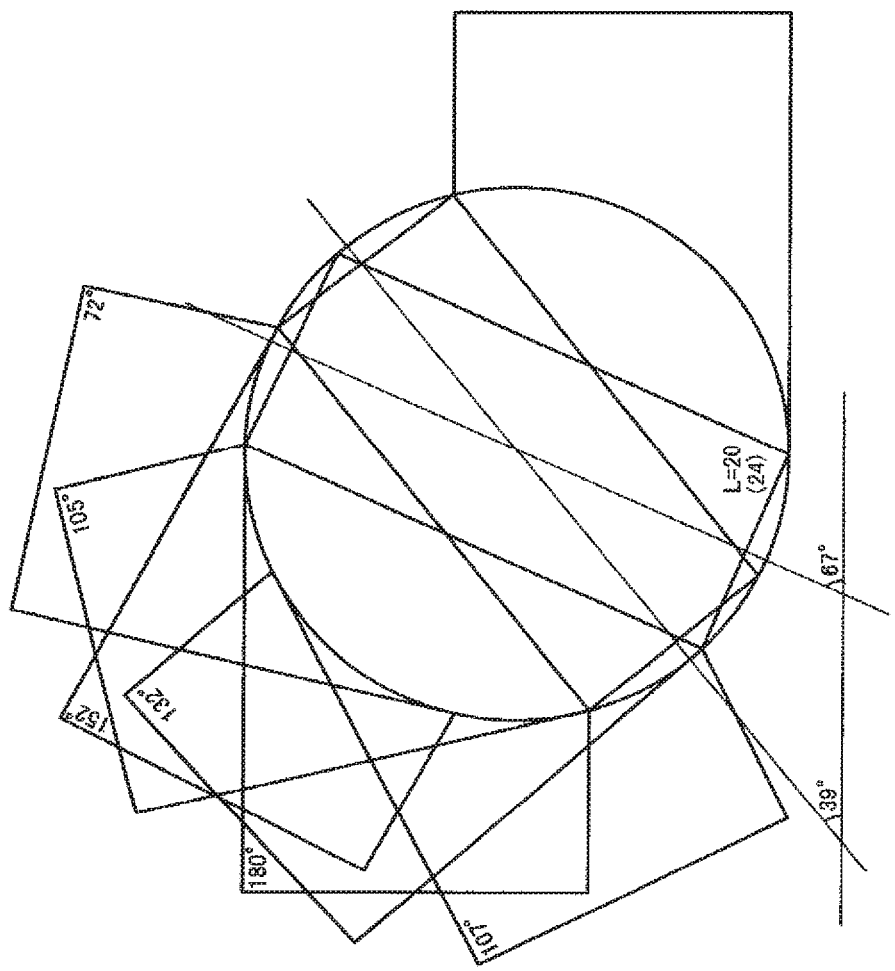
FIG. 30 is a cross-sectional view illustrating a method of adjusting and setting a deflection angle between the first straight pipe portion and the second straight pipe portion of the liquid channel universal pipe joint according to further another embodiment of the present invention.

FIG. 30 is a diagram illustrating how the second straight pipe portion 5 can turn with respect to the first straight pipe portion 1 in both the experiments described above.

Meanwhile, in the experiments described above, if the distance L1 (mm) is set to 21%, the maximum allowable angle range of the setting angle F is 40° to 65°, and it was physically difficult to obtain the larger or smaller angle range.

Referring to another experimental result shown in Table 10, assuming that the angle range defined above is set to 40°, if the original turning angle Q1 of the second straight pipe portion 5 is set to 80° to 105°, the allowable turning angle is 26°. If the reverse turning angle Q2 is set to 154° to 179°, the allowable turning angle is 26°. In addition, if the left-right turning angle Q3 is set to 87° to 179°, the allowable turning angle is 99°.

Meanwhile, assuming that the angle range defined above is set to 65°, if the original turning angle Q1 of the second straight pipe portion 5 is set to 105° to 131°, the allowable turning angle is 26°. If the reverse turning angle Q2 is set to 179° to 205°, the allowable turning angle is 26°. In addition, if the left-right turning angle Q3 is set to 105° to 205°, the allowable turning angle is 100°.

From this experimental result, it was found that, in both the aforementioned experiments, the liquid pipe coupling universal joint described above has substantially ideal functions and characteristics.

Figure 31:
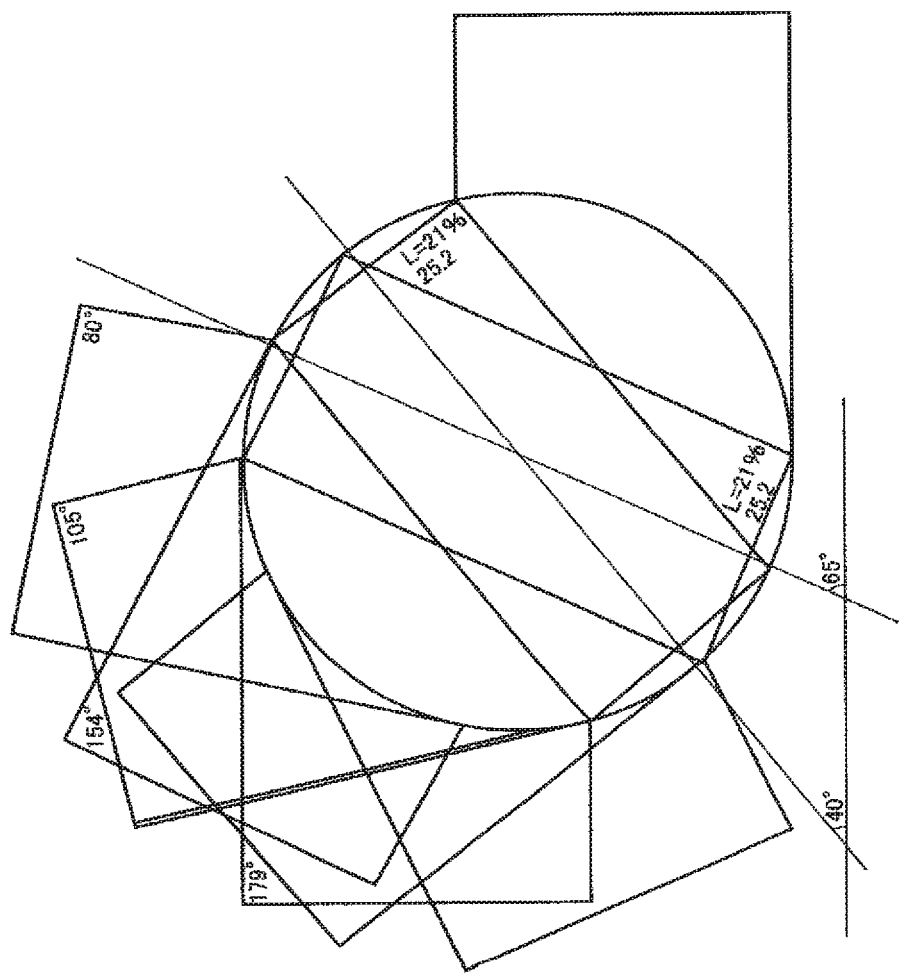
FIG. 31 is a cross-sectional view illustrating a method of adjusting and setting a deflection angle between the first straight pipe portion and the second straight pipe portion of the liquid pipe coupling universal joint according to another embodiment of the present invention.

FIG. 31 is a diagram illustrating how the second straight pipe portion 5 can turn with respect to the first straight pipe portion 1 in both the experiments described above.

In the experiments described above, if the distance L1 (mm) is set to 22%, the maximum allowable angle range of the setting angle F is 41° to 64°, and it was physically difficult to obtain the larger or smaller angle range.

Referring to another experimental result shown in Table 10, assuming that the angle range defined above is set to 41°, if the original turning angle Q1 of the second straight pipe portion 5 is set to 82° to 105°, the allowable turning angle is 23°. If the reverse turning angle Q2 is set to 155° to 180°, the allowable turning angle is 25°. In addition, if the left-right turning angle Q3 is set to 82° to 180°, the allowable turning angle is 98°.

Meanwhile, assuming that the angle range defined above is set to 64°, if the original turning angle Q1 of the second straight pipe portion 5 is set to 105° to 128°, the allowable turning angle is 23°. If the reverse turning angle Q2 is set to 180° to 203°, the allowable turning angle is 23°. In addition, if the left-right turning angle Q3 is set to 105° to 203°, the allowable turning angle is 98°.

From this experimental result, it was found that, in both the aforementioned experiments, the liquid pipe coupling universal joint described above has substantially ideal functions and characteristics.

Figure 32:
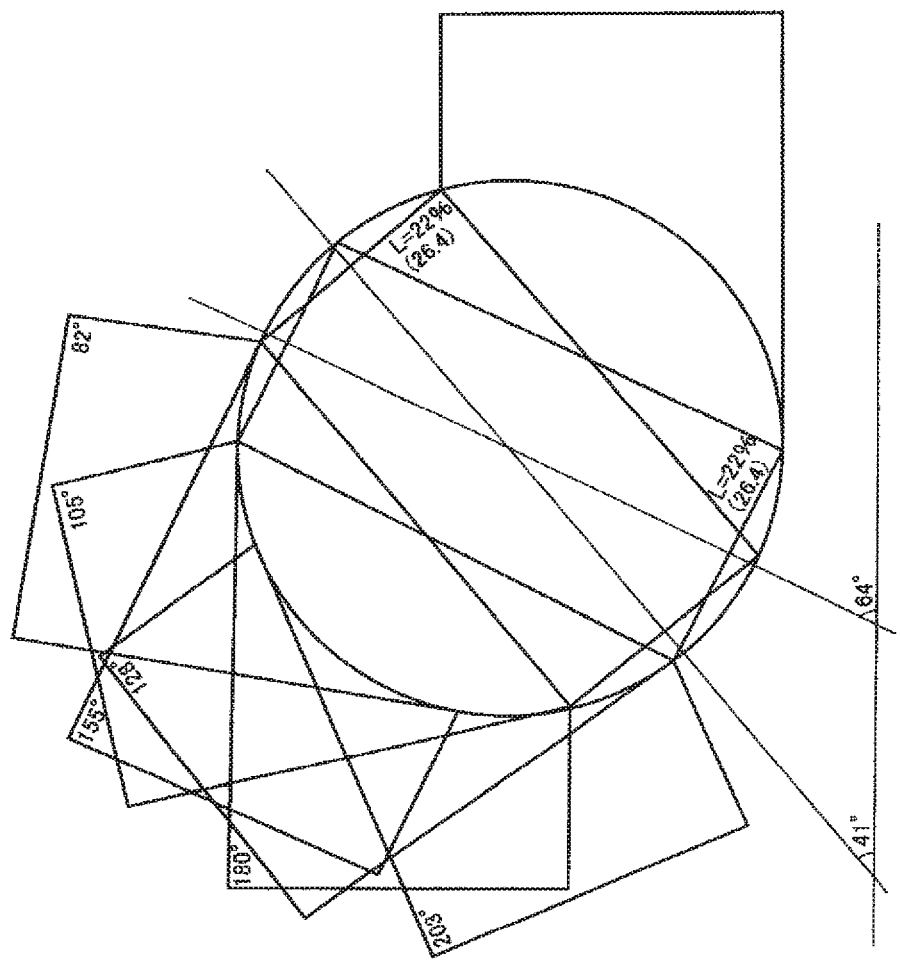
FIG. 32 is a cross-sectional view illustrating a method of adjusting and setting a deflection angle between the first straight pipe portion and the second straight pipe portion of the liquid pipe coupling universal joint according to another embodiment of the present invention.

FIG. 32 is a diagram illustrating how the second straight pipe portion 5 can turn with respect to the first straight pipe portion 1 in both the aforementioned experiments.

Next, in the experiments described above, if the distance L1 (mm) is set to 23%, the maximum allowable angle range of the setting angle F is 42° to 62°, and it was physically difficult to obtain the larger or smaller angle range.

That is, in the experimental result shown in Table 10, assuming that the angle range defined above is set to 42°, if the original turning angle Q1 of the second straight pipe portion 5 is set to 84° to 105°, the allowable turning angle is 21°. If the reverse turning angle Q2 is set to 160° to 179°, the allowable turning angle is 19°. In addition, if the left-right turning angle Q3 is set to 84° to 179°, the allowable turning angle is 95°.

In addition, assuming that the angle range defined above is set to 62°, if the original turning angle Q1 of the second straight pipe portion 5 is set to 105° to 125°, the allowable turning angle is 20°. If the reverse turning angle Q2 is set to 179° to 201°, the allowable turning angle is 22°. In addition, if the left-right turning angle Q3 is set to 110° to 198°, the allowable turning angle is 96°.

From this experimental result, it was found that, in both the aforementioned experiments, the liquid pipe coupling universal joint described above has substantially ideal functions and characteristics.

Figure 33:
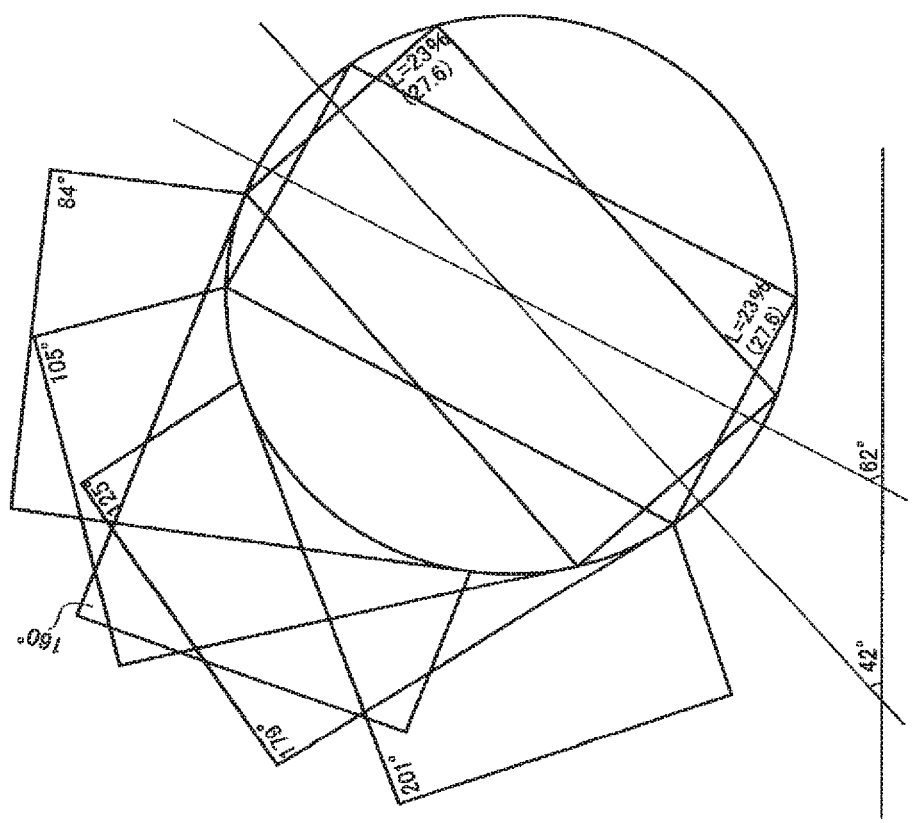
FIG. 33 is a cross-sectional view illustrating a method of adjusting and setting a deflection angle between the first straight pipe portion and the second straight pipe portion of the liquid channel universal pipe joint according to further another embodiment of the present invention.

FIG. 33 is a diagram illustrating how the second straight pipe portion 5 can turn with respect to the first straight pipe portion 1 in both the aforementioned experiments.

Next, in the experiments described above, if the distance L1 (mm) is set to 25%, the maximum allowable angle range of the setting angle F is 45° to 60°, and it was physically difficult to obtain the larger or smaller angle range.

That is, in the experimental result shown in Table 10, assuming that the angle range defined above is set to 45°, if the original turning angle Q1 of the second straight pipe portion 5 is set to 89° to 104°, the allowable turning angle is 15°. If the reverse turning angle Q2 is set to 164° to 180°, the allowable turning angle is 16°. In addition, if the left-right turning angle Q3 is set to 89° to 180°, the allowable turning angle is 91°.

In addition, assuming that the angle range defined above is set to 60°, if the original turning angle Q1 of the second straight pipe portion 5 is set to 104° to 120°, the allowable turning angle is 16°. If the reverse turning angle Q2 is set to 180° to 196°, the allowable turning angle is 16°. In addition, if the left-right turning angle Q3 is set to 104° to 196°, the allowable turning angle is 92°.

However, in both the embodiments described above, most of the products had significantly small rotatable ranges and unsatisfactory practicability.

Figure 34:
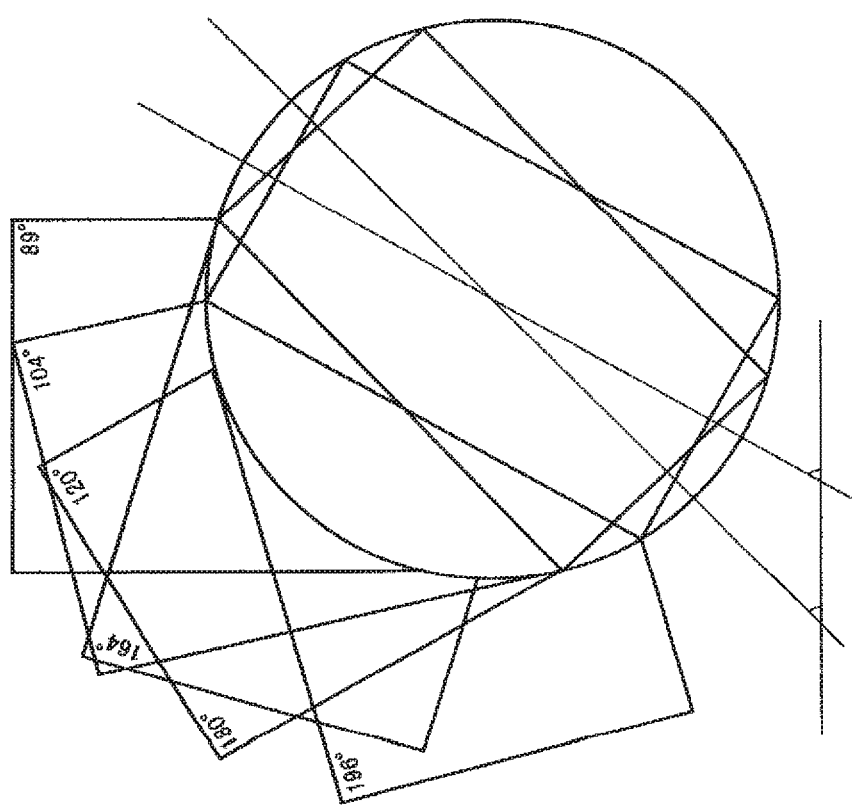
FIG. 34 is a cross-sectional view illustrating a method of adjusting and setting a deflection angle between the first straight pipe portion and the second straight pipe portion of the liquid pipe coupling universal joint according to another embodiment of the present invention.

FIG. 34 is a diagram illustrating how the second straight pipe portion 5 can turn with respect to the first straight pipe portion 1 in both the aforementioned experiments.

Next, Table 11 shows an experimental result obtained by setting the ratio R1/X1 to "1.7." In Table 11, further, the distance L1 (mm) between the reference plane T inside the sphere and the edge circumference 12 is changed to 18% to 25% of the maximum diameter R1 of the spherical portion, and the setting angle F is established considering an angle settable within the maximum range under each setting condition. As a result, three types of maximum allowable ranges of the rotation angle were measured, and the results are shown.

That is, in the experiments described above, if the distance L1 (mm) is set to 18%, the maximum allowable angle range of the setting angle F is 33° to 69°, and it was physically difficult to obtain the larger or smaller angle range.

That is, in the experimental result of Table 11, assuming that the angle range defined above is set to 33°, if the original turning angle Q1 of the second straight pipe portion 5 is set to 65° to 102°, the allowable turning angle is 37°. If the reverse turning angle Q2 is set to 145° to 182°, the allowable turning angle is 37°. In addition, if the left-right turning angle Q3 is set to 65° to 182°, the allowable turning angle is 117°.

In addition, assuming that the angle range defined above is set to 69°, if the original turning angle Q1 of the second straight pipe portion 5 is set to 100° to 137°, the allowable turning angle is 37°. If the reverse turning angle Q2 is set to 179° to 217°, the allowable turning angle is 38°. In addition, if the left-right turning angle Q3 is set to 100° to 217°, the allowable turning angle is 117°.

However, in any one of the aforementioned experiments, it was found that the overlapping range of the edge circumference 12 is small, and thus the strength is not satisfactory.

Figure 35:
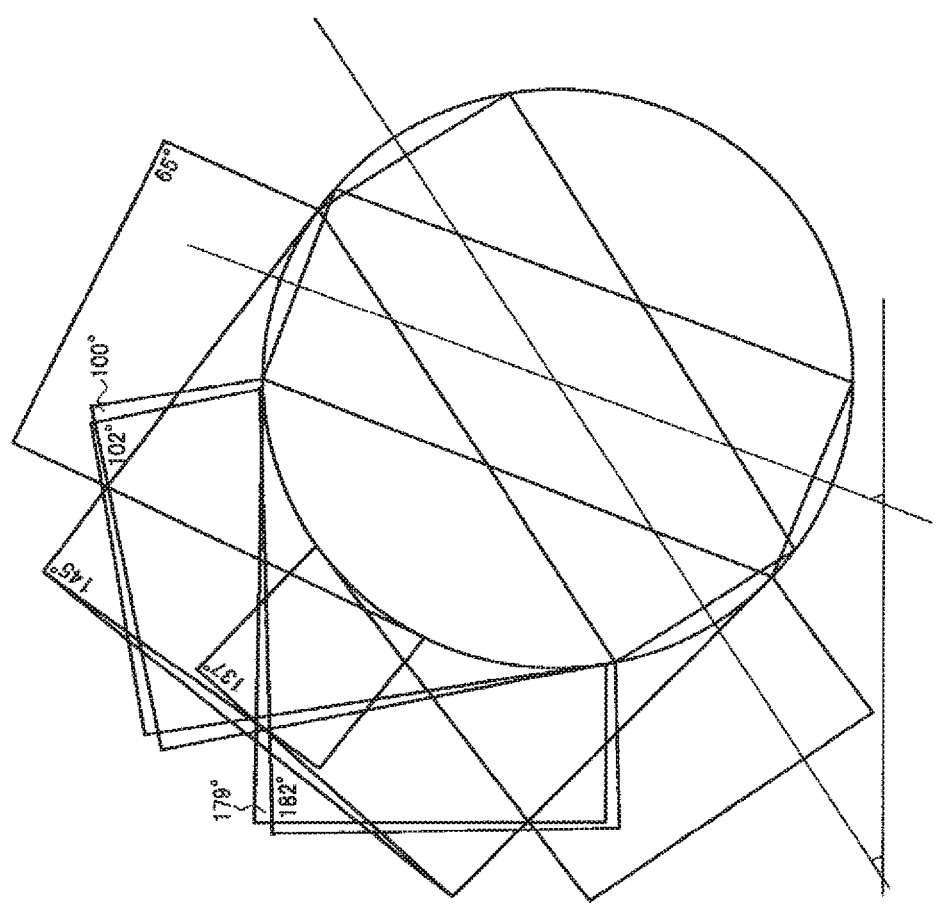
FIG. 35 is a cross-sectional view illustrating a method of adjusting and setting a deflection angle between the first straight pipe portion and the second straight pipe portion of the liquid pipe coupling universal joint according to another embodiment of the present invention.

FIG. 35 is a diagram illustrating how the second straight pipe portion 5 can turn with respect to the first straight pipe portion 1 in both the experiments described above.

In the experiments described above, if the distance L1 (mm) is set to 21%, the maximum allowable angle range of the setting angle F is 35° to 65°, and it was physically difficult to obtain the larger or smaller angle range.

Referring to another experimental result shown in Table 11, assuming that the angle range defined above is set to 35°, if the original turning angle Q1 of the second straight pipe portion 5 is set to 71° to 100°, the allowable turning angle is 29°. If the reverse turning angle Q2 is set to 150° to 179°, the allowable turning angle is 29°. In addition, if the left-right turning angle Q3 is set to 71° to 179°, the allowable turning angle is 108°.

Meanwhile, assuming that the angle range defined above is set to 65°, if the original turning angle Q1 of the second straight pipe portion 5 is set to 100° to 130°, the allowable turning angle is 30°. If the reverse turning angle Q2 is set to 179° to 209°, the allowable turning angle is 30°. In addition, if the left-right turning angle Q3 is set to 100° to 209°, the allowable turning angle is 109°.

From this experimental result, it was found that, in both the aforementioned experiments, the liquid pipe coupling universal joint described above has substantially ideal functions and characteristics.

Figure 36:
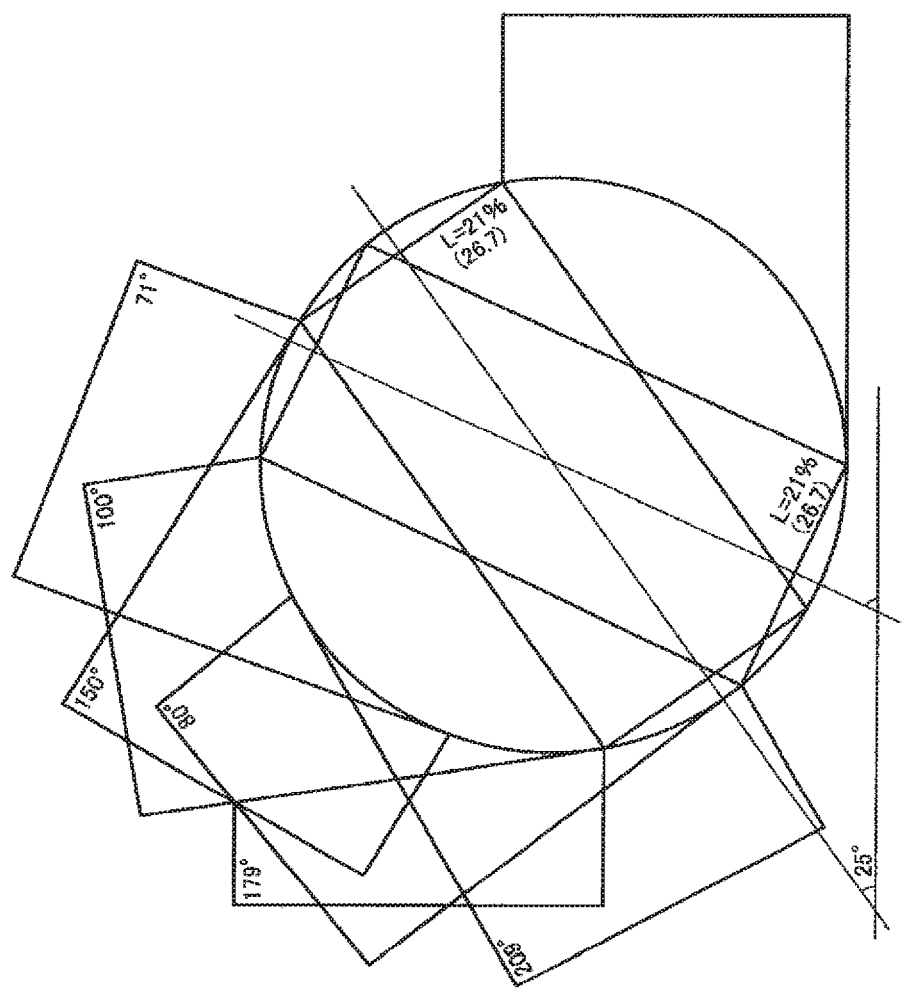
FIG. 36 is a cross-sectional view illustrating a method of adjusting and setting a deflection angle between the first straight pipe portion and the second straight pipe portion of the liquid channel universal pipe joint according to further another embodiment of the present invention.

FIG. 36 is a diagram illustrating how the second straight pipe portion 5 can turn with respect to the first straight pipe portion 1 in both the experiments described above.

In the experiments described above, if the distance L1 (mm) is set to 22%, the maximum allowable angle range of the setting angle F is 37° to 64°, and it was physically difficult to obtain the larger or smaller angle range.

Referring to another experimental result shown in Table 11, assuming that the angle range defined above is set to 37°, if the original turning angle Q1 of the second straight pipe portion 5 is set to 75° to 98°, the allowable turning angle is 23°. If the reverse turning angle Q2 is set to 153° to 180°, the allowable turning angle is 25°. In addition, if the left-right turning angle Q3 is set to 75° to 180°, the allowable turning angle is 105°.

Meanwhile, assuming that the angle range defined above is set to 64°, if the original turning angle Q1 of the second straight pipe portion 5 is set to 98° to 128°, the allowable turning angle is 30°. If the reverse turning angle Q2 is set to 180° to 207°, the allowable turning angle is 27°. In addition, if the left-right turning angle Q3 is set to 98° to 207°, the allowable turning angle is 109°.

From this experimental result, it was found that, in both the aforementioned experiments, the liquid pipe coupling universal joint described above has substantially ideal functions and characteristics.

Figure 37:
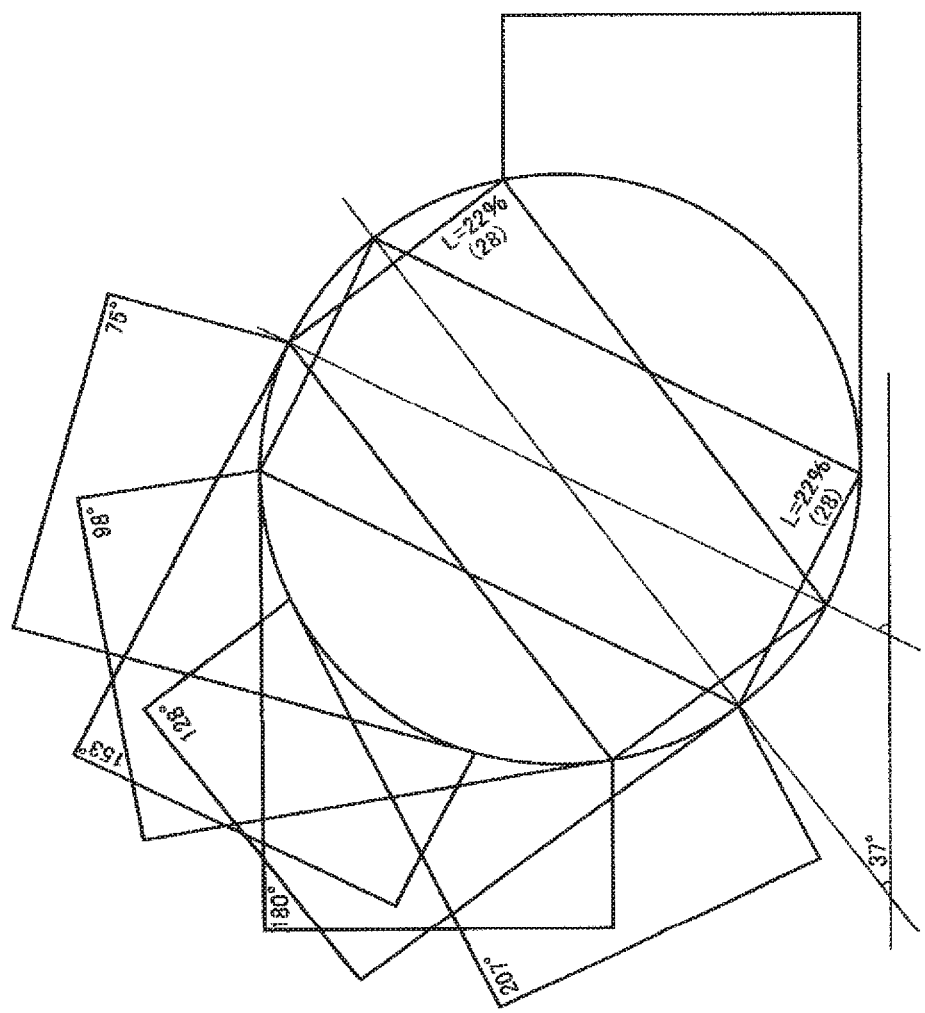
FIG. 37 is a cross-sectional view illustrating a method of adjusting and setting a deflection angle between the first straight pipe portion and the second straight pipe portion of the liquid pipe coupling universal joint according to another embodiment of the present invention.

FIG. 37 is a diagram illustrating how the second straight pipe portion 5 can turn with respect to the first straight pipe portion 1 in both the experiments described above.

In the experiments described above, if the distance L1 (mm) is set to 23%, the maximum allowable angle range of the setting angle F is 39° to 62°, and it was physically difficult to obtain the larger or smaller angle range.

That is, in the experimental result shown in Table 11, assuming that the angle range defined above is set to 39°, if the original turning angle Q1 of the second straight pipe portion 5 is set to 79° to 101°, the allowable turning angle is 21°. If the reverse turning angle Q2 is set to 160° to 179°, the allowable turning angle is 22°. In addition, if the left-right turning angle Q3 is set to 79° to 180°, the allowable turning angle is 101°.

In addition, assuming that the angle range defined above is set to 62°, if the original turning angle Q1 of the second straight pipe portion 5 is set to 101° to 123°, the allowable turning angle is 22°. If the reverse turning angle Q2 is set to 180° to 203°, the allowable turning angle is 23°. In addition, if the left-right turning angle Q3 is set to 101° to 203°, the allowable turning angle is 102°.

From this experimental result, it was found that, in both the aforementioned experiments, the liquid pipe coupling universal joint described above has substantially ideal functions and characteristics.

Figure 38:
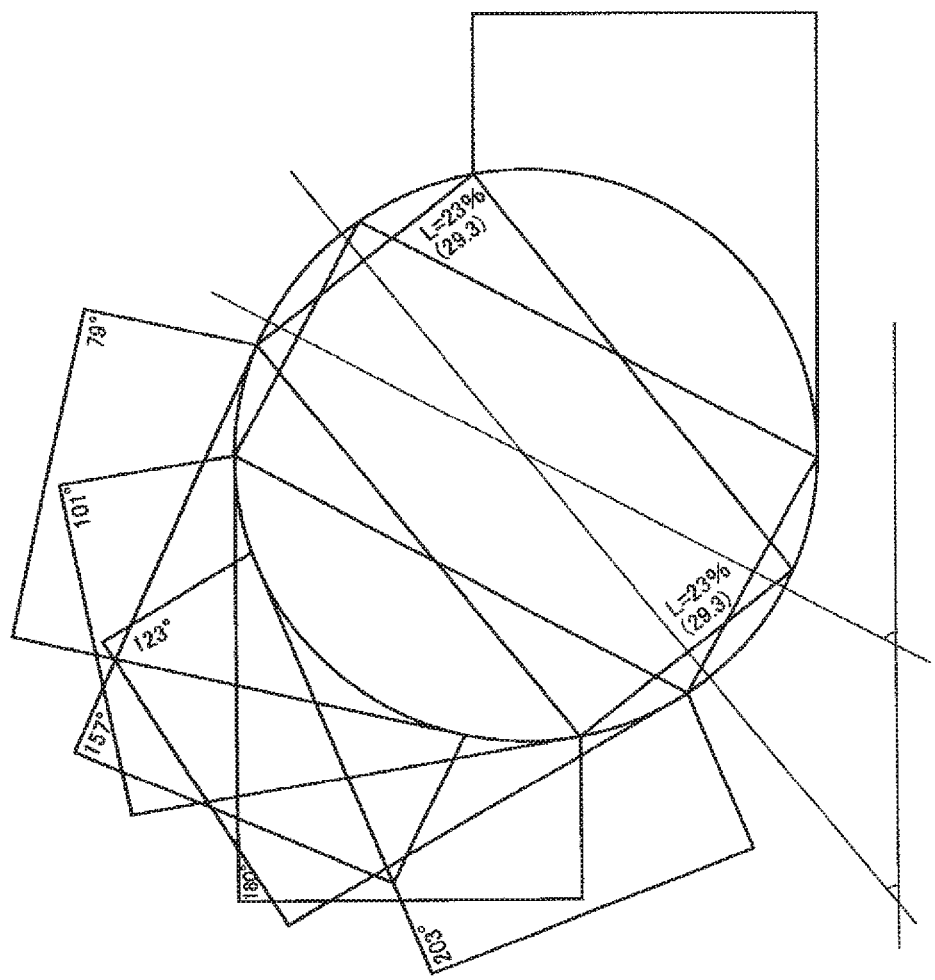
FIG. 38 is a cross-sectional view illustrating a method of adjusting and setting a deflection angle between the first straight pipe portion and the second straight pipe portion of the liquid channel universal pipe joint according to further another embodiment of the present invention.

FIG. 38 is a diagram illustrating how the second straight pipe portion 5 can turn with respect to the first straight pipe portion 1 in both the aforementioned experiments.

Next, in the experiments described above, if the distance L1 (mm) is set to 25%, the maximum allowable angle range of the setting angle F is 41° to 61°, and it was physically difficult to obtain the larger or smaller angle range.

That is, in the experimental result shown in Table 11, assuming that the angle range defined above is set to 41°, if the original turning angle Q1 of the second straight pipe portion 5 is set to 82° to 101°, the allowable turning angle is 19°. If the reverse turning angle Q2 is set to 159° to 181°, the allowable turning angle is 22°. In addition, if the left-right turning angle Q3 is set to 82° to 181°, the allowable turning angle is 99°.

In addition, assuming that the angle range defined above is set to 61°, if the original turning angle Q1 of the second straight pipe portion 5 is set to 101° to 122°, the allowable turning angle is 21°. If the reverse turning angle Q2 is set to 181° to 200°, the allowable turning angle is 19°. In addition, if the left-right turning angle Q3 is set to 101° to 200°, the allowable turning angle is 99°.

However, in any one of the aforementioned experiments, it was found that the overlapping range of the edge circumference 12 is small, and thus, the strength is not satisfactory. In addition, most of the products had significantly small rotatable ranges and unsatisfactory practicability.

Figure 39:
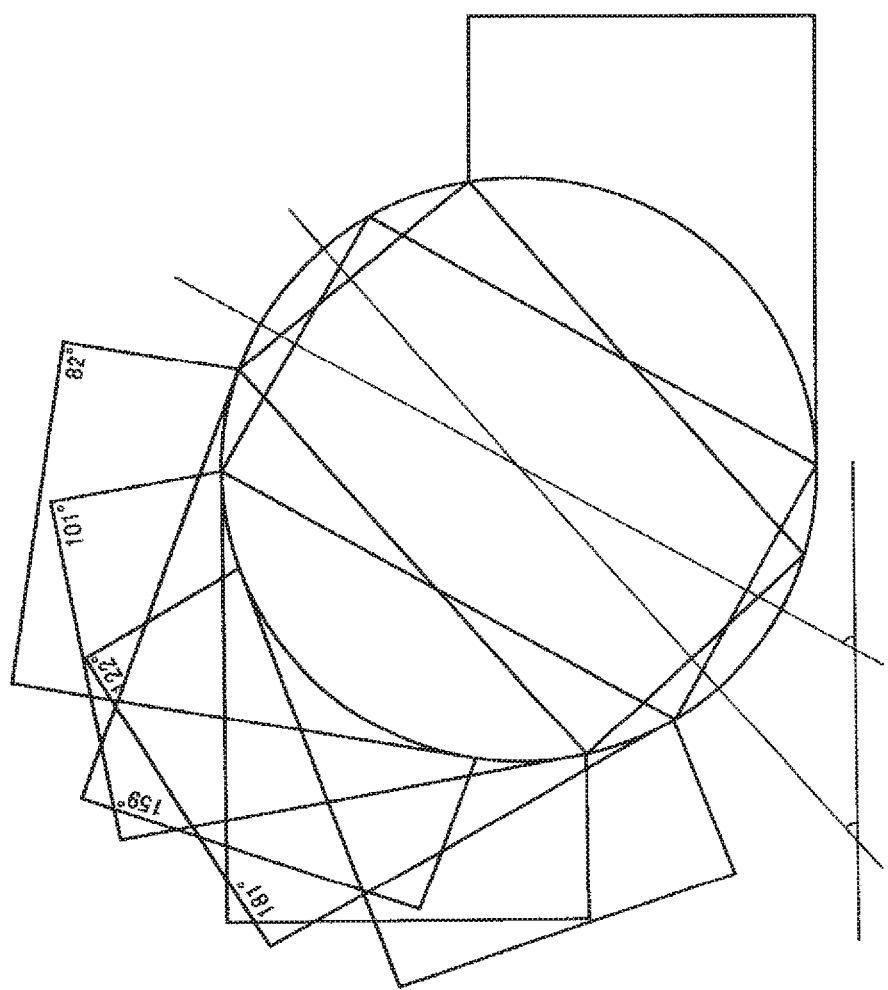
FIG. 39 is a cross-sectional view illustrating a method of adjusting and setting a deflection angle between the first straight pipe portion and the second straight pipe portion of the liquid channel universal pipe joint according to still another embodiment of the present invention.

FIG. 39 is a diagram illustrating how the second straight pipe portion 5 can turn with respect to the first straight pipe portion 1 in both the aforementioned experiments.

TABLE 2

Combined Angle EX. 38 degrees L = 20%  Inner diameter of tube*1.6
*Range of angle formed between two respective center lines of combined spherical shaped bodies Maximum movable range

| Angle F (degrees) | Inner diameter X1 mm | Maximum diameter of the spherical body R 1 mm | Length Lmm | Normal swing angle Q1 (degrees) | Reverse swing angle Q2 (degrees) | Left to right swing angle Q3 (degrees) |
|---|---|---|---|---|---|---|
| 38 | 50 | 80 | 20% | 75~103 28 | 150~178 28 | 37~143 106 |
| 38 | 75 | 120 | 20% | 75~103 28 | 150~178 28 | 37~143 106 |
| 38 | 100 | 160 | 20% | 75~103 28 | 150~178 28 | 37~143 106 |
| 38 | 125 | 200 | 20% | 75~103 28 | 150~178 28 | 37~143 106 |
| 38 | 150 | 240 | 20% | 75~103 28 | 150~178 28 | 37~143 106 |
| 38 | 200 | 320 | 20% | 75~103 28 | 150~178 28 | 37~143 106 |
| 38 | 250 | 400 | 20% | 75~103 28 | 150~178 28 | 37~143 106 |
| 38 | 300 | 480 | 20% | 75~103 28 | 150~178 28 | 37~143 106 |
| 38 | 400 | 640 | 20% | 75~103 28 | 150~178 28 | 37~143 106 |
| 38 | 450 | 720 | 20% | 75~103 28 | 150~178 28 | 37~143 106 |
| 38 | 500 | 800 | 20% | 75~103 28 | 150~178 28 | 37~143 106 |
| 38 | 600 | 960 | 20% | 75~103 28 | 150~178 28 | 37~143 106 |

TABLE 3

Combined Angle EX. 45 degrees  L = 20%  Inner diameter of tube*1.6
*Range of angle formed between two respective center lines of combined spherical shaped bodies Maximum movable range

| Angle F (degrees) | Inner diameter X1 m | Maximum diameter of the spherical body R 1 mm | Length Lmm | Normal swing angle Q1 (degrees) | Reverse swing angle Q2 (degrees) | Left to right swing angle Q3 (degrees) |
|---|---|---|---|---|---|---|
| 45 | 50  | 80  | 20% | 83~111 28 | 159~187 28 | 37~143 106 |
| 45 | 75  | 120 | 20% | 83~111 28 | 159~187 28 | 37~143 106 |
| 45 | 100 | 160 | 20% | 83~111 28 | 159~187 28 | 37~143 106 |
| 45 | 125 | 200 | 20% | 83~111 28 | 159~187 28 | 37~143 106 |
| 45 | 150 | 240 | 20% | 83~111 28 | 159~187 28 | 37~143 106 |
| 45 | 200 | 320 | 20% | 83~111 28 | 159~187 28 | 37~143 106 |
| 45 | 250 | 400 | 20% | 83~111 28 | 159~187 28 | 37~143 106 |
| 45 | 300 | 480 | 20% | 83~111 28 | 159~187 28 | 37~143 106 |
| 45 | 400 | 640 | 20% | 83~111 28 | 159~187 28 | 37~143 106 |
| 45 | 450 | 720 | 20% | 83~111 28 | 159~187 28 | 37~143 106 |
| 45 | 500 | 800 | 20% | 83~111 28 | 159~187 28 | 37~143 106 |
| 45 | 600 | 960 | 20% | 83~111 28 | 159~187 28 | 37~143 106 |

TABLE 4

Combined Angle EX. 54 degrees  L = 20%  Inner diameter of tube*1.6
*Range of angle formed between two respective center lines of combined spherical shaped bodies Maximum movable range

| Angle F (degrees) | Inner diameter X1 m | Maximum diameter of the spherical body R 1 mm | Length Lmm | Normal swing angle Q1 (degrees) | Reverse swing angle Q2 (degrees) | Left to right swing angle Q3 (degrees) |
|---|---|---|---|---|---|---|
| 54 | 50  | 80  | 20% | 90~118 28 | 165~193 28 | 37~143 106 |
| 54 | 75  | 120 | 20% | 90~118 28 | 165~193 28 | 37~143 106 |
| 54 | 100 | 160 | 20% | 90~118 28 | 165~193 28 | 37~143 106 |
| 54 | 125 | 200 | 20% | 90~118 28 | 165~193 28 | 37~143 106 |
| 54 | 150 | 240 | 20% | 90~118 28 | 165~193 28 | 37~143 106 |
| 54 | 200 | 320 | 20% | 90~118 28 | 165~193 28 | 37~143 106 |
| 54 | 250 | 400 | 20% | 90~118 28 | 165~193 28 | 37~143 106 |
| 54 | 300 | 480 | 20% | 90~118 28 | 165~193 28 | 37~143 106 |
| 54 | 400 | 640 | 20% | 90~118 28 | 165~193 28 | 37~143 106 |
| 54 | 450 | 720 | 20% | 90~118 28 | 165~193 28 | 37~143 106 |
| 54 | 500 | 800 | 20% | 90~118 28 | 165~193 28 | 37~143 106 |
| 54 | 600 | 960 | 20% | 90~118 28 | 165~193 28 | 37~143 106 |

TABLE 5

Combined Angle EX. 38 degrees  L = 10%  inner diameter of tube*1.6  stopper is necessary
*Range of angle formed between two respective center lines of combined spherical shaped bodies Maximum movable range

| Angle F (degrees) | Inner diameter X1 mm | Maximum diameter of the spherical body R 1 mm | Length Lmm | Normal swing angle Q1 (degrees) | Reverse swing angle Q2 (degrees) | Left to right swing angle Q3 (degrees) |
|---|---|---|---|---|---|---|
| 38 | 50  | 80  | 10% | 78~102 24 | 168~192 24 | 37~143 106 |
| 38 | 75  | 120 | 10% | 78~102 24 | 168~192 24 | 37~143 106 |
| 38 | 100 | 160 | 10% | 78~102 24 | 168~192 24 | 37~143 106 |
| 38 | 125 | 200 | 10% | 78~102 24 | 168~192 24 | 37~143 106 |
| 38 | 150 | 240 | 10% | 78~102 24 | 168~192 24 | 37~143 106 |
| 38 | 200 | 320 | 10% | 78~102 24 | 168~192 24 | 37~143 106 |
| 38 | 250 | 400 | 10% | 78~102 24 | 168~192 24 | 37~143 106 |
| 38 | 300 | 480 | 10% | 78~102 24 | 168~192 24 | 37~143 106 |
| 38 | 400 | 640 | 10% | 78~102 24 | 168~192 24 | 37~143 106 |
| 38 | 450 | 720 | 10% | 78~102 24 | 168~192 24 | 37~143 106 |
| 38 | 500 | 800 | 10% | 78~102 24 | 168~192 24 | 37~143 106 |
| 38 | 600 | 960 | 10% | 78~102 24 | 168~192 24 | 37~143 106 |

TABLE 6

Combined Angle  L = 10%  inner diameter of tube*1.6  stopper is necessary
EX. 45 degrees  *Range of angle formed between two respective center lines of combined
spherical shaped bodies Maximum movable range

| Angle F (degrees) | Inner diameter X1 mm | Maximum diameter of the spherical body R 1 mm | Length Lmm | Normal swing angle Q1 (degrees) | Reverse swing angle Q2 (degrees) | Left to right swing angle Q3 (degrees) |
|---|---|---|---|---|---|---|
| 45 | 50  | 80  | 10% | 72~108 36 | 161~197 36 | 37~143 106 |
| 45 | 75  | 120 | 10% | 72~108 36 | 161~197 36 | 37~143 106 |
| 45 | 100 | 160 | 10% | 72~108 36 | 161~197 36 | 37~143 106 |
| 45 | 125 | 200 | 10% | 72~108 36 | 161~197 36 | 37~143 106 |
| 45 | 150 | 240 | 10% | 72~108 36 | 161~197 36 | 37~143 106 |
| 45 | 200 | 320 | 10% | 72~108 36 | 161~197 36 | 37~143 106 |
| 45 | 250 | 400 | 10% | 72~108 36 | 161~197 36 | 37~143 106 |
| 45 | 300 | 480 | 10% | 72~108 36 | 161~197 36 | 37~143 106 |
| 45 | 400 | 640 | 10% | 72~108 36 | 161~197 36 | 37~143 106 |
| 45 | 450 | 720 | 10% | 72~108 36 | 161~197 36 | 37~143 106 |
| 45 | 500 | 800 | 10% | 72~108 36 | 161~197 36 | 37~143 106 |
| 45 | 600 | 960 | 10% | 72~108 36 | 161~197 36 | 37~143 106 |

TABLE 7

Combined Angle  L = 10%  inner diameter of tube*1.6  stopper is necessary
EX 54 degrees  *Range of angle formed between two respective center lines of combined
spherical shaped bodies Maximum movable range

| Angle F (degrees) | Inner diameter X1 mm | Maximum diameter of the spherical body R 1 mm | Length Lmm | Normal swing angle Q1 (degrees) | Reverse swing angle Q2 (degrees) | Left to right swing angle Q3 (degrees) |
|---|---|---|---|---|---|---|
| 54 | 50  | 80  | 10% | 80~106 26 | 180~206 26 | 37~143 106 |
| 54 | 75  | 120 | 10% | 80~106 26 | 180~206 26 | 37~143 106 |
| 54 | 100 | 160 | 10% | 80~106 26 | 180~206 26 | 37~143 106 |
| 54 | 125 | 200 | 10% | 80~106 26 | 180~206 26 | 37~143 106 |
| 54 | 150 | 240 | 10% | 80~106 26 | 180~206 26 | 37~143 106 |
| 54 | 200 | 320 | 10% | 80~106 26 | 180~206 26 | 37~143 106 |
| 54 | 250 | 400 | 10% | 80~106 26 | 180~206 26 | 37~143 106 |
| 54 | 300 | 480 | 10% | 80~106 26 | 180~206 26 | 37~143 106 |
| 54 | 400 | 640 | 10% | 80~106 26 | 180~206 26 | 37~143 106 |
| 54 | 450 | 720 | 10% | 80~106 26 | 180~206 26 | 37~143 106 |
| 54 | 500 | 800 | 10% | 80~106 26 | 180~206 26 | 37~143 106 |
| 54 | 600 | 960 | 10% | 80~106 26 | 180~206 26 | 37~143 106 |

TABLE 8

Combined Angle  L = 10%  Inner diameter of tume*1.6  It can be produced if when a diameter of
EX 45 degrees  spherical body was set at more than
double of that of normal
*Range of angle formed between two respective center lines of combined
spherical bodies Maximum movable range

| Angle F (degrees) | Inner diameter X1 mm | Maximum diameter of the spherical body R 1 mm | Length Lmm | Normal swing angle Q1 (degrees) | Reverse swing angle Q2 (degrees) | Left to right swing angle Q3 (degrees) |
|---|---|---|---|---|---|---|
| 45 | 50  | 100  | 30% | 80~98 18 | 171~189 18 | 25~155 130 |
| 45 | 75  | 150  | 30% | 80~98 18 | 171~189 18 | 25~155 130 |
| 45 | 100 | 200  | 30% | 80~98 18 | 171~189 18 | 25~155 130 |
| 45 | 125 | 250  | 30% | 80~98 18 | 171~189 18 | 25~155 130 |
| 45 | 150 | 300  | 30% | 80~98 18 | 171~189 18 | 25~155 130 |
| 45 | 200 | 400  | 30% | 80~98 18 | 171~189 18 | 25~155 130 |
| 45 | 250 | 500  | 30% | 80~98 18 | 171~189 18 | 25~155 130 |
| 45 | 300 | 600  | 30% | 80~98 18 | 171~189 18 | 25~155 130 |
| 45 | 400 | 800  | 30% | 80~98 18 | 171~189 18 | 25~155 130 |
| 45 | 450 | 900  | 30% | 80~98 18 | 171~189 18 | 25~155 130 |
| 45 | 500 | 1000 | 30% | 80~98 18 | 171~189 18 | 25~155 130 |
| 45 | 600 | 1200 | 30% | 80~98 18 | 171~189 18 | 25~155 130 |

If L = 30%, it can be produced only when the diameter of the spherical body is set at more than double of that of the normal and it cannot be produced when the combined angle is set at either one of 38 degrees and 54 degrees

TABLE 9

Range of Combined Angle    Inner diameter of tube*1.5
*Range of angle formed between two respective center lines of combined spherical shaped bodies Maximum movable range

| Combined spherical body | Length Lmm | Range of Angle | Normal swing angle Q1 (degrees) | Reverse swing angle Q2 (degrees) | Left to right swing angle Q3 (degrees) | |
|---|---|---|---|---|---|---|
| 1.5 | 18% | 41 | 82~110 28 | 152~180 28 | 82~180 98 | Lapping portion is small and strength thereof is problem |
| 1.5 | 18% | 70 | 110~138 28 | 180~208 28 | 110~208 98 | Lapping portion is small and strength thereof is problem |
| 1.5 | 21% | 44 | 87~109 22 | 157~180 23 | 87~157 93 | |
| 1.5 | 21% | 65 | 109~129 20 | 180~201 21 | 109~201 92 | |
| 1.5 | 22% | 46 | 93~110 17 | 162~180 18 | 93~180 87 | No variation is expected over 90 degrees |
| 1.5 | 22% | 64 | 110~127 17 | 180~197 17 | 110~197 87 | |
| 1.5 | 23% | 46 | 95~110 15 | 164~180 16 | 95~180 85 | No variation is expected over 90 degrees |
| 1.5 | 23% | 64 | 110~127 17 | 180~198 18 | 110~198 88 | |
| 1.5 | 25% | 51 | 100~110 10 | 169~179 10 | 100~179 79 | A movable range of swing is extremely small |
| 1.5 | 25% | 61 | 110~120 10 | 179~189 10 | 110~189 79 | A movable range of swing is extremely small |

TABLE 10

Range of Combined Angle    Inner diameter of tube*1.6
*Range of angle formed between two respective center lines of combined spherical shaped bodies Maximum movable range

| Combined spherical body | Length Lmm | Range of Angle | Normal swing angle Q1 (degrees) | Reverse swing angle Q2 (degrees) | Left to right swing angle Q3 (degrees) | |
|---|---|---|---|---|---|---|
| 1.6 | 18% | 32 | 71~104 33 | 147~180 33 | 71~180 109 | Lapping portion is small and strength thereof is problem |
| 1.6 | 18% | 70 | 104~138 34 | 180~213 28 | 110~208 98 | Lapping portion is small and strength thereof is problem |
| 1.6 | 21% | 40 | 80~105 26 | 154~179 26 | 87~179 99 | |
| 1.6 | 21% | 65 | 105~131 26 | 179~205 26 | 105~205 100 | |
| 1.6 | 22% | 41 | 82~105 23 | 155~180 25 | 82~180 98 | |
| 1.6 | 22% | 64 | 105~128 23 | 180~203 23 | 105~203 98 | |
| 1.6 | 23% | 42 | 84~105 21 | 160~179 19 | 84~179 95 | |
| 1.6 | 23% | 62 | 105~125 20 | 179~201 22 | 110~198 96 | |
| 1.6 | 25% | 45 | 89~104 15 | 164~180 16 | 89~180 91 | A movable range of swing is extremely small |
| 1.6 | 25% | 60 | 104~120 16 | 180~196 16 | 104~196 92 | A movable range of swing is extremely small |

TABLE 11

Range of of Combined Angle    Inner diameter of tube*1.7
*Range of angle formed between two respective center lines of combined spherical shaped bodies Maximum movable range

| Combined spherical body | Length Lmm | Range of Angle | Normal swing angle Q1 (degrees) | Reverse swing angle Q2 (degrees) | Left to right swing angle Q3 (degrees) | |
|---|---|---|---|---|---|---|
| 1.7 | 18% | 33 | 65~102 37 | 145~182 37 | 65~182 117 | Lapping portion is small and strength thereof is problem |
| 1.7 | 18% | 69 | 100~137 37 | 179~217 38 | 100~217 117 | Lapping portion is small and strength thereof is problem |
| 1.7 | 21% | 35 | 71~100 29 | 150~179 29 | 71~179 108 | |
| 1.7 | 21% | 65 | 100~130 30 | 179~209 30 | 100~209 109 | |
| 1.7 | 22% | 37 | 75~98 23 | 153~180 27 | 75~180 105 | |
| 1.7 | 22% | 64 | 98~128 30 | 180~207 27 | 98~207 109 | |

TABLE 11-continued

| | | | | | | |
|---|---|---|---|---|---|---|
| 1.7 | 23% | 39 | 79~101 22 | 157~180 23 | 79~180 101 | |
| 1.7 | 23% | 62 | 101~123 22 | 180~203 23 | 101~203 102 | |
| 1.7 | 25% | 41 | 82~101 19 | 159~181 22 | 82~181 99 | Lapping portion is small and strength thereof is problem |
| 1.7 | 25% | 61 | 101~122 21 | 181~200 19 | 101~200 99 | A movable range of swing is extremely small |

That is, according to the present invention, in the liquid pipe coupling universal joint manufactured out of these angle ranges as a preferable essential requirement, it is difficult to obtain a sufficiently large deflection or rotation angle between the straight pipe portions 1 and 5 and sufficiently achieve the objects of the present invention even considering a setting condition regarding the ratio R1/X between the maximum diameter R1 of the spherical curved portion and the diameter X1 of the first straight pipe portion or a setting condition regarding a distance of the edge circumference of the first fitting portion separated from the reference plane T described below.

That is, if the angle F is set to 38° or smaller, a large turning angle range of the second straight pipe portion 5 against the first straight pipe portion 1 is obtained. However, in contrast, an overlapping area (range) between both spheres between the first and second fitting portions is reduced. Therefore, for example, it becomes difficult to set the packing 15 and make a robust and stable sliding motion between both the fitting portions disadvantageously.

Meanwhile, if the angle F is set to 68° or larger, the turning angle range of the second straight pipe portion 5 against the first straight pipe portion 1 is extremely reduced. It is difficult to set an arbitrary turning angle between the first and second straight pipe portions 1 and 5 as a universal joint disadvantageously.

Therefore, according to the present invention, the angle F is set to preferably 38° to 68°, more preferably 40° to 65°, and most preferably 45°.

Furthermore, according to the present invention, in order to allow overlapping fitting portions 3 and 7 to make a stable sliding or pivoting motion, guarantee a waterproof property or a water blocking property, and obtain a more robust fitting state in a mutual fitting portion between the first and second coupling structures 4 and 8, in particular, an annular groove portion 16 having a suitable shape is provided in an inner wall portion of the first fitting portion 3 extending in the first coupling structure 4, and a packing member 15 formed of a material having a suitable elasticity and frictional property is disposed and fixed inside the annular groove portion 16.

In one embodiment according to the present invention, the packing member 15 is disposed between an inner surface of the outer fitting portion and an outer surface of the inner fitting portion out of the first and second fitting portions 3 and 7 and between the reference plane T and the edge circumferences 12 and 13.

A cross-sectional shape or a material of the packing member 15 employed in the present invention is not particular limited. Preferably, a material having compressive elasticity and a high frictional coefficient is employed. In addition, a material having a water swelling property may also be preferably employed.

A suitable reinforcing annular protrusion 15' having a suitable shape may be disposed in an outer surface corresponding to the inner circumferential wall of the extending area of the first fitting portion 3 provided with the annular groove portion 15.

Here, a preferable embodiment of the packing member 15 employed in the present invention will be described in details with reference to FIGS. 22(A) to 22(C). That is, the packing member 15 employed in the present invention is preferably formed of a material basically having a property of absorbing water and swelling. Without limiting to such a material, any material well known in the art may also be employed.

Meanwhile, the packing member 15 employed in the present invention is a flat band-shaped annular body. An outer surface 19 of the packing member 15 is partly held by an inner surface 3' of the outer fitting portion 3, and an inner surface 14 of the packing member 15 comes into contact with the outer surface 7' of the inner fitting portion 7 out of the fitting portion 3. Meanwhile, a surface of the fitting portion 3 of the packing member 15 coming into contact with the outer surface 7' of the inner fitting portion 7 is provided with at least one annular continuous groove portion 16 along an inner wall circumference of the fitting portion 3.

The packing member is fitted and held to the annular recessed groove portion 16 provided in a part of the inner surface of the outer fitting portion.

Meanwhile, according to a preferable embodiment, the packing member 15 is provided with an annular reinforcement layer 17 formed of a hard material with a predetermined thickness in an outward outer surface 19 of the annular body formed in the band-shaped body.

By additionally employing such a reinforcement 17, it is possible to hold the packing member 15 inside the groove portion 16 in a stable state and contribute to cost reduction of the packing member 15 and improvement of durability.

In the packing member 15 according to the present invention, as a preferable embodiment, at least one recessed groove portion 18 may be additionally provided on a surface 14 of the packing member 15 coming into contact with a part of the outer surface 6 of the other fitting portion 7 along the longitudinal center axis line of the packing member 15.

Figure 22:
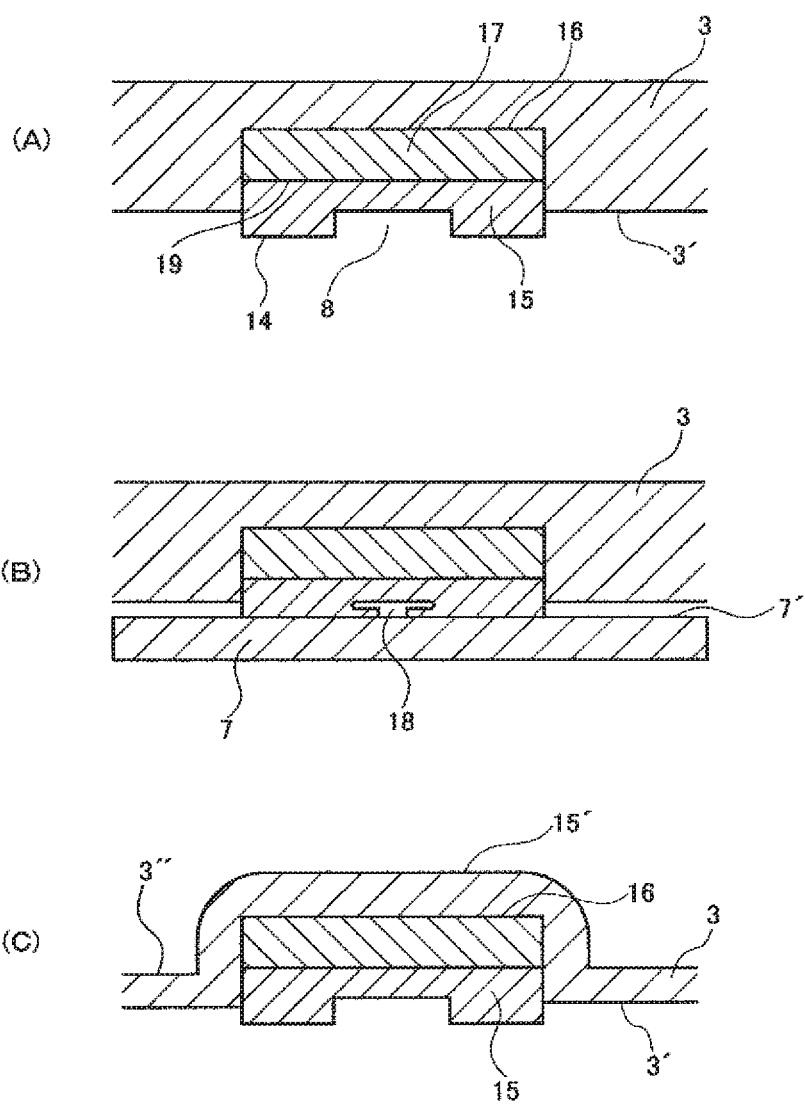
FIGS. 22(A) to 22(C) are cross-sectional views illustrating a configuration of a packing member in the liquid pipe coupling universal joint according to the present invention.

According to the present invention, since the recessed groove portion 18 is formed in the packing member 15, in practice, the recessed groove portion 18 is deformed and compressed as illustrated in FIG. 22(B) when the packing member 15 comes into contact with the outer surface 6 of the other fitting portion 7 with a pressure. Therefore, a contact surface 14 of the packing member 15 coming into contact with the outer surface 6 of the other fitting portion 7 can perfectly abut on the outer surface 6 of the other fitting portion 7 without deformation. Accordingly, it is possible to exhibit a perfect waterproof or water blocking property.

Furthermore, as a characteristic of the configuration of the packing member 15 according to the present invention, an outward swelling portion 15' may be provided on an outer surface 3" of the outer fitting portion 3 in a part facing a formation area of the annular recessed groove portion 16 on an inner surface 3' of the outer fitting portion 3, and this is also a preferable embodiment.

By employing such a configuration, it is possible to reinforce a part around the packing member 15 and improve strength as a whole.

Next, a configuration of the second coupling structure 8 according to the present invention will now be described in more details. FIG. 3(A) is a side view, and FIG. 3(B) is a perspective view.

Incidentally, a basic structure of the second coupling structure 8 is similar to that described above. In particular, a maximum diameter R2 of the spherical curved portion of the second fitting portion 7 is preferably set to 1.5 to 1.7 times larger than the diameter X2 of the second straight pipe portion 5. More preferably, the maximum diameter R2 of the spherical curved portion is set to 1.6 times larger than the diameter X2 of the second straight pipe portion.

Next, according to the present invention, the reference plane T included in the second coupling structure 8 is similar to the reference plane T formed in the first coupling structure 4 described above.

FIG. 4 is a perspective view illustrating the liquid pipe coupling universal joint 100 formed by fitting and connecting the first and second coupling structures 4 and 8 of FIG. 1 according to the present invention.

Note that, in FIG. 4, a slide surface 20 is formed in the second fitting portion 7 of the second coupling structure 8.

As one of the characteristics of the liquid pipe coupling universal joint 100 according to the present invention, as described above, an area or size of the overlapping area between the first and second fitting portions 3 and 7 is approximately twice the area of the outer surface formed between the reference plane T and the edge circumference 12 in the first fitting portion 3. By employing such a structure, it is possible to improve a coupling strength between the first and second fitting portions 3 and 7, smoothly perform sliding or pivoting operation between the first and second fitting portions 3 and 7 to implement stable operation, and effectively absorb an impact or vibration caused by an external reason using the fitting portion. Therefore, it is possible to improve vibration resistance and earthquake resistance.

In the liquid pipe coupling universal joint 100 according to the present invention, as illustrated in FIG. 1, there is no unevenness or step portion in a boundary between the first fitting portion 3 having a spherical curved shape and the second fitting portion 7. Accordingly, it is possible to perfectly prevent a risk of new problems caused by the gas or liquid passing through the pipe staying in the pipe coupling portion.

That is, as illustrated in FIG. 1, in the liquid pipe coupling universal joint 100 according to the present invention, a part of the inner surface 9 of the first or second straight pipe portion 1 or 5 and a part of the inner surface 10 of the first or second fitting portion 3 or 7 form a continuous plane portion 11. In addition, such a portion is preferably formed in a lower end of the first straight pipe portion 1 in the liquid pipe coupling universal joint 100.

According to the present invention, as a preferable embodiment, for example, a suitable marker 21 is provided in an outer surface of the universal joint corresponding to a lower end portion of the outer surface of the first straight pipe portion 1 corresponding to the inner surface of the lower end portion of the first straight pipe portion 1 where the continuous plane portion 11 is formed.

By employing such a configuration, a worker in a construction site can easily arrange a marker 21 portion provided in the liquid pipe coupling universal joint 100 downward. Therefore, it is possible to effectively arrange flow directions of various serviced liquids.

That is, according to the present invention, the marker 21 has a function of notifying an arrangement direction for positioning the marker 21 in the lowermost side of the universal joint 100 when the universal joint is mounted.

That is, a failure occurs in the liquid flow of the entire pipe system when only a part of the liquid stays in the liquid pipe. If a pipe mounting work is performed such that the marker is directed downward during piping, it is possible to generate and maintain a smooth flow in the liquid pipe at all times.

As another embodiment of the liquid pipe coupling universal joint 100 according to the present invention, stoppers 30 and 31 are provided in at least a part of the outer surface of the inner fitting portion 7 out of the first and second fitting portions 3 and 7 so as to abut on at least a part of the edge circumference 12 of the outer fitting portion 3 out of the first and second fitting portions 3 and 7.

Meanwhile, in the liquid pipe coupling universal joint 100 according to the present invention, an inner diameter of the curved body 2 of the outer fitting portion 3 out of the first and second fitting portions 3 and 7 is preferably set to be slightly longer (micron order) than the outer diameter of the curved body 6 of the inner fitting portion 7 such that both the fitting portions 3 and 7 can easily slide and pivot in a liquid-tight manner.

Here, how much at least one of the straight pipe portions is turned or displaced with respect to the other straight pipe portion in the liquid pipe coupling universal joint 100 according to the present invention will be described in details with reference to FIGS. 40 and 41.

Figure 40:
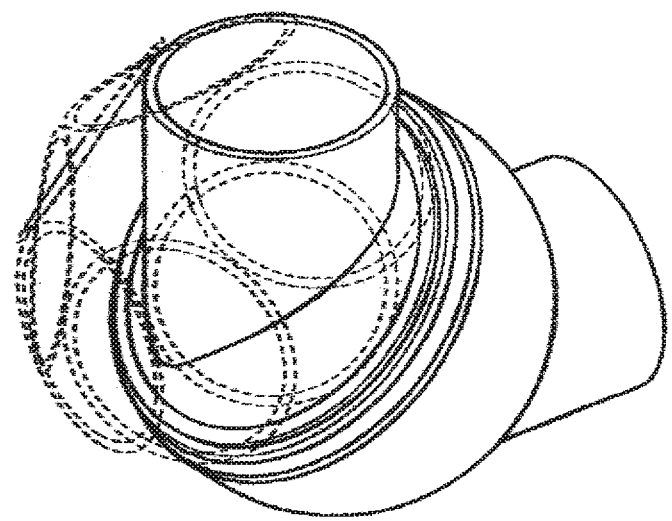
FIG. 40 is a perspective view illustrating a turnable range of the second straight pipe portion with respect to an arbitrary point in the liquid channel universal pipe joint according to the present invention.

That is, FIG. 40 is a perspective view illustrating the liquid pipe coupling universal joint 100 according to the present invention in comparison with FIG. 5(A). In FIG. 40, as a basic configuration, each center axis line of the first and second straight pipe portions 1 and 5 is arranged at an angle of 90° on a plane (the reference plane) including each center axis line of the first and second straight pipe portions 1 and 5.

In FIG. 40, the dotted line indicates how a free-end opening of the second straight pipe portion 5 is moved or displaced if the second semi-spherical portion is displaced and moved along the reference plane together with the second straight pipe portion 5 in a rotary manner while the first semi-spherical portion 3 and the first straight pipe portion 1 are fixed in this state.

Figure 41:
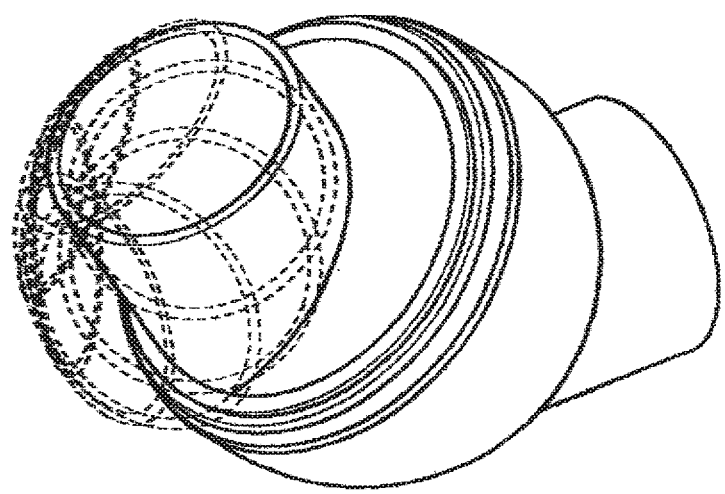
FIG. 41 is a perspective view illustrating turnable range of the second straight pipe portion with respect to another arbitrary point in the liquid channel universal pipe joint according to the present invention.

Meanwhile, FIG. 41 is a perspective view illustrating the liquid pipe coupling universal joint 100 according to the present invention in comparison with FIG. 5(B). Compared to the state of FIG. 40, the second straight pipe portion 5 is sloped to the left at an angle of at least 15° from a vertical line. In FIG. 41, the dotted line indicates how a free-end opening of the second straight pipe portion 5 is moved or displaced if the second semi-spherical portion is displaced and moved along the reference plane together with the second straight pipe portion 5 in a rotary manner while the first semi-spherical portion 3 and the first straight pipe portion 1 are fixed in this state.

In FIGS. 40 and 41, it is recognized that, focusing on a movable range of the free end opening of the second straight pipe portion 5, a general semi-spherical space can be covered using only a single second straight pipe portion 5 in this state.

According to the present invention, by turning the first straight pipe portion 1 by 360° with respect to the center axis line, a movement/displacement position or directivity of the opening of the second straight pipe portion 5 is further widened. Therefore, it is possible to obtain a universal joint having perfect ominidirectivity.

The liquid pipe coupling universal joint having such characteristics and functions does not exist in the existing market.

Next, referring to FIGS. 8 to 14, in the liquid pipe coupling universal joint 100 according to the present invention, it is recognized that, using the straight pipe coupling mechanism having the aforementioned technical configuration where the first coupling structure 4 and the second coupling structure 8 are fitted, the deflection angle of the connecting portion between the straight pipe portions 1 and 5 individually connected to the fitting portions 3 and 7, respectively, can be widely, semi-omnidirectionally, and easily adjusted and changed on a precise angle basis.

As another embodiment of the present invention, as illustrated in FIGS. 3(A) and 3(B), at least one stopper 30 or 31 is provided in at least a part of the outer surface of the spherical portions 2 or 6 of the inner fitting portion out of the first and second fitting portions 3 and 7 so as to abut on at least a part of the edge circumference 12 and 13 of the outer fitting portion out of the first and second fitting portions.

This stopper 30 or 31 is preferably formed in a punctiform protrusion shape or a continuous convex ridge shape.

Figure 15:
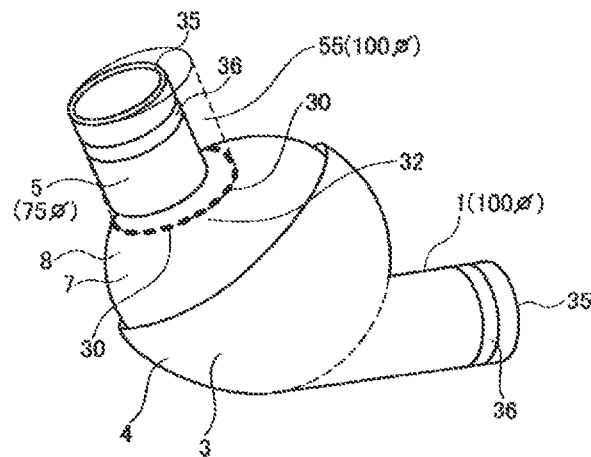
FIG. 15 is a perspective view illustrating an exemplary configuration of a stopper directed to the second straight pipe portion 5.

As another embodiment, as illustrated in FIG. 15, for example, if the first fitting portion 3 is arranged in the downstream side, the second fitting portion 7 is arranged in the upstream side, and the diameter of the second straight pipe portion 5 provided in the second fitting portion 7 is smaller than the diameter of the first straight pipe portion 1 provided in the first fitting portion 3, the stopper 30 is preferably placed on an external plane 7 of the spherical portion 6 of the second fitting portion 7 in a curved shape along a virtual connection line 32 defined by coupling the virtual second straight pipe portion 55 and the spherical portion 6 of the second fitting portion 7, assuming that the second straight pipe portion 55 having the same diameter as that of the first straight pipe portion 1 connected to the first fitting portion 3 is used in the second fitting portion 7.

According to the present invention, as a preferable embodiment, a packing member 36 may be further provided in an edge vicinity periphery portion 35 of the free end side in at least one of the first and second straight pipe portions 1 and 5. In particular, this configuration is effective when the diameters of the first and second straight pipe portions 1 and 5 exceed 100 mm.

Figure 16:
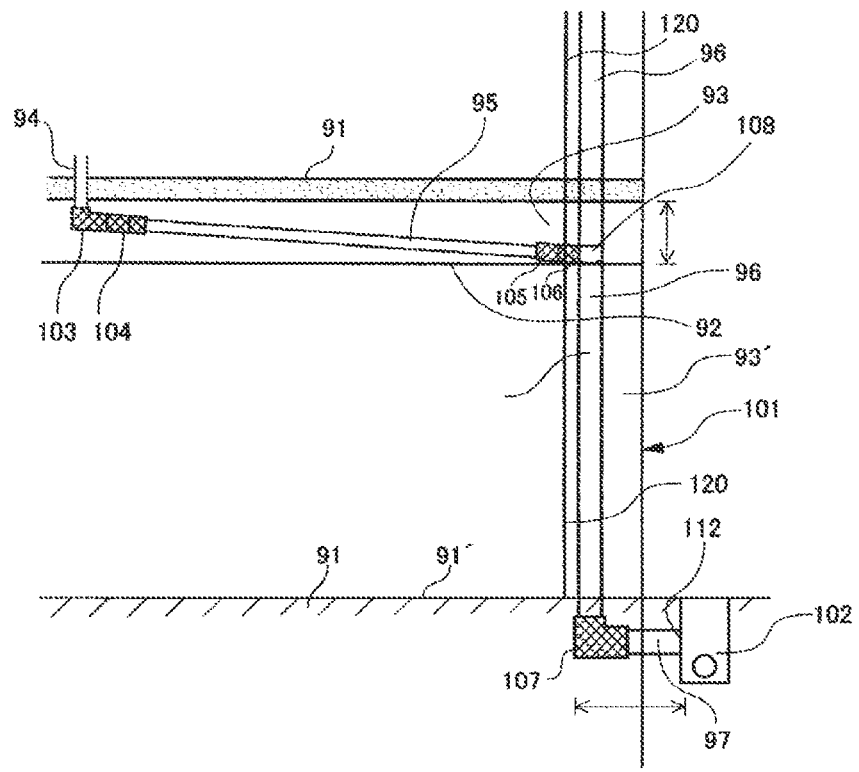
FIG. 16 is a diagram for describing an exemplary pipe mounting work in the background art.
Figure 17:
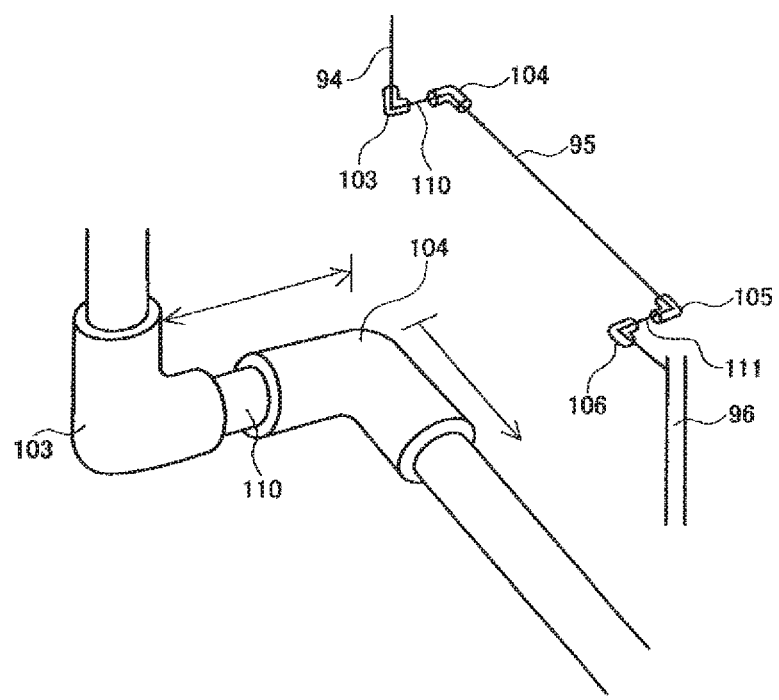
FIG. 17 is a diagram for describing another exemplary pipe mounting work in the background art.

Here, a liquid pipe coupling work in an indoor or underground environment using the liquid pipe coupling universal joint 100 according to the present invention will be described in comparison with a method of the background art. First, in the method of the background art described above, a pipe layer portion 93, for example, formed between a slab (floor) 91 and a ceiling 92 of a building typically occupies a very narrow space in order to reduce a construction cost of the building as illustrated in FIG. 16. Therefore, an end of the straight pipe portion 94 penetrating the slab 91 and an opening 108 of the main drainage pipe 96 positioned in the pipe layer portion 93 of the main drainage pipe 96 arranged approximately vertically from an upper layer to a lower layer inside a narrow pipe layer 93' between outer and inner walls 101 and 120 of the building are connected to each other using a suitable straight pipe portion 95 to form a liquid travel passage. In the background art, for example, elbow pipes 103 and 104 having a bending angle of 90° or the like are used in connection. However, since the pipe layer portion 93 is very narrow, it is difficult to complete the connection work using the 90° elbow pipe while a predetermined slope is generated in the straight pipe portion 95. For this reason, in the background art, in general, two 90° elbow pipes 103 and 104 are used in a single connection part, and another straight pipe portion 110 is interposed therebetween as illustrated in FIG. 17, so that the end of the straight pipe portion 94 and one end of the main drainage pipe 96 are connected to each other by selectively adjusting an arrangement direction of the 90° elbow pipes 103 and 104 in each connection part. Similarly, using two 90° elbow pipes 105 and 106 and an intermediate straight pipe portion 111, one end of the main drainage pipe 96 and the opening 108 of the main drainage pipe 96 are connected to each other.

Figure 18:
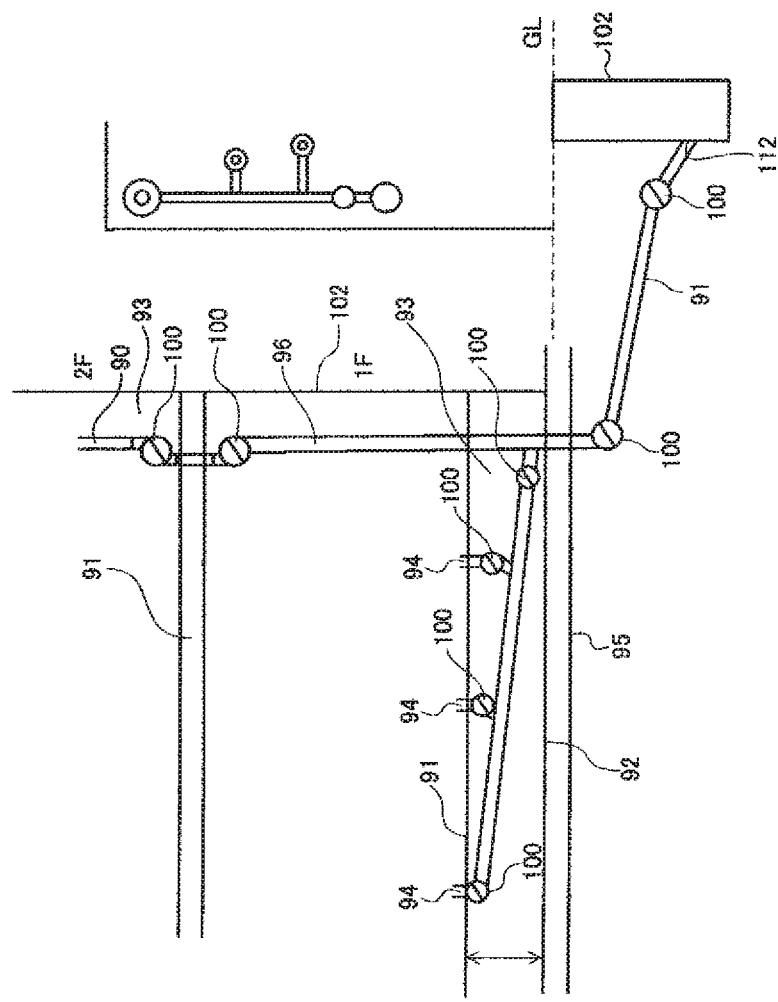
FIG. 18 is a diagram for describing an exemplary anti-vibration pipe structure obtained through a pipe mounting work using the liquid pipe coupling universal joint according to the present invention.

Meanwhile, as illustrated in FIG. 18, the lowermost end of the main drainage pipe 96 and the opening end of the straight pipe portion 97 connected to the drainage socket 112 of a drainage basin (also called a "vinyl chloride box") 102 are connected using a similar 90° elbow pipe 107.

In this case, since the inside of the pipe layer portion 93 or the pipe layer 93' is narrow, it is difficult to connect them by deploying a part of the 90° elbow pipes 104 and 105 in a horizontal direction in many cases. Therefore, it is difficult to apply a predetermined slope to the straight pipe portion 95, and the piping is finished while the straight pipe portion 95 does not have a predetermined slope in many cases.

In contrast, according to the present invention, as illustrated in FIG. 18, using the liquid pipe coupling universal joint 100 manufactured under the technical concept of the present invention, it is possible to rapidly and easily perform a pipe coupling work for the straight pipe portions, 94, 95, 96, and 97 within a short time by performing necessary angle adjustment and applying a predetermined slope within a narrow space of the pipe layer 93.

Similarly, in an aggregate building such as a multi-layered housing or an office building, the liquid pipe coupling universal joint 100 according to the present invention is suitably used in a necessary part in order to individually connect the straight pipe portion 96 piped vertically in series using the pipe 95 described above for each floor.

Similarly, for connection between the drainage socket 112 and the drainage basin 102 placed in the outdoor, the opening end of the straight pipe portion 97 and the straight pipe portion arranged in the drainage socket 112 of the drainage basin 102 are connected to each other using the liquid pipe coupling universal joint 100.

Figure 19:
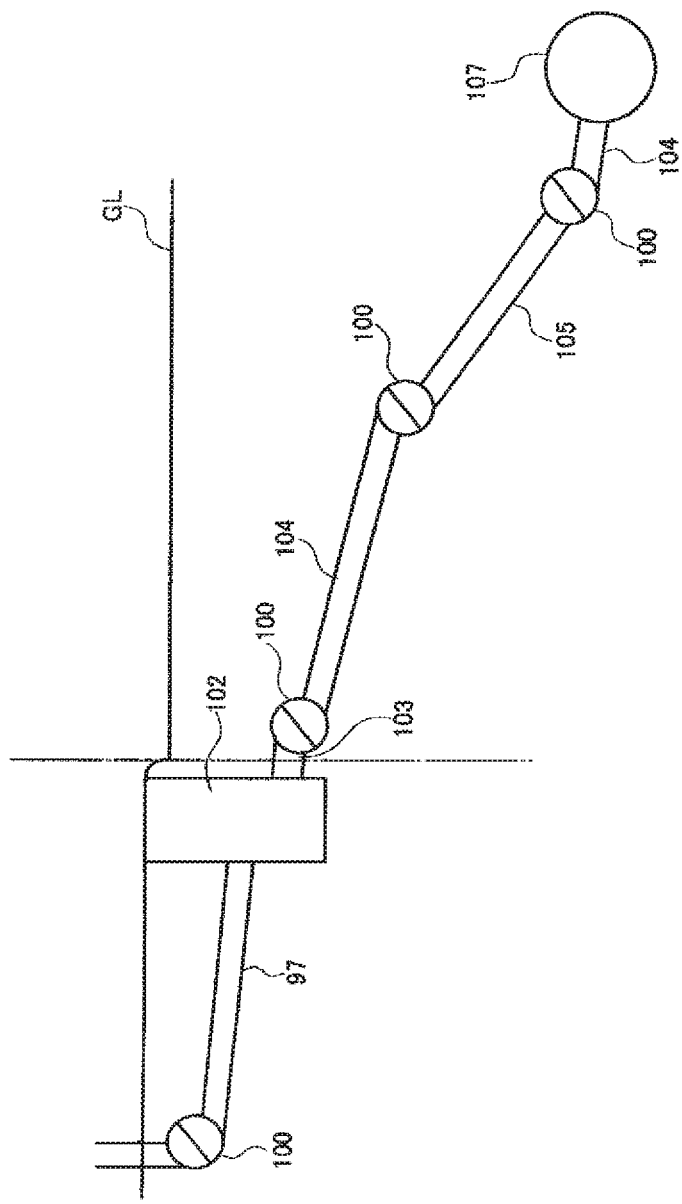
FIG. 19 is a diagram for describing another exemplary anti-vibration pipe structure obtained through a pipe mounting work using the liquid pipe coupling universal joint according to the present invention.

Furthermore, as illustrated in FIG. 19, in order to discharge the drainage from the drainage basin 102 of FIG. 14 from the drainage straight pipe portion 103 provided in the drainage basin 102 to a sewerage main-manhole 107 provided in an underground surface on a road, a single or a plurality of connection pipe groups 104 to 106 may be connected at a suitable interval using the liquid pipe coupling universal joint 100 according to the present invention.

The liquid pipe coupling universal joint 100 according to the present invention employs the aforementioned essential technical configuration. Therefore, it is possible to remarkably widen and precisely adjust a turning angle between the first and second straight pipe portions 1 and 5. In addition, it is possible to easily perform turning operation based on a robust and stable sliding effect. Furthermore, it is possible to freely set a diameter difference between the upstream-side and downstream-side straight pipe portions 5 and 1 and arbitrarily change an angle or a slope between neighboring straight pipe portions to be connected. Moreover, it is possible to adjust the angle in a precise range during a change of the angle. In particular, it is possible to arbitrarily change the angle or slope between the straight pipe portions even in a piping space inside a building, which is typically provided within a narrow space or area.

The liquid pipe coupling universal joint 100 according to the present invention can prevent fracture, breakdown, or removal even when a strong considerable external force is received and has excellent absorption for an external vibration.

Using the liquid pipe coupling universal joint 100, stable and reliable turning can be performed between the straight pipe portions. Therefore, it is possible to effectively absorb an external impact or vibration in the straight pipe portions. Accordingly, the liquid pipe coupling universal joint 100 is a construction material having excellent vibration and earthquake resistance.

In particular, if a pair of liquid pipe coupling universal joints 100 is used in both ends of a predetermined straight pipe portion, vibration absorption of both the liquid pipe coupling universal joints 100 has a synergistic effect. Therefore, it is possible to construct a pipe system having excellent vibration and/or earthquake resistance.

That is, using the piping method of FIGS. 18 and 19, it is possible to obtain a pipe structure and system having excellent earthquake resistance not obtainable from the background art.

Figure 20:
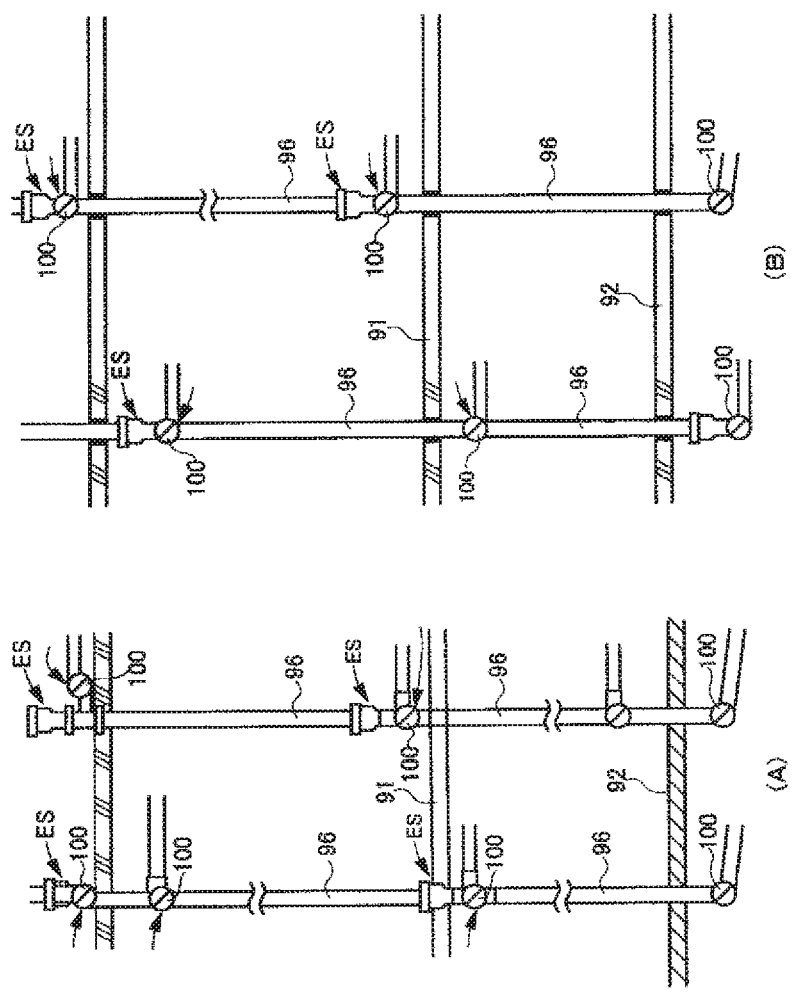
FIGS. 20(A) and 20(B) are diagrams for describing another exemplary anti-vibration pipe structure obtained through a pipe mounting work using the liquid pipe coupling universal joint according to the present invention.
Figure 21:
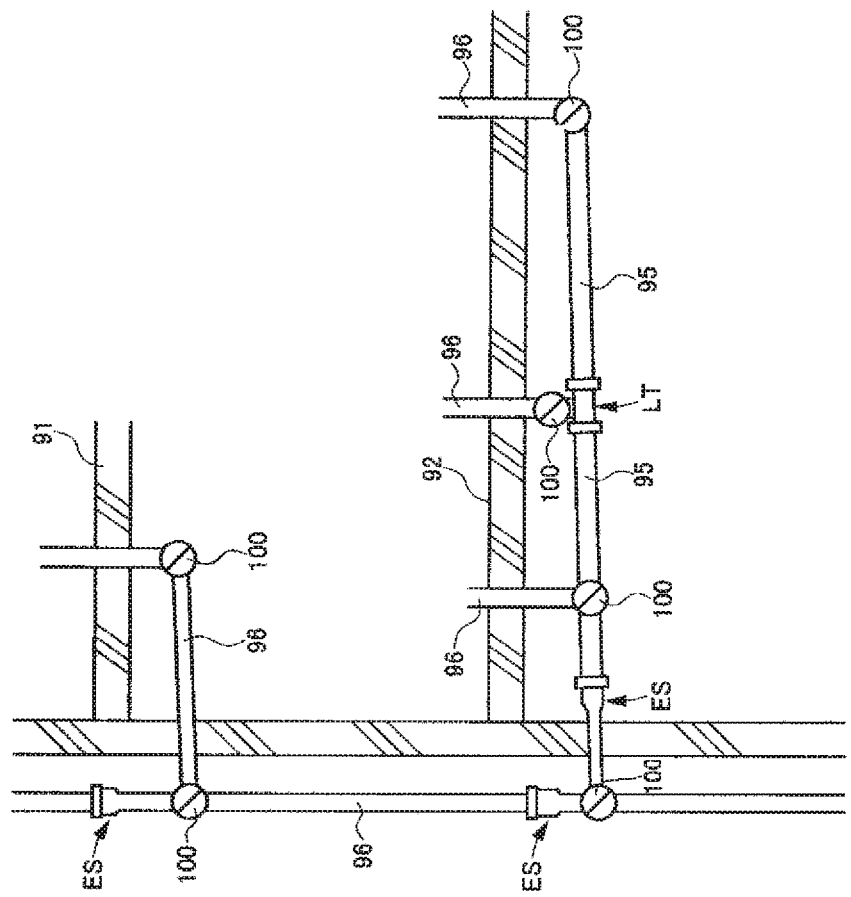
FIG. 21 is a diagram for describing further another exemplary anti-vibration pipe structure obtained through a pipe mounting work using the liquid pipe coupling universal joint according to the present invention.

FIGS. 20(A) and 20(B) and 21 illustrate another embodiment of the piping work of the piping structure and system having excellent vibration and earthquake resistance.

That is, in building piping, a universal pipe joint 100 capable of absorbing a vibration in an earthquake is provided in each floor. For contractibility, an exchangeable maintenance socket (also called a "contractible joint") may be combined. Alternatively, if the pipe is firmly fastened in a fixed support manner, a felt sheet may be inserted in a band installed in lower and front sides of the universal pipe joint 100 in order to prevent the pipe from being damaged. Alternatively, although only a single universal pipe joint 100 absorbs a vibration, for a buried pipe, the universal pipe joint 100 may be provided in two or more places in order to more effectively achieve vibration resistance and anti-vibration performance.

A method of manufacturing the liquid pipe vibration resistant universal pipe joint 100 according to the present invention is not particular limited. For example, a molding method of the background art may be employed, in which a tubular body having a circular diameter is formed by using synthetic resin well known in the art as a basic material, ends of the tubular bodies are fitted to each other, and a molding process is applied to the overlapping fitting portion to form a spherical body portion. Alternatively, the spherical body portion having a predetermined shape may be formed in the end of one straight pipe portion of the fitting portion in advance. Then, while the spherical body portion may cover the inner straight pipe portion, they may be heated for molding. Alternatively, a 3-dimensional printer may also be used in manufacturing.

Next, according to the present invention, the liquid pipe coupling universal joint has multiple functions as described above. Therefore, a liquid product treatment device obtained by applying the universal joint can be employed in a wide variety of fields.

Specifically, according to the present invention, there is provided a liquid product treatment device 300 to 305 including a pipe body, a socket branch pipe, a universal pipe socket, a box member, a manhole, and the like and is used in a fluidization treatment of a liquid product such as sewage, daily life drainage, and rain water, wherein the liquid pipe coupling universal joint 100 having the aforementioned configuration is installed in at least one pipe socket portion provided to protrude outward from at least a part of the liquid product treatment device, or at least a part of a pipe socket member including a pipe socket portion installed in at least a part of the liquid product treatment device.

That is, the liquid product treatment device used to dispose a liquid product such as sewage, daily life drainage, or rain water is equipped with devices having various functions and structures including a socket branch pipe, a universal pipe socket, a box member, and a manhole in addition to the pipe body. Such a liquid product treatment device is required to receive a predetermined liquid product such as sewage, daily life drainage, or rain water flowing from other places than the pipe body or various directions or discharge the liquid product such as sewage, daily life drainage, or rain water to other places or directions than the pipe body in many cases. For this reason, a lot of liquid product treatment devices in which a suitable number of branch pipes branched to suitable directions, that is, pipe socket portions are fixedly installed in advance are sold in the market. A user selectively uses a most proper liquid product treatment device depending on circumstances required in the construction site.

Figure 23:
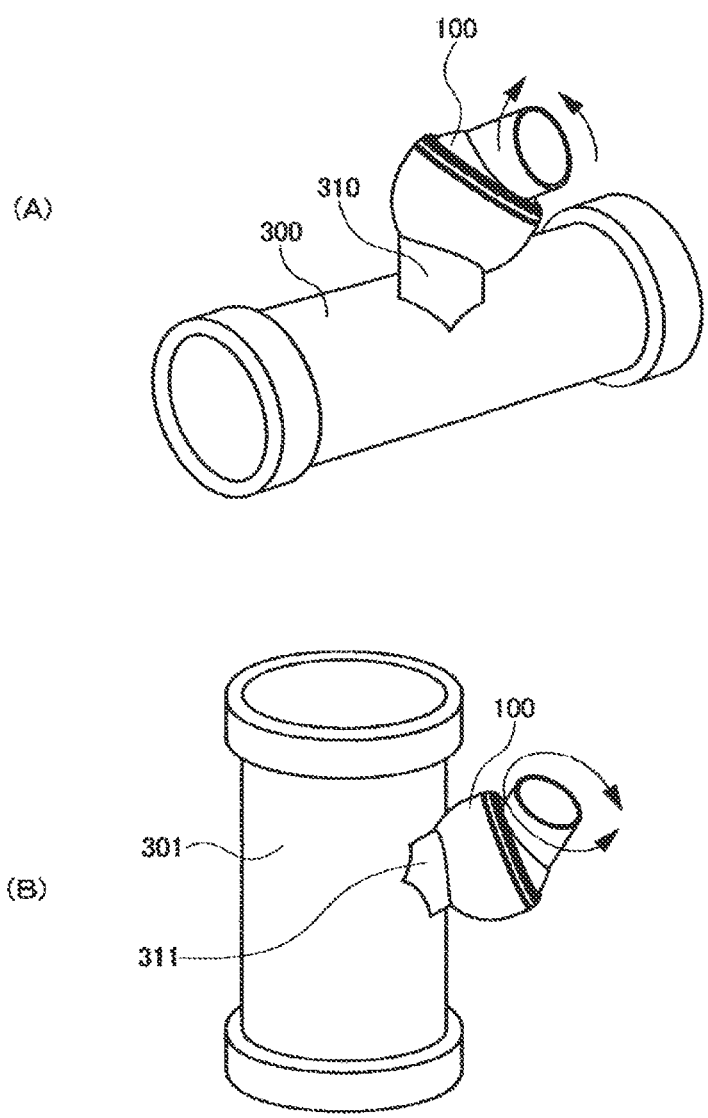
FIGS. 23(A) and 23(B) are diagrams illustrating a configuration of a liquid product treatment device using the liquid pipe coupling universal joint according to an embodiment of the invention.
FIGS. 23(C) to 23(E) are diagrams illustrating a configuration of the liquid product treatment device using the liquid pipe coupling universal joint according to another embodiment of the invention.
Figure 23:
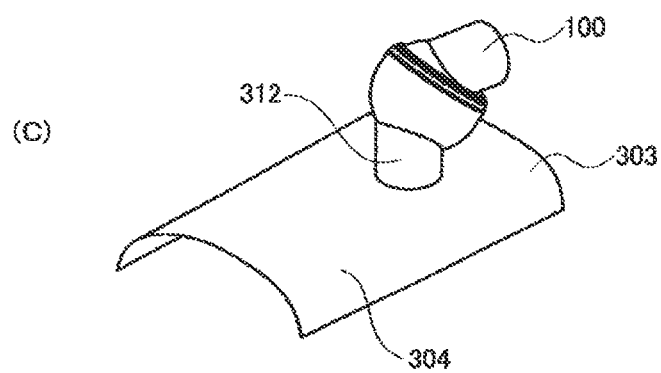
Figure 23:
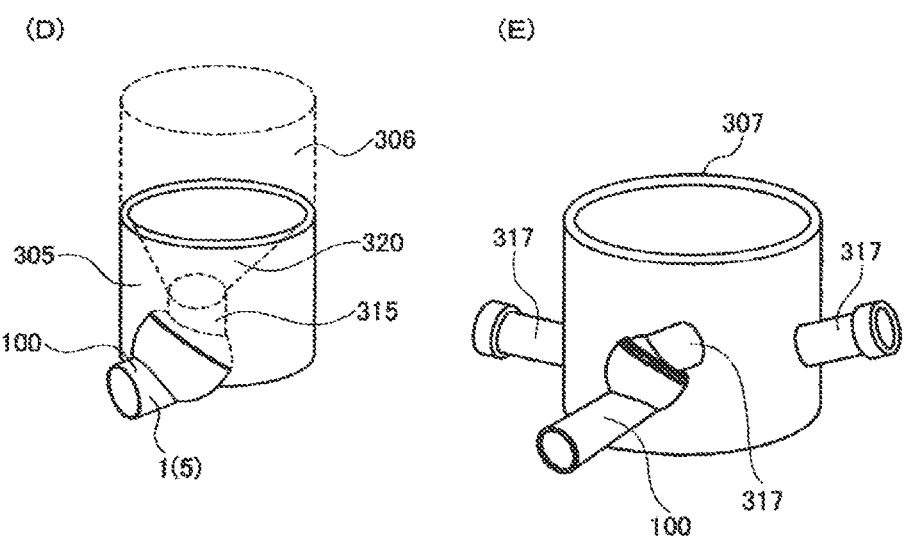
Figure 24:
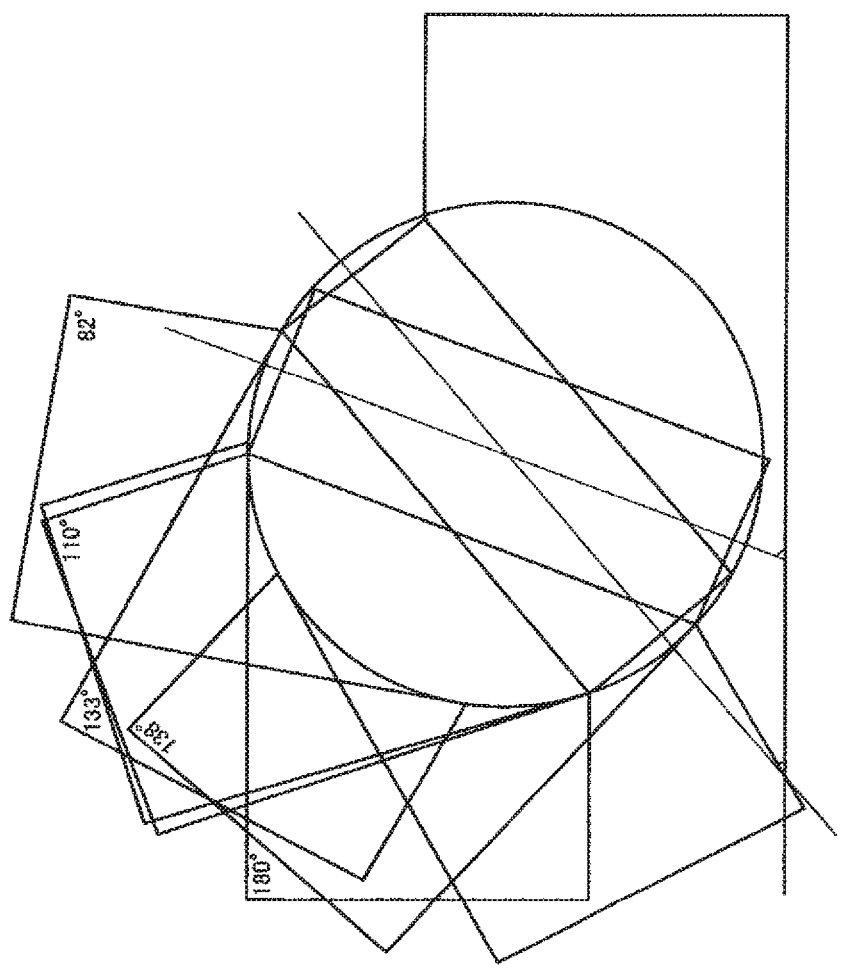
FIG. 24 is a cross-sectional view illustrating a method of adjusting and setting a deflection angle between the first straight pipe portion and the second straight pipe portion of the liquid pipe coupling universal joint according to another embodiment of the present invention.

For example, FIG. 23(A) illustrates a socket lower-branching joint type sewage main pipe 300 installed with at least one pipe socket portion 310 in a side face of the sewage main pipe 300.

One of the straight pipe portions 1 or 5 of the liquid pipe coupling universal joint 100 according to the present invention may be connected and fixed to a tip of the pipe socket portion 310 in such a structure. Similarly, one of the straight pipe portion 1 or 5 of the liquid pipe coupling universal joint 100 according to the present invention may be connected and fixed to a tip of at least one of the pipe socket portions 311 provided on the side face of the socket lower-branding joint type sewage main pipe 301 illustrated in FIG. 23(B).

As an embodiment, instead of at least one pipe socket portions 310 and 311 provided on the side faces of the sewage main pipes 300 and 301, the tip of one of the straight pipe portions 1 or 5 of the liquid pipe coupling universal joint 100 may be directly coupled to the side face of the sewage main pipe 300 or 301.

Meanwhile, FIG. 23(C) illustrates a mount type branch pipe joint 303 called a confluent saddle or a universal branch pipe joint.

The mount type universal branch pipe joint 303 includes a curved bonding support plate 304 and a pipe socket portion 312 installed on a part of the surface of the plate 304. A hole having a suitable size is formed in a part of the outer surface of the sewage main pipe 300 or the manhole portion 306 to be installed, and the pipe socket portion 312 is bonded and fixed using a suitable adhesive such that the hole is covered by the bonding support plate 304.

In the background art, it is necessary to install the pipe socket portion of such a liquid product treatment device in various directions depending on a use purpose or a pipe arrangement status in the site. Therefore, a plurality of types of liquid product treatment devices having different installation directions of the pipe socket portions are manufactured to respond to customer's demands. This disadvantageously complicates management of types of items and increases cost for maintenance.

In contrast, according to the present invention, the mount type universal branch pipe joint 303 described above is also formed by bonding a tip of one of the straight pipe portions 1 or 5 of the liquid pipe coupling universal joint 100 according to the present invention to an outer tip portion of at least one of the pipe socket portions 312 protruding outward from at least one of the mount type universal branch pipe joints 303. In this configuration, disposal of the liquids flowing from various directions and disposal of the liquids flowing to various directions can be performed using a single mount type universal branch pipe joint 303. Therefore, it is possible to remarkably reduce the number of types of the mount type universal branch pipe joints 303. In addition, it is possible to perfectly and easily cope with various types of construction works. Therefore, it is possible to remarkably improve construction work efficiency and significantly reduce the construction period and the construction cost.

Meanwhile, FIG. 23(D) illustrates an embodiment of a manhole or box portion 306 formed of concrete or vinyl chloride. A funnel-shaped portion 320 is provided in the lower end of the manhole or box portion 306. A tip of one of the straight pipe portions 1 or 5 of the liquid pipe coupling universal joint 100 according to the present invention is coupled to a drainage hole provided in the lower end of the funnel-shaped portion 320. The first and second fitting portions and the other straight pipe portion protrude outward at the lower end of the manhole or box portion 306. In addition, FIG. 23(E) illustrates a structure in which a plurality of pipe socket portions 317 are installed in an outer wall of the lower end of the manhole or box portion 307 formed of concrete or vinyl chloride. As a specific example, a tip of one of the straight pipe portions 1 or 5 of the liquid pipe coupling universal joint 100 according to the present invention is coupled to at least a part of a plurality of pipe socket portions 317.

According to the present invention, in any one of the liquid product treatment devices described above, the liquid pipe coupling universal joint 100 according to the present invention is installed in at least a part of at least one of the pipe socket portions 310 to 317 protruding outward in at least a part of the liquid product treatment devices 300 to 307. Therefore, it is possible to perfectly and easily cope with a plurality of types of construction works using one type of the liquid product treatment devices 300 to 307.

The invention claimed is:

1. A liquid pipe coupling universal joint used in a pipe coupling portion, comprising:
   a first coupling structure having a first straight pipe portion and a first fitting portion as a curved body that forms a part of a spherical body connected to one end of the first straight pipe portion; and
   a second coupling structure having a second straight pipe portion and a second fitting portion as a curved body that forms a part of a spherical body connected to one end of the second straight pipe portion,
   wherein any one of the first and second fitting portions has a diameter larger than those of the first and second straight pipe portions and is fitted to the other fitting portion such that sphere centers of the first and second fitting portions match each other to allow semi-omnidirectional sliding or pivoting,
   the first and second straight pipe portions have center axis lines decentered from each other not to pass through the sphere centers of the first and second fitting portions,
   a part of an inner surface of the first or second straight pipe portion and at least a part of an inner surface of the first or second fitting portion form a continuous plane portion as seen in a cross-sectional side view on a first plane formed by the sphere center and the center axis line of the first or second straight pipe portion, and
   an edge circumference of at least the first or second fitting portion is formed in a position separated from a reference plane by 10 to 30% of a maximum diameter length of a spherical portion formed on the reference plane in a direction opposite to a part where the first or the second straight pipe portion is connected, as seen in a cross-sectional side view on said first plane formed by the sphere center and the center axis line of the first or second straight pipe portion, the reference plane inside the spherical portion being formed on a second plane perpendicular to said first plane including a straight line having an angle of 30° to 68° with a center line portion of the first or the second straight portion, as a straight line formed by linking the sphere center and the center line portion of the first or the second straight pipe portion.

2. The liquid pipe coupling universal joint according to claim 1, wherein the maximum diameter of the spherical body in the first or second fitting portion is set to be 1.2 to 2.0 times larger than a diameter of the first or second straight pipe portion.

3. The liquid pipe coupling universal joint according to claim 1, wherein the edge circumference of the first or second fitting portion is formed in a position separated from the reference plane by 15 to 25% of the maximum diameter length of the reference plane.

4. The liquid pipe coupling universal joint according to claim 1, wherein the angle between the center line portion of the straight pipe portion of the first or the second straight pipe portion and the straight line formed by linking the sphere center and the center line portion of the first or second straight pipe portion is 30° to 62°.

5. The liquid pipe coupling universal joint according to claim 4, wherein the angle between the center line portion of the first or the second straight pipe portion and the straight line formed by linking the sphere center and the center line portion of the first or the second straight pipe portion is 38° to 52°.

6. The liquid pipe coupling universal joint according to claim 5, wherein the edge circumference of the first or second fitting portion is formed in a position separated from the reference plane by 20% of the maximum diameter length of the first spherical portion formed on the reference plane in a direction opposite to a part where the first or the second straight pipe portion connected, as seen in the cross-sectional side view on the first plane formed by the sphere center and the center axis line of the first or second straight pipe portion, the reference plane inside the spherical portion being formed on the second plane perpendicular to the first plane including the straight line having an angle range of 38° to 52° with the center line portion as the straight line formed by linking the sphere center and the center line portion of the first or the second straight pipe portion, and
   the spherical body portion of the first or second fitting portion has a maximum diameter set to be 1.2 to 2.0 times larger than the diameter of the first or second straight pipe portion.

7. The liquid pipe coupling universal joint according to claim 5, wherein the angle between the center line portion of the first or the second straight pipe portion and the straight line obtained by linking the sphere center and the center line portion of the first or the second straight pipe portion is set to 45°.

8. The liquid pipe coupling universal joint according to claim 1, wherein the edge circumference of the first or second fitting portion is formed in a position separated from the reference plane by 21 to 23% of the maximum diameter length of the reference plane, and the spherical body portion of the first or second fitting portion has a maximum diameter set to be 1.5 to 1.7 times larger than the diameter of the first or second straight pipe portion.

9. The liquid pipe coupling universal joint according to claim 1, wherein an overlapping area between the first and second fitting portions is formed to be two times larger than an area of an outer surface formed between the edge circumference and the reference plane of the first or second fitting portion.

10. The liquid pipe coupling universal joint according to claim 1, wherein a packing member is arranged between an inner surface of an outer fitting portion of the first or the second fitting portion and an outer surface of an inner fitting portion of the second or the first fitting portion and between the reference plane and the edge circumference.

11. The liquid pipe coupling universal joint according to claim 10, wherein the packing member is a flat band-shaped annular body, the packing member has an outer surface held by a part of the inner surface of the outer fitting portion, the packing member has an inner surface coming into contact with the inner fitting portion, and at least one annular continuous groove portion is formed on a surface of the packing member coming into contact with the outer surface of the inner fitting portion along a longitudinal center axis line of the annular body.

12. The liquid pipe coupling universal joint according to claim 11, wherein the packing member is formed of a material which swells by absorbing water.

13. The liquid pipe coupling universal joint according to claim 11, wherein the packing member is provided with an annular reinforcement layer formed of a hard material on an outer surface of the annular body with a thickness.

14. The liquid pipe coupling universal joint according to claim 10, wherein the packing member is held by an annular recessed groove portion formed in a part of the inner surface of the outer fitting portion.

15. The liquid pipe coupling universal joint according to claim 14, wherein an outward swelling portion is provided in a portion of an outer surface of the outer fitting portion opposite to a position where the annular recessed groove portion is formed in the inner surface of the outer fitting portion.

16. The liquid pipe coupling universal joint according to claim 1, wherein a marker is provided in an outer surface of the universal joint corresponding to a portion where a part of the inner surface of the first or second straight pipe portion and a part of the inner surface of the spherical portion of the first or second fitting portion form a continuous plane portion.

17. The liquid pipe coupling universal joint according to claim 1, wherein at least a stopper abutting on at least a part of the edge circumference of an outer fitting portion of the first or the second fitting portion is provided in at least a part of an outer surface of the spherical portion of an inner fitting portion of the second or the first fitting portion.

18. The liquid pipe coupling universal joint according to claim 17, wherein the stopper is formed in a punctiform protrusion shape or a continuous convex ridge shape.

19. The liquid pipe coupling universal joint according to claim 1, wherein a packing member is placed in an edge vicinity periphery portion of a free end side of at least one of the first and second straight pipe portions.

20. The liquid pipe coupling universal joint according to claim 1, wherein an inner diameter of the curved body of an outer fitting portion of the first or the second fitting portions is set to be slightly larger than an outer diameter of the curved body of an inner fitting portion of the second or first fitting portion, such that the inner and outer fitting portions can easily slide and pivot in a liquid-tight manner.

\* \* \* \* \*